United States Patent [19]

Allan

[11] Patent Number: 4,777,489
[45] Date of Patent: Oct. 11, 1988

[54] METHOD AND APPARATUS FOR SENSING AND DISPLAYING TARGETS WITHIN A PRESET ZONE

[75] Inventor: Richard D. Allan, Reading, England

[73] Assignee: Mars Incorporated, McLean, Va.

[21] Appl. No.: 812,314

[22] Filed: Dec. 23, 1985

[30] Foreign Application Priority Data

Dec. 27, 1984 [GB] United Kingdom ............... 8432629

[51] Int. Cl.$^4$ .............................................. G01S 7/44
[52] U.S. Cl. ...................................... 342/176; 342/41
[58] Field of Search .............. 342/176, 142, 143, 29, 342/41, 42, 43; 340/752

[56] References Cited

U.S. PATENT DOCUMENTS

| | | | |
|---|---|---|---|
| 3,189,897 | 6/1965 | Sinclair | 342/176 |
| 3,304,550 | 2/1967 | Fluhr et al. | 342/176 |
| 3,737,902 | 6/1973 | O'Hagan et al. | 342/41 |
| 3,775,766 | 11/1973 | Gendreu et al. | 342/29 |
| 3,869,601 | 3/1975 | Metcalf | 342/41 |
| 4,104,629 | 8/1978 | Isbister et al. | 342/43 |
| 4,163,972 | 8/1979 | Lapy et al. | 342/41 |
| 4,281,326 | 7/1981 | Anderson | 342/41 |
| 4,339,751 | 7/1982 | Pease | 342/41 |
| 4,370,733 | 1/1983 | Gaudio | 340/752 |

Primary Examiner—Thomas H. Tarcza
Assistant Examiner—Mark Hellner
Attorney, Agent, or Firm—Curtis, Morris & Safford

[57] ABSTRACT

Target pixel signals representing radar echo signals are stored in an addressable memory; and the contents of at least selected storage locations within a preset guard zone are read out of the memory. If a pixel signal of sufficient value is stored in the read out location, the presence of a target within the preset guard zone is indicated if that pixel signal is verified as being one of several which, presumably, are derived from a target.

22 Claims, 4 Drawing Sheets

METHOD AND APPARATUS FOR SENSING AND DISPLAYING TARGETS WITHIN A PRESET ZONE

This invention relates to a method and apparatus for detecting targets by means of radar and, more particularly, to an improved method and apparatus for sensing a target within a preset guard zone.

Radar systems have long been used to detect the location of various targets. For example, shipboard radar systems are useful in locating the whereabouts of both stationary and movable targets. This target information, when displayed on a typical radar screen, indicates possible or potential collision conditions.

Often, it is advantageous to indicate, as by way of a suitable alarm, the presence of a target that is or may become dangerously close to the radar-carrying ship. Although careful observation of the radar screen should provide sufficient warning, it is recognized that an automatic sensing and warning system is desirable.

Accordingly, one proposal for establishing the warning zone, sometimes referred to herein as a "guard zone", for detecting targets therein is described in U.S. Pat. No. 3,189,897. In this patent, a display indicates whether another ship is on a collision course with the ship carrying the radar. A displayed warning zone sector is positionable anywhere on the radar screen and is adjustable in size to define a larger or a smaller zone for detecting targets.

In the radar system described in U.S. Pat. No. 3,304,550, only those radar signals that are returned from targets within a selected guard zone, whose size and position are operator-adjustable, are gated to the radar display.

Still another guard zone system is described in U.S. Pat. No. 4,281,326 wherein a guard zone of desired size may be positioned at virtually any desired location on the radar screen. In this system, as well as those mentioned above, and as has been typical in guard zone radar systems implemented heretofore, analog circuitry is used to establish the guard zone and to detect target echo signals that are returned from that zone.

In a typical analog system, so-called range and azimuth gates are opened during those times that echo signals are expected from targets within the guard zone, and these gates are closed at all other times. Thus, the times that the gates are opened define the limits of the guard zone. If an echo signal successfully passes through serially connected range and azimuth gates, that echo signal may be used, subject to verification that it is derived from an actual target, to display an object within the guard zone. The guard zone may be adjusted in size by varying the times at which those gates remain opened and, likewise, the position of the guard zone may be set in a similar manner. Of course, rather than connecting range and azimuth gates in series, as mentioned above, alternative analog gating arrangements have been adopted which, effectively, permit echo pulses to pass through the gates if those pulses are derived from objects having a range and bearing that fall within the operator-established guard zone.

Although the foregoing guard zone radar systems have been accepted, they suffer from disadvantages inherent in analog systems. For example, analog systems generally are not as accurate as digital systems. As another example, the ease with which an operator may create, adjust and reposition a guard zone is far improved with a digital implementation than with an analog system. Also, with a digital system the display may be switched easily between active and inactive guard zone displays, while storing or "remembering" the particular parameters of previously established guard zones that may readily be reestablished if desired.

Another disadvantage associated with some prior art guard zone radar systems is the limitation of the display, when the guard zone is active, only to targets disposed within that zone. If echo signals derived from objects that lie outside the zone are received, the various range and azimuth gates block those echo signals from passing to the radar screen.

OBJECTS OF THE INVENTION

Therefore, it is an object of the present invention to provide an improved method and apparatus for sensing and displaying targets within a preset guard zone that overcome the disadvantages associated with prior art radar systems.

Another object of this invention is to provide a digital implementation for use with a radar system, whereby radar-detected targets are displayed irrespective of whether those targets are disposed within a guard zone.

A further object of this invention is to provide a method and apparatus for creating and displaying a desired guard zone whose parameters (e.g. size) may be adjusted as desired.

An additional object of this invention is to provide a digital implementation of a target detecting radar in which it is verified that a signal is indeed derived from an actual target.

Still another object of this invention is to provide a digital memory whose storage locations correspond generally to display locations on a radar display screen, the memory storing pixel signals, representing radar echo signals, in storage locations that correspond to the range and bearing of targets from which such pixel signals are produced.

As yet a further object of this invention, the aforementioned memory also stores digital signals representing the outline of a guard zone, whereby the guard zone itself may be displayed on the display screen.

In accordance with another object of this invention, the presence of pixel signals stored in the memory at those locations disposed within the guard zone is detected and indicated.

Various other objects, advantages and features of the present invention will become readily apparent from the ensuing detailed description, and the novel features will be particularly pointed out in the appended claims.

SUMMARY OF THE INVENTION

In accordance with this invention, a method and apparatus are provided for sensing radar-detected targets within a preset guard zone. Pixel signals representing radar echo signals are stored in a memory, referred to as a frame store, at addressable locations that correspond to the range and bearing of the echo signals. The contents of at least those storage locations which lie within the preset guard zone are read out and the presence of any pixel signals of sufficient value, or weight, stored in those locations is detected. If the detected pixel signals are verified as being derived from a target, the presence of a target within the preset guard zone is indicated.

As one feature of this invention, verification of a target is obtained generally by determining if the density of detected pixel signals exceeds a predetermined threshold. This is achieved, in one embodiment, by reading out the contents of a small portion of the frame store that surrounds the location in which a pixel signal is detected, and counting the number of pixel signals that are stored in that small portion and that are of proper value.

As another advantageous feature, the number of storage locations within the frame store is at least equal to the number of display locations of a radar display screen. Preferably, all of the storage locations which are associated with display locations are read out such that targets are displayed even if they do not lie within the preset guard zone.

As an aspect of the aforementioned feature of this invention, digital signals representing graphic display marks that form the outline of the guard zone are stored at the appropriate locations of the frame store, and these digital signals also are read out so as to display a superimposed guard zone on the radar display screen. These digital signals are stored by selecting inner and outer range boundaries of the guard zone and by selecting the angular bearing boundaries of that guard zone, whereupon the appropriate frame store locations are defined and supplied with the aforementioned digital signals. The detection of pixel signals within the guard zone is obtained by addressing those locations in the frame store that correspond to predetermined angular increments from one range boundary to the other, reading out the contents of those addressed locations, and sensing if the read out contents are of proper numerical value.

As a particular feature, the frame store is comprised of n rows and m columns of addressable storage locations, the frame store being addressed by successive x, y addresses for writing pixel signals into the frame store. Digital signals are written into proper x, y addresses; and the contents of that frame store are read out by a read address generator. The x, y addresses of the frame store also identify corresponding display locations on the radar screen.

BRIEF DESCRIPTION OF THE DRAWINGS

The following detailed description, given by way of example and not intended to limit the present invention solely to the embodiments described herein, may best be understood in conjunction with the accompanying drawings in which.

DETAILED DESCRIPTION OF A PREFERRED EMBODIMENT

Figure 1:
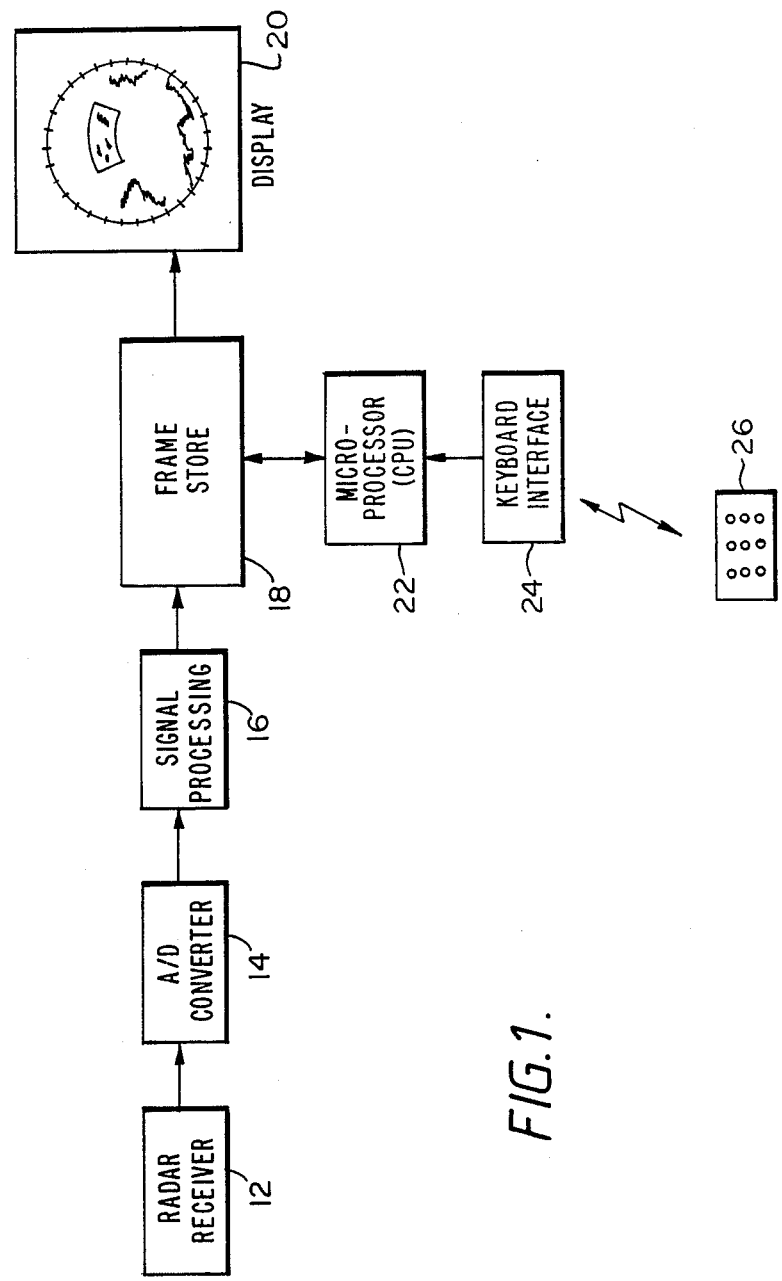
FIG. 1 is an overall block diagram of a radar display system in which the present invention finds ready application.

Referring now to the drawings, wherein like reference numerals are used throughout, and in particular to FIG. 1, there is illustrated an overall block diagram of a radar display system in which the present invention finds ready application. This radar display system is comprised of a radar receiver 12, an analog-to-digital converter 14, signal processing circuitry 16, a memory device referred to herein as the frame store 18, a central processing unit (CPU) which, preferably, is comprised of a microprocessor 22, a keyboard 26 and a visual display 20. Radar receiver 12 may be of conventional design of the type normally used in contemporary shipboard radar systems. As is conventional, the radar receiver is adapted to receive radar echo signals comprised of reflected pulses that had been transmitted from the shipboard radar trasmitter and returned by an object on which such transmitted pulses impinge. For convenience, the present invention is described in the environment of shipboard radar; but it will be readily understood that this invention may be utilized in other applications not necessarily limited to such a shipboard environment. It also will be understood that the teachings of the present invention are applicable to other target detecting systems that utilize techniques analogous to radar, such as sonar systems and the like.

Receiver 12 operates in synchronism with the radar transmitter (not shown) such that the instantaneous position of the usual radar antenna is known at the time that an echo signal is received. Thus, the angular relationship of the object from which the echo signal is returned, that is, the bearing of the object, is represented by suitable means, such as a digital count. Moreover, and as is conventional, the time separation between the transmission of a radar pulse and the reception of an echo signal for a particular bearing is measured, this time separation thus providing a suitable indication, such as in the form of a digital count, of the distance or range of that object from the radar transmitter. Receiver 12 is adapted to provide indications of the intensity, or magnitude, of objects that return echo signals and, typically, the echo signal intensity is in the form of an analog signal.

Radar receiver 12 is coupled to analog-to-digital converter 14 which is adapted to convert the intensity of the received echo signals to corresponding digital values. To be compatible with display 20, which will be described preferably as a video display in the form of a cathode ray tube (CRT), A/D converter 14 is adapted to generate picture elements ("pixels") in response to the analog echo signals supplied thereto. Each pixel signal produced by the A/D converter preferably is represented as a 2-bit digital signal and, for purposes which will become apparent, the magnitude of the pixel signal produced in response to an echo pulse returned from a target is constrained to the digital range [01] or [10], depending upon the relative intensity of the echo signal. In the absence of an echo signal, A/D converter 14 generates a pixel signal of value [00].

As an example, A/D converter 14 samples the output derived from radar receiver 12 at a predetermined sampling rate that may be synchronized with the range counter described below. Each sample then may be converted to a 2-bit pixel signal having the aforementioned digital values. As will be described, these pixel signals are stored in frame store 18 and utilized to construct a video image on display 20.

Signal processing circuitry 16 includes a digital filter, noise and clutter filtering circuitry and other processing apparatus for preparing the pixel signals for storage in the frame store. Although not shown in detail herein, the range over which radar-detected targets may be displayed can be varied, as desired, by an operator. For example, the range in interest may extend from one-fourth nautical miles to sixteen nautical miles, the desired range being selectable in discrete steps (e.g. ¼, ½, 1, 2, 4, 8 and 16 nautical miles). Depending upon the selected range, signal processing circuitry 16 operates in a manner not essential to a ready understanding of the present invention to provide the appropriate pixel signals for storage in frame store 18.

The frame store preferably comprises a random access memory (RAM) which may be thought of as being constructed as an n×m array of addressable storage locations. Each storage location is defined by the intersection of a respective one of the n rows and a respective one of the m columns. The storage locations correspond, for the most part, to pixel locations on the radar display screen of display 20. Advantageously, frame store 18 is comprised of a greater number of storage locations than there are pixel locations, although it is not beyond the scope of this invention to provide equal numbers of storage and pixel locations.

The addressable storage locations of frame store 18 are adapted to store the pixel signals supplied thereto from A/D converter 14 via signal processing circuitry 16. In addition, digital signals representing graphic data, to be described, also are stored in the frame store. The locations in which the pixel signals are stored are generated by a frame store address generator, to be described below, these addresses representing the particular bearing and range of the object represented by the pixel signals. Furthermore, if the frame store locations are in one-to-one correspondence with the pixel elements of the radar display screen, the relative locations of targets represented by the stored pixel signals will be indicated on the display screen when the contents of the frame store are read out thereto.

As is conventional, the radar echo signals, which are converted to pixel signals and stored in frame store 18, are expressed in terms of polar coordinates, each pixel signal being derived from an object having a particular range R and bearing θ. The addressable storage locations within the frame store are, however, addressed in terms of cartesian coordinates x, y, with each value x representing a particular column of the frame store and each value y representing a respective row. The frame store address generator effectively converts the polar coordinate range and bearing data associated with each pixel signal into equivalent cartesian coordinate data for appropriate addressing of the frame store. It will be appreciated that a pixel signal write-in operation is carried out substantially independently of the frame store read-out operation.

As mentioned above, frame store 18 also is adapted to store digital signals representing graphic information to be displayed on the radar display screen of display 20. This graphic information includes variable range markers which are operator adjustable for displaying preselected ranges over the radar detecting field, electronic bearing markers, which also are operator adjustable to indicate selectable bearings, and a graticule display. Additionally, the frame store may store the components of alphanumeric data which, when displayed, may represent the range and bearing of various targets. Such alphanumeric data may be in the form of pixel signals stored in appropriate locations of the frame store.

CPU 22 may comprise a microprocessor, such as a conventional 8-bit microprocessor manufactured by Intel Corporation, among others. The CPU is suitably programmed to carry out the functions described herein. Examples of various routines that are executed by this microprocessor are described below, and examples thereof are set out at the conclusion of this specification. For a sufficient understanding of the present invention, it will be appreciated that CPU 22 cooperates with a keyboard 26 by way of a keyboard interface 24 to supply to frame store 18 the digital signals which represent range and bearing markers in accordance with the range and bearing established by the operator via keyboard 26. The cooperation of the keyboard and CPU also functions to establish a guard zone of adjustable range and angular extent, or bearing, for the purpose of detecting a target within that zone. Under the operation of keyboard 26, the guard zone may be of any desirable size and may be located at any preferred position in the effective radar detection field.

The guard zone is defined by an outline represented by digital signals stored at appropriate locations within frame store 18. CPU 22 functions to generate the correct write-in addresses to define those locations of the frame store in which these digital signals are to be stored. For example, if the operator-selected range of interest (i.e. the effective radar detection field) is on the order of eight nautical miles and the guard zone is established with an inner range of two miles and an outer range of four miles and an angular extent from −10° to +10° relative to the heading of the ship carrying the radar system, the CPU generates the appropriate addresses to define the outline of this guard zone. An example of such addresses is described below with respect to the schematic representation of FIG. 4.

CPU 22 also is operable to select an alarm mode of operation to detect the presence of a target within the guard zone that has been established by the operator. In the alarm mode, the presence of a pixel signal of preestablished value (e.g. a pixel signal of value [01] or [10]) within the guard zone is detected, and then verification is made that this detected pixel signal is derived from an actual target, as opposed to a spurious pixel signal due to, for example, sea clutter, rain clutter, or the like. In accordance with one feature of the present invention, verification of a target-derived pixel signal is achieved by determining if the density of similar pixel signals exceeds a predetermined threshold. This density determination is attained by sensing the presence of a predetermined number of pixel signals of the aforementioned preestablished value within a small area surrounding a detected pixel signal. Stated otherwise, when a pixel signal is located within the established guard zone, as by reading out the contents of frame store 18 that correspond to that guard zone, the contents of a predetermined number of storage locations that surround the detected pixel signal are read out and the number of pixel signals stored within these read out locations is counted. If that count exceeds a predetermined value, for example, if twenty-five storage locations surrounding the location at which the detected pixel signal is found are examined, and if six pixel signals of preestablished value are stored in those twenty-five locations, the detected pixel signal is verified as being derived from a target. Thereupon, a suitable alarm condition, such as an audible or visual (or both) indication is provided. CPU 22 functions to address the appropriate storage locations of frame store 18 to read out the contents of those addressed locations, to sense if pixel signals of preestablished value are stored in those locations and to determine the density of such pixel signals in order to indicate the alarm. As may be appreciated, the purpose of this alarm is to apprise the radar operator of a potential collision. Depending upon the selected size and position of the guard zone, as well as the effective radar detection range, the imminence of the potential collision may be assessed.

CPU 22 also cooperates with keyboard 26 to ascertain the actual position of a radar-detected object relative to the radar-carrying ship. As mentioned above, the operator may actuate keyboard 26 to position a variable range marker at any desired location within the radar detection range. CPU 22 functions to generate the appropriate write-in addresses of frame store 18 in which the digital signals representing the variable range marker are stored. The digital signals, as well as the pixel signals, stored in the frame store are read out and displayed on the video screen of display 20. The operator thus may detect when a variable range marker intersects a particular target. Additional operation of keyboard 26 serves to position the electronic bearing marker that also is displayed on the screen of display 20. As this electronic bearing marker is adjusted, CPU 22 generates appropriate write-in addresses of the frame store in which the digital signals which represent the electronic bearing marker are written. As these digital signals are read out from the frame store to display 20, the operator may determine when the electronic bearing marker intersects the target in question. At the concurrent intersection of the variable range and electronic bearing markers, and the numerical display of the range and bearing markers at which that target is disposed, the position of that target may be ascertained.

Preferably, keyboard 26 is coupled to keyboard interface 24 by means of an infrared communication link. This allows flexibility in the particular location of the keyboard and is not limited to the constraints of fixed cables. However, if desired, other communication links between the keyboard interface and the keyboard may be utilized, including the aforementioned cables or other hard-wired channels.

Display 20 is a video display comprised of a CRT and suitable video drive circuitry, including synchronizing signal generators normally used to provide video horizontal and vertical synchronizing pulses. The display screen included in the CRT is comprised of, for example, 256 lines of information, each line containing 512 pixels. Of course, the information displayed on each line and at each pixel location is determined by the pixel and digital signals stored at the corresponding locations of frame store 18. As mentioned above, target-derived pixel signals are represented as [01] or [10], depending upon the intensity of the echo signal returned to radar receiver 12. The digital signals which are used to display variable range markers, electronic bearing markers and the guard zone are represented as [11]. Although the CRT included in display 20 may be a conventional monochrome display tube, a color display tube may be used, if desired. In that event, the value of the pixel and digital signals may be used to select a respective color for the display. It also is contemplated that, rather than using a CRT, display 20 may include other display elements comprised of, for example, an array of LED's, LCD's or other such elements, each element representing a pixel.

From the description set out hereinabove, the manner in which the radar display system illustrated in FIG. 1 operates should be readily apparent. The following merely is a summary of different modes of operation thereof. It will be recognized that target-derived pixel signals and keyboard-derived digital signals are written into appropriate locations of frame store 18 independently of each other, provided that the same storage location is not addressed for a write-in operation of both a pixel signal and a digital signal. An order of priority may be adopted whereby one or the other signal is written into a commonly addressed location.

As echo signals are received by radar receiver 12 and converted to pixel signals by A/D converter 14, write-in addresses are generated in synchronism with the operation of the radar receiver such that a location corresponding to the correct range and bearing of a pixel signal is addressed at the time that pixel signal is provided for a write-in operation. Thus, the $n \times m$ array of the frame store is supplied with pixel signals having values [01] and [10], depending upon the intensity of the received echo signals. If the echo signal is below a threshold level, or if no echo signal is received, the value [00] is written into the appropriate location at address x, y of the frame store.

Asynchronously with the writing in of pixel data into the frame store, the contents of the frame store are read out and displayed on the screen of display 20. Pixel signals of value [01] and [10] appear as video indications, thus providing a display of targets that are detected by the radar. For the purpose of understanding, a frame store location x, y corresponds to the screen location x, y, and the content of that frame store location is displayed at that screen location. As the typical radar antenna rotates, the contents of frame store 18 are updated, and the updated contents are read out to the display screen.

While pixel data is written into and read out from the frame store, the operator may operate keyboard 26 to set and adjust the variable range marker and the electronic bearing marker. When a range marker is selected by the operation of the keyboard, CPU 22 generates the appropriate addresses of frame store 18 into which digital signals [11] are written. When these digital signals are read out from the frame store, the variable range marker, such as a range circle, is displayed on the screen of display 20. This range marker, or circle, may be adjusted as desired by suitable operation of the keyboard, described below. As the range of this range marker decreases, the range circle appears to move closer to the center of the display. Conversely, as the range increases, the range circle appears to move outward toward the periphery of the display.

Similarly, the electronic bearing marker may be adjusted as desired by the operation of keyboard 26. CPU 22 responds to the selected electronic bearing setting to generate suitable addresses for frame store 18 into which digital signals are written. These addressed locations extend outwardly from a location corresponding to the center of the display screen and define a particular angular bearing. When the digital signals representing the electronic bearing marker are read out from the frame store, a radial line is displayed extending from the center of the display screen at an angle corresponding to the setting of the bearing marker. The electronic bearing marker may be angularly shifted by the operation of keyboard 26, as will be described, resulting in a positive or negative rotation in the clockwise or counterclockwise direction, depending upon the keyboard operation.

When a guard zone is to be established, the operator initially sets one variable range marker, for example, the inner range marker, and also sets one of the electronic bearing markers. Either the range marker or the bearing marker may be set first, followed by the other. Thereafter, a guard zone key is actuated and then the variable range and the electronic bearing marker keys are operated once again to set the outer range marker and the other bearing marker. As a result, the size and position of the guard zone is adjusted. It is appreciated that the operation of the variable range and the electronic bearing marker keys serves to supply digital signals to frame store 18 for storage at those locations determined by CPU 22. When the operator is satisfied with the displayed guard zone, an alarm key may be actuated to fix the guard zone, whereupon the detection of a target therewithin triggers a suitable alarm indication.

Figure 2:
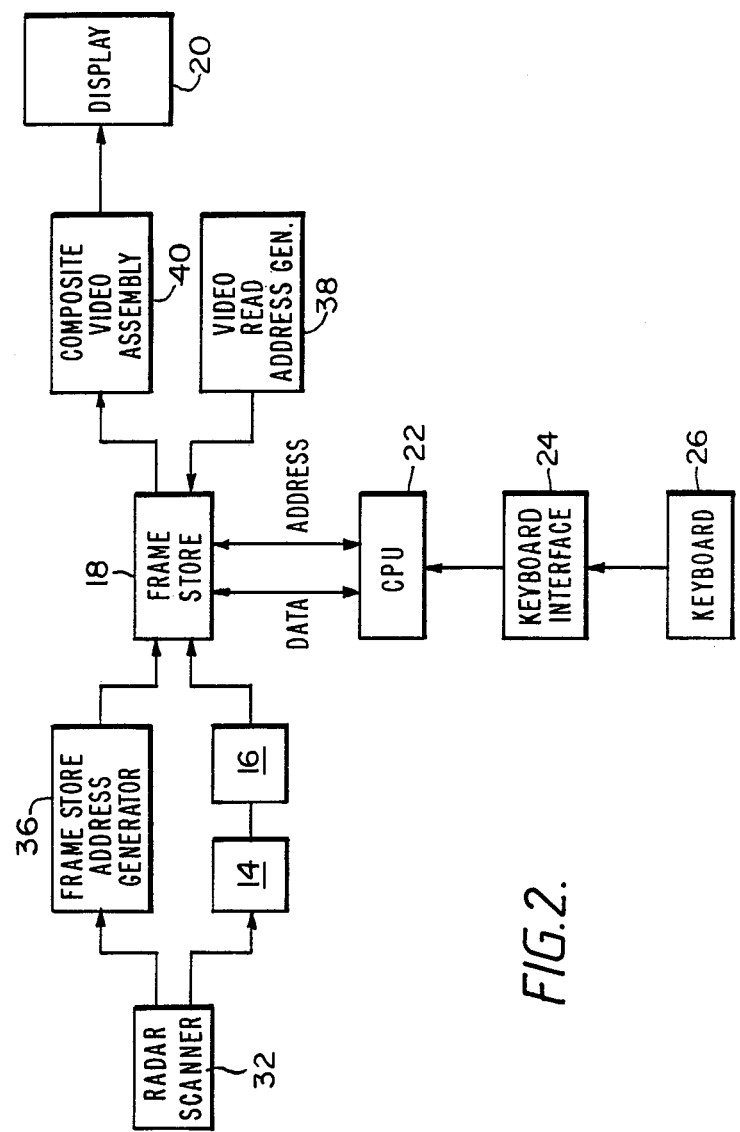
FIG. 2 is a block diagram showing greater details of an embodiment of the present invention.

FIG. 2 illustrates in somewhat greater detail the radar display system of the present invention. Those elements shown in FIG. 2 that correspond to the elements described above with respect to FIG. 1 are identified by the same reference numeral. In the interest of brevity, further description of those elements is not provided.

A radar scanner 32 is similar to aforedescribed radar receiver 12 and is adapted to provided outputs in response to radar echo signals that are received from detected objects. As before, these outputs are in analog form and are converted by A/D converter 14 and signal processing circuitry 16 from polar coordinate analog data to cartesian coordinate digital data in the form of pixel signals. Also illustrated in FIG. 2 is a frame store address generator 36 coupled to an output of radar scanner 32 and operable in synchronism with the radar scanner to provide the appropriate frame store addresses for writing into frame store 18 those pixel signals which are returned from detected objects. The frame store address generator is described in greater detail below with respect to FIG. 3; and for the purpose of the present discussion it will suffice to appreciate that the address generator provides x, y addresses to identify those x, y storage locations in the n×m array for writing pixel signals thereinto. Of course, and as before, if no pixel signal is present for a particular x, y address, the digital representation [00] is written into that address. Thus, with each rotation of the radar antenna, the n×m array of frame store 18 (or, if desired, only that portion of the array which corresponds on a one-to-one basis with the pixels comprising the display screen) is addressed to have written into the appropriate locations those pixel signals which represent radar-detected information (e.g. pixel signals of value [00] in the absence of a detected object and pixel signals of value [01] or [10] when an object is detected).

As in the embodiment shown in FIG. 1, FIG. 2 illustrates CPU 22 coupled to frame store 18 and connected by way of keyboard interface 24 to keyboard 26. Thus, the actuation of the keyboard is detected by the CPU which, in turn, generates an appropriate address to have written into frame store 18 those digital signals which represent range rings, variable range markers and electronic bearing markers, depending upon the mode of operation of the display system, as discussed above. Thus, upon the actuation of a range key, or switch, the frame store addresses at which digital signals representing the variable range marker are stored are incremented or decremented so as to "shift" the frame store locations in which those digital signals are stored. This, of course, has the effect of shifting the display of that variable range marker. As an example, keyboard 26 may include both an increment range key and a decrement range key, the selected actuation of which results in changing the frame store locations in which the digital signals that represent the variable range marker are stored; and this has the effect of moving the range marker outwardly on the display screen when the increment key is actuated or moving the displayed range marker inwardly when the decrement key is actuated. Similarly, keyboard 26 may include an increment electronic bearing marker key and a decrement electronic bearing marker key, the effect of actuating either key resulting in changing the frame store addresses at which the digital signals representing the electronic bearing marker are stored. When the increment key is actuated, the frame store addresses are shifted in a manner so as to result in the display of a clockwise angular movement of electronic bearing marker radial line, and the actuation of the decrement key results in a counterclockwise angular movement thereof.

As discussed above, keyboard 26 also includes a guard zone selection key and an alarm selection key. Normally, when an alarm mode is not selected, the displayed variable range marker and electronic bearing marker appear as broken or solid lines (or other desired lines). As is appreciated, this may be achieved by writing in the digital signal [11] into selected frame store addresses by CPU 22 so as to create the line displays. After the selection and establishment of the guard zone (in the manner discussed above) by the operator, the actuation of the alarm key causes CPU 22 to write the digital signal [11] into the appropriate storage locations of frame store 18 so as to display a solid-line outline of the established guard zone.

Of course, and as has been described above, when the alarm mode is selected, CPU 22 generates the read-out addresses of frame store 18, these addresses corresponding to locations within the established guard zone. In one embodiment, those addresses which extend along discrete, successive angular bearings from the inner range marker to the outer range marker are read out, and the presence of the pixel signal of value [01] or [10] is detected. Then, verification is made that this pixel signal is derived from a target by counting the number of pixel signals included within a discrete area. For example, a count is obtained of the number of pixel signals stored in an area of frame store 18 comprised of a 5×5 array that surrounds the storage location in which the subject pixel signal is found. If at least six pixel signals are stored in this 5×5 array, the subject pixel signal is verified as being derived from a target and a suitable alarm indication is provided.

In an alternative embodiment, all of the storage locations of frame store 18 which reside within the established guard zone are read out by the generation of appropriate addresses by CPU 22, and the presence of target-derived pixel signals within the read-out storage locations is carried out in a manner analogous to that just described.

FIG. 2 also illustrates a video read address generator 38 coupled to frame store 18. The purpose of this video read address generator is to generate successive x, y addresses for the purpose of reading out the contents of the frame store for display on the display screen of display device 20 (illustrated in FIG. 2 as display 20'). It will be appreciated that video read address generator 38 and frame store address generator 36 operate asynchronously; and suitable means (such as CPU 22 or other circuitry not shown) are provided to make sure that a common storage location of the frame store is not addressed by generators 36 and 38 simultaneously.

The contents of the storage locations which are addressed by video read address generator 38 are read out to a composite video assembly 40 for the purpose of converting the read out signals to analog signals which are synthesized to a conventional video signal for the purpose of driving video display 20'. Thus, composite video assembly 40 may include a digital-to-analog converter for converting the digital signals [00], [01], [10] and [11] to suitable analog levels to provide the video information portion of the typical video signal. The composite video assembly also generates the usual horizontal and vertical synchronizing and blanking signals which are combined with the aforementioned video information so as to supply to video display 20' a conventional composite video signal for driving that display. Conventional circuitry is known for synthesizing such composite video signals and, of course, may be used as composite video assembly 40. Further description of the composite video assembly is, thus, not necessary.

It will be appreciated that frame store address generator 36 differs from the address generator (or, more accurately, the address generating function) provided by CPU 22, the latter serving to generate write-in addresses for the purpose of storing the graphic display mark digital signals that represent range markers, bearing markers and the guard zone. These respective address generators may operate asynchronously to each other. Likewise, video read address generator 38 and the read-out address generator (or read-out address generating function) provided by CPU 22 may differ from each other. The read-out address produced by CPU 22 may be used to detect pixel signals located in the guard zone, thus carrying out the alarm function described above, whereas address generator 38 may be used merely to read out the contents of frame store 18 for display on the radar screen.

In the embodiment wherein the radar display screen appears as a generally circular area, video read address generator 38 may be adapted to read out those locations of frame store 18 that correspond to a generally circular array, even though the frame store is comprised of an n×m array, as mentioned above. It is, of course, recognized that the radar display screen may be generally rectangular in area and all of the storage locations included in the n×m array of the frame store may be read out to that screen.

As mentioned above, separate write-in address generators may be utilized to write pixel signals and graphic display marks into frame store 18; and, if desired, a write address multiplexer may be used to select one or the other of the address generators for a write-in operation. Similarly, a read address multiplexer may be utilized to accommodate the separate read address generators such that the read address generated by one or the other of such read address generators may be selected to read information from the frame store. It is, of course, within the scope of the present invention to utilize a single read address generator for the purpose of reading out data from the frame store to the radar display screen and also to detect the presence of pixel signals within the guard zone.

Figure 3:
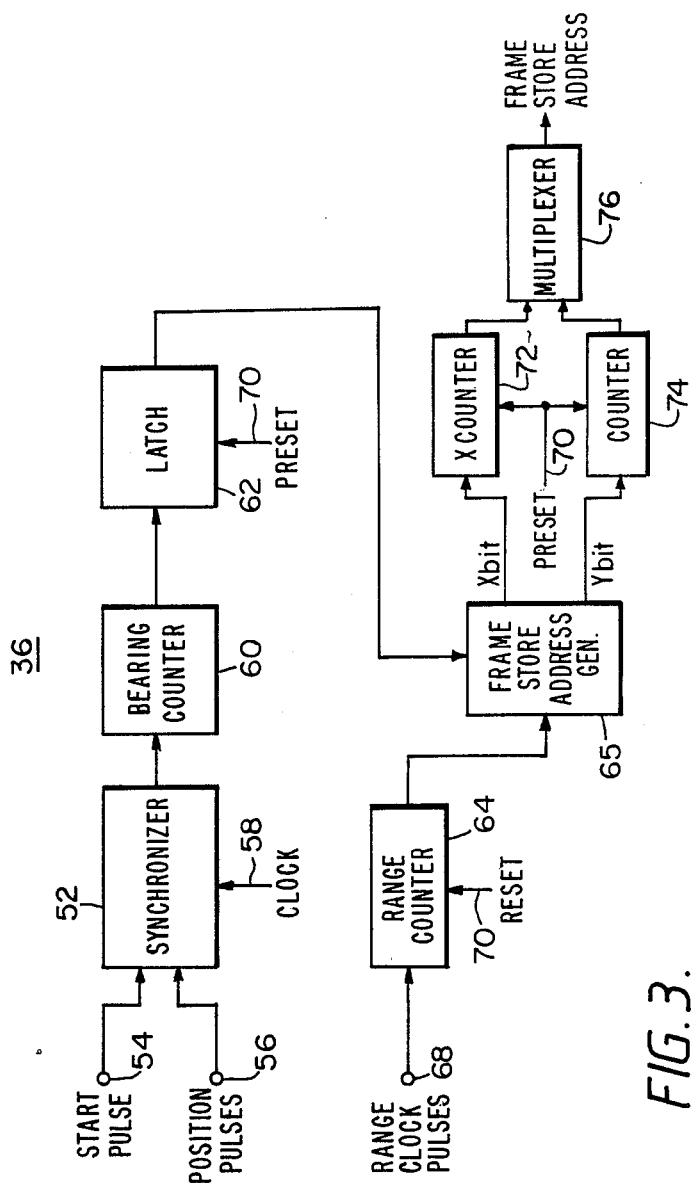
FIG. 3 is a block diagram of the address generator used with the present invention.

One embodiment of frame store address generator 36 that may be utilized with the present invention is illustrated in greater detail by the block diagram shown in FIG. 3. The frame store address generator is comprised of, for example, a synchronizer 52, a bearing counter 60, a latch circuit 62, a range counter 64, a frame store address generator 66, X and Y counters 72 and 74 and a multiplexer 76. Synchronizer 52 is coupled to input terminals 54 and 56 to receive a start pulse and position pulses, respectively. Synchronizer 52 also is coupled to a clock input 58 to receive clock pulses generated from, for example, a system clock of predetermined clock frequency. The synchronizer is adapted to generate pulses synchronized with the clock pulses supplied thereto in response to position pulses that are applied to input terminal 56 from radar scanner 32. These position pulses are generated by the radar scanner as the usual radar antenna rotates by predetermined angular increments. As an example 256 pulses might be applied to input terminal 56 as the antenna rotates by 45°. Thus, each position pulse may represent the angular increment of 45°/256.

Input terminal 54 is adapted to receive a "start" pulse when the radar antenna rotates to a predetermined reference position, such as a position of 0° with respect to the heading of the ship carrying the radar system. This start pulse serves to synchronize the operation of synchronizer 52 with respect to the 0° angular position of the radar antenna. As one example thereof, the synchronizer may comprise a suitable pulse generating circuit which functions to generates a pulse in response to a received position pulse at the time that a clock pulse is applied to clock input 58. Periodically, the application of a "start" pulse to input terminal 54 serves to adjust or compensate for any errors in synchronism that might be present.

The pulses generated by synchronizer 52 are coupled to bearing counter 60 which is adapted to generate a digital signal representing the count of the pulses applied thereto. This digital signal, which may be in BCD form, hexadecimal form, or other desired digital format, provides an instantaneous count representing the angular position of the radar antenna. In one embodiment, separate count pulses are provided by bearing counter 60 to represent the particular quadrant in which the radar antenna is positioned, and an additional count pulse is provided to represent whether the count produced in response to the pulses supplied by synchronizer 52 is in the range 0°–45° or 45°–90° of that quadrant. The remainder of the count provided by bearing counter 60 may be, for example, an 8-bit BCD or hexadecimal count representing the instantaneous angular position of the antenna from 0° to 45°. Of course, if desired, bearing counter 60 may provide an 11-bit digital count (or any desired number of bits) representing the instantaneous angular position of the antenna as that antenna rotates.

Latch circuit 62 is coupled to bearing counter 60 and is adapted to store temporarily the count provided by the bearing counter. A preset terminal 70 may be coupled to latch circuit 62 for the purpose of loading a preset count into the latch circuit. This preset count represents the address of a predetermined storage location in frame store 18 corresponding to the center of the video display screen. It is recognized that the center of the video display screen represents the location within the radar detection field of the ship carrying the radar system. The count stored in latch circuit 62 is applied to frame store address generator 66.

Range counter 64 is coupled to an input terminal 68 to which range clock pulses are applied. These pulses may be generated by the system clock and each pulse is adapted to represent a predetermined range increment. Range counter 64 is adapted to count these range clock pulses such that the count exhibited by the range counter represents the range or distance from the ship carrying the radar system to an expected target. Thus, it is seen that the instantaneous count of the range counter at the time that an echo signal is received represents the distance of the ship to that target.

Ranger counter 64 is coupled to preset terminal 70 to receive the preset signal that also is supplied to latch circuit 62. This preset signal serves to load a predetermined count into range counter 64 representing the storage location in frame store 18 that corresponds to the center of the radar display screen. It is appreciated, therefore, that latch circuit 62 and range counter 64 may be preset to counts which, in combination, identify the center of the display screen. The range counter is coupled to frame store address generator 66 to supply a digital range count wich may consist of, for example, six bits.

Frame store address generator 66 may comprise a read only memory (ROM) that functions as a look-up table to generate x, y addresses in response to the bearing and range counts supplied thereto by latch circuit 62 and range counter 64, respectively. Thus, for each combination of a bearing count and a range count, the ROM included in frame store address generator 66 is addressed to read out therefrom the x, y address of frame store 18 that corresponds to the particular bearing represented by the bearing count and the particular range represented by the range count. In this manner, the polar coordinate range and bearing data is converted, in accordance with the stored look-up table, into x, y cartesian coordinates.

Frame store address generator 66 also includes a multiplexer (not shown) supplied with the output of the ROM location that has been addressed by the bearing and range counts. For each increment in the range count produced by range counter 64, with the bearing count temporarily stored in latch circuit 62, two bits of the data read out from the ROM are selected at the X and Y outputs of this multiplexer, these outputs being illustrated as the X and Y outputs of frame store address generator 66. The X bit output, as illustrated, is coupled to an "X" counter and, similarly, the illustrated Y bit output is coupled to a "Y" counter 74. When, for example, a binary "1" is present at the X bit output, X counter 72 is incremented; and, similarly, when a binary "1" is present at the Y bit output, the count of Y counter 74 is incremented. Thus, as the counts of the X and Y counters 72 and 74 are incremented, successive X and Y addresses of frame store 18 are generated.

X counter 72 and Y counter 74 are coupled to preset terminal 70 to receive the aforementioned preset signal such that the counts of the X and Y counters may be preset to those counts which, in combination, identify the storage location of frame store 18 that corresponds to the center of the display screen. The counters thus may be loaded to this predetermined storage location and then incremented or decremented away from that location according to the data that is read out from the ROM included in frame store address generator 66.

X counter 72 and Y counter 74 are coupled to multiplexer 76 which functions to select the count produced by the X counter and then the count produced by the Y counter in sequence. The selected count is supplied to frame store 18 and presents the X address and then the Y address to the frame store. Thus, the counts of the X and Y counters, as selected by multiplexer 76, generate the x, y address of the frame store, whereby the pixel signal that is produced at the time that each x, y address is generated is written into that address.

It is believed that the operation of the frame store address generator illustrated in FIG. 3 will be readily apparent from the preceding discussion without further description. It is, of course, appreciated that as the radar antenna rotates, bearing counter 60 is incremented to provide a count which is latched in latch circuit 62 representing the instantaneous angular position of the antenna. Furthermore, with each increment in the bearing count, range counter 64 counts the range clock pulses supplied to input terminal 68 such that the count of this range counter is incremented from, for example, a minimum count (e.g. a count of 0) to a maximum count (e.g. a count of 256). The latched bearing count is combined with the incrementing range count to provide addresses for the ROM included in frame store address generator 66. The data which is addressed is read out of the ROM, and this data is used to increment the X counter 72 and the Y counter 74, as described above. The x and y counts are supplied by multiplexer 76 to frame store 18 as successive x, y addresses. The pixel signals which may (or may not) be present at the time each x, y address is generated is written into the addressed storage location of the frame store.

Periodically, latch 62, range counter 64 and the X and Y counters 72 and 74 are preset to effect the generation of the x, y address corresponding to the center location of the radar display screen. As mentioned above, the x and y counts are incremented or decremented from this preset count, and this corresponds to the incremental angular movement of the radar antenna and increasing range at which returned echo signals are expected.

Figure 4:
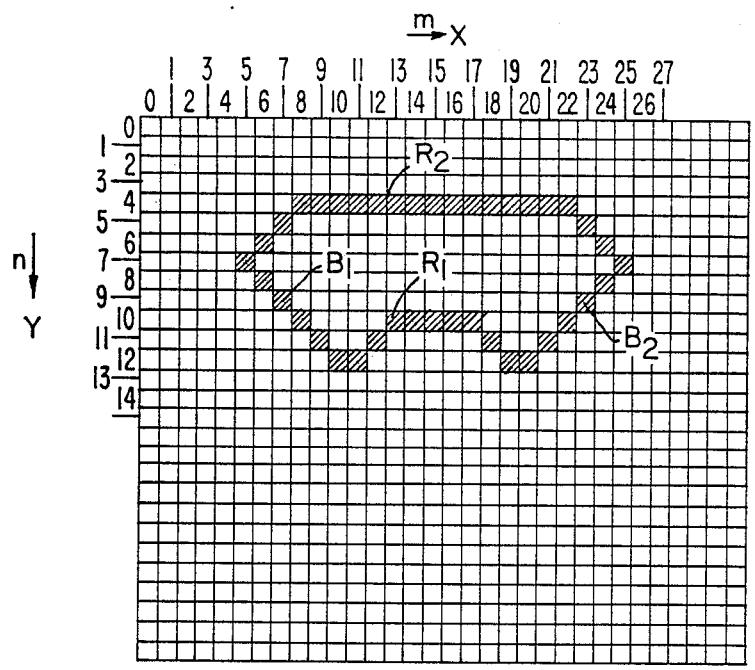
FIG. 4 is a schematic representation of the frame store and the manner in which digital signals are stored therein.

A schematic representation of the n×m array comprising frame store 18 is illustrated in FIG. 4. As shown, the frame store may be thought as a RAM having n rows and m columns, the intersection of each column and row defining a storage location that is addressable by an address (x, y) wherein the notation "x" designates the particular column and the notation "y" designates the particular row of that storage location. Of course, the x portion of the address is generated by X counter 72 and the y portion of the address is generated by Y counter 74, shown in FIG. 3, for the purpose of generating a pixel signal write-in address. CPU 22 (FIG. 2) functions to generate the x, y addresses of the n×m frame store array for the purpose of writing into the frame store the graphic mark digital signals which represent the range markers, bearing markers and guard zone. As discussed above, this CPU also may generate the x, y read-out addresses for detecting the presence of pixel signals within the guard zone during an alarm mode of operation. Finally, video read address generator 38 (FIG. 2) may generate the x, y read-out addresses to read out the contents of the frame store for display on the radar display screen of display 20 (or 20').

As a simplified numerical example consistent with the schematic representation shown in FIG. 4, the guard zone, as selected by the actuation of keyboard 26 and the interaction therewith by CPU 22, is stored in frame store 18 by digital signals represented by the blackened boxes of particular storage locations shown in FIG. 4. For example, CPU 22 may generate digital signal write-in addresses (7, 5), (6, 6), (8, 6), (5, 7), (9, 7) and so on, each such address identifying the storage location in which the graphic display mark digital signal is written, resulting in the stored data configuration represented by FIG. 4.

When the radar display system is operated to establish and display the guard zone, the storage locations of the inner range marker $R_1$ are generated by CPU 22 and the digital signal [11] is stored at each such storage location. For example, the inner range marker is stored by writing the digital signal into storage locations (12, 10), (12, 11), (11, 12), (10, 13), and so on. Thereafter, the first bearing marker, represented as $B_1$, is written into the frame store by writing digital signals into storage locations (7, 5), (8, 6), (9, 7), and so on. It will be recognized that range marker $R_1$ may be written into the frame store prior to the writing therein of bearing marker $B_1$ or, if desired, the bearing marker may be written in first. Furthermore, range marker $R_1$ may be adjusted by actuating a range increment key or range decrement key on keyboard 26. In one embodiment, the rate at which the range marker is shifted from one set of storage locations to the next is dependent upon the duration that the increment or decrement key is depressed. That is, the longer the key is actuated, the faster the range marker is shifted. Similarly, bearing marker $B_1$ may be angularly shifted in the clockwise or counterclockwise direction by actuating a bearing increment key or a bearing decrement key, respectively, both provided on keyboard 26. Here too, the rate at which the bearing marker is shifted from one set of storage locations to the next is dependent upon the duration that the increment or decrement key remains depressed.

After the first range and bearing markers are established, a guard zone key to actuated on keyboard 26 and, thereafter, the aforementioned range increment/decrement keys and the bearing increment/decrement keys are actuated in the manner mentioned above to establish the outer range marker $R_2$ and the second bearing marker $B_2$ illustrated in FIG. 4. During the guard zone mode of operation, the actuation of the range increment key has the effect of commencing the second range marker from the storage locations which had been designated for storage of the first range marker. Similarly, actuation of the bearing increment key has the effect of generating write-in addresses commencing from the addresses at which the digital signals representing the first bearing marker $B_1$ are stored.

During the guard zone mode of operation, the displayed range and bearing markers $R_1$, $R_2$, $B_1$ and $B_2$ appear as broken lines. However, when the alarm mode of operation is selected, the guard zone outline is displyed as unbroken lines.

Although not shown in FIG. 4, it will be appreciated that, when a target is detected, several storage locations of the $n \times m$ array will have pixel signals written thereinto in response to the operation of the frame store address generator discussed above. Of course, in the absence of a detected target, pixel signals of value [00] are written into the addressed storage locations.

The contents of the frame store shown in FIG. 4 are displayed by reading out successive locations addressed by video read address generator 38 (FIG. 2). As an example, the frame store may be addressed successively and sequentially from location (0, 0), (0, 1), (0, 2), and so on up to (255, 511). The last address identifies the storage location in the lower-most right-hand corner of the illustrated $n \times m$ array. As each addressed storage location is read out, the contents thereof are displayed. As mentioned above, pixel signals are stored with values [01] or [10], depending upon the intensity of the returned echo signal; and graphic display marks used to display the range and bearing markers and the guard zone are represented as [11]. FIG. 1 illustrates a typical radar display provided on the radar display screen, this display illustrating the guard zone, targets disposed within the guard zone and other objects within the range of detection of the radar system but outside the established guard zone. It is recognized that this display is contstituted by the data stored in the frame store.

In one embodiment of this invention, CPU 22 functions to detect the presence of a target within the guard zone illustrated in FIG. 4 by reading out the contents of those storage locations which, in the schematic illustration, are disposed along successive radial lines from, for example, the left-most side of the illustrated guard zone to the right-most side thereof. For example, CPU 22 may generate successive addresses (7, 6), (8, 7), (9, 8), and so on, these addresses appearing along a radial line of preset bearing. If any of the storage locations along this radial line at this bearing contain pixel signals of preestablished value, i.e. pixel signals of value [01] or [10], a verification operation is carried out to determine if that pixel signal is derived from a target. After the storage locations along this radial line are read out, CPU 22 generates the addresses of storage locations which appear to lie along a radial line shifted from the preceding radial line by a predetermined angular amount. For example, the storage locations which lie along successive radial lines, or bearings, having an angular separation of 0.25° or 0.5° or 1° or any other desired angular amount may be addressed by the CPU.

Figure 5:
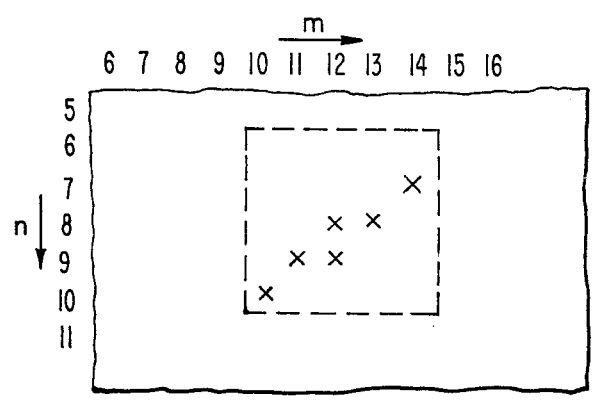
FIG. 5 is a schematic representation of the manner in which pixel signals stored in the frame store are verified as being derived from actual targets.

FIG. 5 is a schematic representation that may be helpful in understanding the manner in which a detected target pixel signal is verified as being derived from a target. FIG. 5 schematically represents a portion of the $n \times m$ array shown more completely in FIG. 4. As an example, the portion of the frame store array shown in FIG. 5 may extend from row 5 to row 11 and from column 6 to column 16. It is further assumed that pixel signals of value [01] or [10] are stored in those storage locations in which the row and column intersection are designated by "X".

Now, when the storage locations along a bearing line are addressed and read out by CPU 22, the value of the contents of each such read out location is detected. As an example, let it be assumed that, during such a read-out operation, the pixel signal of appropriate value (i.e. value [01] or [10]) is read out from storage location (8, 12). CPU 22 then generates the addresses of those storage locations comprising a 5×5 array with storage location (8, 12) in which the detected pixel signal is stored being disposed at the center of this 5×5 array. Then, the density of pixel signals stored in this 5×5 array is sensed. This density sensing is achieved by reading out the contents of each storage location included in this 5×5 array, detecting the storage of a pixel signal of appropriate value in such storage locations and counting the number of such detected pixel signals that are read out. If the count of such read out pixel signals exceeds a predetermined number, for example, if at least six pixel signals are stored in this 5×5 array, the pixel signal which had been detected at storage locations (8, 12) is verified as being derived from a target. Consequently, a suitable alarm indication is provided.

The aforedescribed density sensing operation is carried out during the alarm mode of operation each time that a pixel signal of appropriate value is read out from a storage location disposed along an addressed bearing line. That is, each time CPU 22 generates the addresses of those storage locations which constitute a bearing line, tthe aforementioned density sensing operation is carried out if a pixel signal of appropriate value is detected.

In the best mode presently contemplated for the present invention, the variable range and electronic bearing markers are generated and controlled by way of CPU 22 which, for example, may comprise an Intel Model 8051 microprocessor. Likewise, the manner in which the guard zone is set and deactivated, and the manner in which the alarm mode of operation is carried out likewise is implemented under the control of the microprocessor. Examples of suitable software listings by which the aforementioned operations are executed are set out below.

Those listings also incorporate a further novel feature, as follows. It was described in relation to FIG. 4 how under control of the CPU the contents of the guard zone storage locations are read out along successive radial lines in searching for target pixel signals. During this process, each storage location found to have a value [00] is written with a value [11]. Thus each storage location along a radial line, except those which may contain target information, is written [11] as that radial line is being searched. After the search of that line is complete, and before the search of the next successive radial line starts, all its [11] values are erased i.e. replaced by [00] so as to restore those storage locations to their original state. The result on the display is that a radial line sweeps angularly through the guard zone so long as the guard zone is being searched, and this serves as reassurance and confirmation that the system is operating, for the user.

While the present invention has been particularly shown and described with reference to a preferred embodiment, it will be appreciated by those of ordinary skill in the art that various changes and modifications may be made. For example, the frame store need not be limited solely to an n×m array constituted by 256 rows and 512 columns. A greater or lesser number of rows and columns may be utilized, if desired. Also, rather than converting the received radar data from polar coordinate form to cartesian coordinate form, the frame store may be thought of as being comprised of a polar-addressed memory in which the storage locations to which pixel and digital signals are written are addressed by suitable polar addresses. Still further, if desired, the write-in operation of target-derived pixel signals and graphic display mark digital signals may be executed by a common write-in circuit with a common address generator which, effectively, is shared to achieve the writing in of both types of data. While these are just some changes and modifications that are described specifically, others are contemplated and still others will become apparent to those of ordinary skill in the art.

```
ASM
V01.08-56   (8560)

; Name : gdsetv
                ;
                ;*****************************************
                ;*                                       *
                ;*          GUARD ZONE SETTING           *
                ;*              VRM MOVEMENT             *
                ;*                                       *
                ;*****************************************

; Contains the following entry points :

GLOBAL  GVRMINCR          ; entry point for VRM increment when
                                            ; in guard zone mode
                  GLOBAL  GVRMDECR          ; entry point for VRM decrement when
                                            ; in guard zone mode ; internally defined routines

GLOBAL  SETVECT

; The following are defined externally :

; external routines

GLOBAL  WR_EBM            ; writes/erases EBM
                  GLOBAL  RING              ; writes/erases circle drawn
                                            ; around radar screen centre
                  GLOBAL  W_11,W_00         ; set data lines to memory to
                                            ; 1's and 0's respectively
                  GLOBAL  POINT             ; calculates addresses
                  GLOBAL  RAD               ; writes to the frame store
                  GLOBAL  BINBCD
                  GLOBAL  W_NUMBER
                  GLOBAL  SUBTRACT          ; subtracts 2 16 bit numbers
                  GLOBAL  VRMSTEP
                  GLOBAL  TERMINATE         ; key response termination
                  GLOBAL  DISTWRITE,UNITWRITE ; external variables GLOBAL  GDZDRAWN
                  GLOBAL  ANGLE1,ANGLE0
                  GLOBAL  E_WEDM,E_WVRM
                  GLOBAL  NEWCBM1,NEWCBM0
                  GLOBAL  EBMB1,EBMB0
                  GLOBAL  EBMM1,EBMM0
                  GLOBAL  EBMF1,EBMF0
```

```
53          GLOBAL   F_TMER1,F_TMER0
54          GLOBAL   KEY_VALUE
55          GLOBAL   ANY_KEY
56          GLOBAL   VRMA1,VRMA0,VECTOR,RANGE,R_RING
57          GLOBAL   VRMB1,VRMB0
58          GLOBAL   FLAG1,BBCD0
59          GLOBAL   MSKRAH,RAHL,RAHH
60          GLOBAL   G_ZONE
61          GLOBAL   ALARM
62          GLOBAL   GDZOUTER
63
64          ; external constants
65
66          GLOBAL   DASH            ; EBH dash length
67          GLOBAL   MAXRANG         ; maximum radius of VRM on screen
68          GLOBAL   VRMXN,VRMYN,VRMXU,VRMYU
69          GLOBAL   NINETYDEG
70
71
72
73    90    P1.0     EQU     90H
74    91    P1.1     EQU     91H
75    92    P1.2     EQU     92H
76    93    P1.3     EQU     93H
77    94    P1.4     EQU     94H
78    95    P1.5     EQU     95H
79    96    P1.6     EQU     96H
80    97    P1.7     EQU     97H
81
82    E0    ACC.0    EQU     0E0H
83    E1    ACC.1    EQU     0E1H
84    E2    ACC.2    EQU     0E2H
85    E3    ACC.3    EQU     0E3H
86    E4    ACC.4    EQU     0E4H
87    E5    ACC.5    EQU     0E5H
88    E6    ACC.6    EQU     0E6H
89    E7    ACC.7    EQU     0E7H
90
91
92
93                  SECTION GUARDZV,CLASS=CODE
94
95          ; This module runs once the guard zone mode has been entered. The
96          ; functions of the EBM and VRM keys change in order to allow the
97          ; extent of the zone to be set.
98          ;
99          ; The original EBM and VRM are now frozen, and both drawn in dotted
100         ; lines. This module allows a second VRM to be moved to
101         ; create the guard zone.
102         ;
103         ; When the alarm becomes set, the guard zone must then be frozen,
104         ; and the search commences. So any depression of the EBM or VRM keys
105         ; is then ignored.
106
```

```
107
108
109
110
111
112                                    ; Angle of original EBM in NFWFBM1:NEWEBM0
113                                    ; Angle of original EBM + 360 degrees in EBMP1:EBMP0
114                                    ; Angle of original EBM - 360 degrees in EBMM1:EBMM0
115                                    ; Angle of second EBM in EBMB1:EBMB0
116
117                                    ; Position of original VRM in VRMA1:VRMA0
118                                    ; Position of second VRM in VRMB1:VRMB0
119
120
121
122                                    ; VRM increment entry point
123
124
125
126                         GVRMINCR
127
128
                                       ; do nothing if the alarm is set
129
130  00000000 300006     R              JNB    ALARM,GVRMINCR60
131
132                                    ; alarm is set ; exit if key depression has ended
133
134  00000003 2000FA     R              JB     ANY_KEY,GVRMINCR
135  00000006 020000     RU             JMP    TERMINATE              ; end as soon as the key is released
136
137                         GVRMINCR60
138
139  00000009 C200       RU             CLR    GDZDRAWN               ; make sure that the guard zone is
140                                                                   ; drawn (or redrawn) after moving it
141                                                                   ; in this module, by indicating that
142                                                                   ; it can no longer be
143                                                                   ; considered "drawn"
144
145  0000000B E500       RU             MOV    A,VRMB1                ; sets VECTOR for VRM B
146  0000000D B500F0     R              MOV    B,VRMB0                ; VECTOR is left set to this value
147  00000010 120120     R              CALL   SETVECT                ; until the key is released
148
149
150
151                         GVRMINCR2
152
153                                    ; Erase current VRM
154
155
156
157  00000013 120000     RU             CALL   W_00                   ; want to write zeros into
158                                                                   ; the frame store
159  00000016 D200       RU             SETB   E_WVRM                 ; set for continuous VRM
160
```

| | | | | | | |
|---|---|---|---|---|---|---|
| 161 | | | | | | |
| 162 | 0000018 120000 | RU | | CALL | RING | ; erase old VRH B |
| 163 | | | | | | |
| 164 | | | | ; redraw VRH A (the original) | | |
| 165 | 0000001B C200 | | | CLR | E_VRH | ; set for dotted VRH |
| 166 | 0000001D 12010D | R | | CALL | REDRVRH | |
| 167 | | | | | | |
| 168 | | | | | | |
| 169 | | | GVRMINCR50 | | | |
| 170 | | | | | | |
| 171 | | | | | | |
| 172 | | | | ; repair the hole(s) in the EBM(s) | | |
| 173 | | | | | | |
| 174 | 00000020 1200E7 | R | | CALL | REPAIR_EBMS | |
| 175 | | | | | | |
| 176 | | | | | | |
| 177 | | | | ; increment VRH value by an amount depending on the | | |
| 178 | | | | ; length of time the key has been depressed | | |
| 179 | | | | | | |
| 180 | 00000023 120000 | RU | | CALL | VRMSTEP | ; step size in A |
| 181 | 00000026 2500 | RU | | ADD | A,VECTOR | |
| 182 | | | | | | |
| 183 | | | | ; check for overflow | | |
| 184 | | | | | | |
| 185 | 00000028 C0E0 | | | PUSH | ACC | |
| 186 | 0000002A 9400 | RU | | SUBB | A,#MAXRANG | |
| 187 | 0000002C D0E0 | | | POP | ACC | |
| 188 | | | | | | |
| 189 | 0000002E 4002 | | | JC | GVRMINCR40 | ; jump if no overflow |
| 190 | | | | | | |
| 191 | 00000030 7400 | RU | | MOV | A,#MAXRANG | ; if overflow |
| 192 | | | | | | |
| 193 | | | GVRMINCR40 | | | |
| 194 | | | | | | |
| 195 | 00000032 F500 | RU | | MOV | VECTOR,A | |
| 196 | | | | | | |
| 197 | | | | ; now write VRH, update screen display and check if we have | | |
| 198 | | | | ; finished | | |
| 199 | | | | | | |
| 200 | 00000034 120071 | R | | CALL | DO_GVRM | |
| 201 | | | | | | |
| 202 | 00000037 80DA | | | JMP | GVRMINCR2 | ; continue if key is still depressed |
| 203 | | | | | | |
| 204 | | | | ; VRH decrement entry point | | |
| 205 | | | | | | |
| 206 | | | GVRMDECR | | | |

```
215                                      ; do nothing if the alarm is set
216
217   00000039 300006     R              JNB     ALARM,GVRMDECR60
218
219                                      ; alarm is set ; exit if key depression has ended
220
221   0000003C 2000FA     R              JB      ANY_KEY,GVRMDECR    ; end as soon as the key is released
222   0000003F 020000     RU             JMP     TERMINATE
223
224                        GVRMDECR60
225
226   00000042 C200       RU             CLR     GDZDRAWN            ; make sure that the guard zone is
227                                                                  ; drawn (or redrawn) after moving it
228                                                                  ; in this module, by indicating that
229                                                                  ; it can no longer be
230                                                                  ; considered 'drawn'
231
232   00000044 E500       RU             MOV     A,VRMB1             ; sets VECTOR for VRM B
233   00000046 B500F0     R              MOV     B,VRMB0             ; VECTOR is left set to this value
234   00000049 120120     R              CALL    SETVECT             ; until the key is released
235
236
237
238
239                        GVRMDECR2
240
241
242                                      ; Erase current VRM
243
244
245
246   0000004C 120000     RU             CALL    W_00                ; want to write zeros into
247                                                                  ; the frame store
248   0000004F D200       RU             SETB    E_WVRM              ; set for continuous VRM
249
250   00000051 120000     RU             CALL    RING                ; erase old VRM
251
252                                      ; redraw the original VRM
253
254   00000054 C200       RU             CLR     E_WVRM
255   00000056 120100     R              CALL    REDRVRM
256
257
258
259
260                        GVRMDECR50
261
262                                      ; repair the hole(s) in the EBM(s).
263
264   00000059 1200E7     R              CALL    REPAIR_EBMS
265
266
267                                      ;------------------------------------------------
268
269                                      ; decrement VRM value by an amount depending on the
```

```
270
271                                  ; length of time the key has been depressed
272  0000005C 120000    RU    CALL    VRMSTEP         ; step size in R0
273
274                                  ; position = position - step
275
276  0000005F C3              CLR     C
277  00000060 F5F0            MOV     B,A
278  00000062 E500    RU      MOV     A,VECTOR        ; step size
279  00000064 95F0            SUBB    A,B
280
281  00000066 5002            JNC     GVRMDECR40      ; jump if no overflow
282
283  00000068 7400            MOV     A,#0            ; if underflow, it hits the end stop
284          GVRMDECR40
285
286
287  0000006A F500    RU      MOV     VECTOR,A
288
289
290                                  ; now write VRM, update screen display and check if we have
291                                  ; finished
292
293
294  0000006C 120071  R       CALL    DO_GVRM
295
296  0000006F 80DB            JMP     GVRMDECR2       ; continue if key is still depressed
297
298
299                                  ;
300                                  ; DO_VRM : draws the VRM, updates the numerical indication of the
301                                  ; VRM position, and exits if key depression has ended.
302                                  ;
303
304                                  ; returns :    key code in A
305                                  ;
306          DO_GVRM
307  00000071 120000  RU      CALL    W_11            ; write 1's into frame store
308
309  00000074 120000  RU      CALL    RING
310
311                                  ; update numerical indication here
312
313
314                                  ; first calculate VRM range from position on screen
315  00000077 E500            MOV     A,VECTOR
316  00000079 75F000          MOV     B,#0            ; VECTOR in B:A
317
318  0000007C A800    RU      MOV     R0,RANGE
319
320          DO_GVRM11
321  0000007E D003            DJNZ    R0,DO_GVRM12
322  00000080 02008C          JMP     DO_GVRM10
323
```

```
324
325  000000B3 C3              DO_GVRM12  CLR    C
326
327  000000B4 33                         RLC    A
328  000000B5 C5F0                       XCH    A,B
329  000000B7 33                         RLC    A
330  000000B8 C5F0                       XCH    A,B
331
332  000000BA B0F2                       JMP    DO_GVRM11
333
334             DO_GVRM10
335
336  000000BC F500           RU          MOV    VRMB0,A
337  000000BE B5F000         RU          MOV    VRMB1,B
338
339                                      ; write position of VRM B to display
340
341  00000091 750000         RU          MOV    RAMH,#VRMYN              ; Y position
342  00000094 750000         RU          MOV    RAML,#LO(VRMXN)          ; LS byte of X position
343  00000097 7400           RU          MOV    A,#HI(VRMXN)
344  00000099 13                         RRC    A
345  0000009A 9200           RU          MOV    MSBRAM,C                 ; MS bit of X position
346
347  0000009C E500           RU          MOV    A,VRMB1
348  0000009E B500F0         R           MOV    B,VRMB0
349
350  000000A1 120000         RU          LCALL  DISTWRITE
351
352                                      ; write VRM B units to agree with number
353
354  000000A4 750000         RU          MOV    RAMH,#VRMYU              ; Y position
355  000000A7 750000         RU          MOV    RAML,#LO(VRMXU)          ; LS byte of X position
356  000000AA 7400           RU          MOV    A,#HI(VRMXU)
357  000000AC 13                         RRC    A
358  000000AD 9200           RU          MOV    MSBRAM,C                 ; MS bit of X position
359
360  000000AF E500           RU          MOV    A,VRMB1
361  000000B1 B500F0         R           MOV    B,VRMB0
362
363  000000B4 120000         RU          LCALL  UNITWRITE
364
365
366                                      ; check to see if key depression has ended
367                                      ; NB : this ignores another key if it has been pressed
368
369
370  000000B7 300001         R           JNB    ANY_KEY,VRM_EXIT         ; jump if key not being pressed
371
372  000000BA 22                         RET                             ; otherwise keep moving VRM
373
374
375                                      ; VRM_EXIT : leaves VRM routine
376
377
378
```

```
379                                         VRM_EXIT           ; terminate the key response :
380
381                                                            ; first restore the VRM position
382
383
384
385  000000BB E500          RU                    MOV     A,VECTOR
386  000000BD 75F000                              MOV     B,#0                ; VECTOR in B:A
387
388  000000C0 A800          RU                    MOV     R0,RANGE
389
390                                    GVRMEX1
391  000000C2 D803                                DJNZ    R0,GVRMEX2
392  000000C4 0200D0        R                     JMP     GVRMEX0
393
394                                    GVRMEX2
395  000000C7 C3                                  CLR     C
396
397  000000C8 33                                  RLC     A
398  000000C9 C5F0                                XCH     A,B
399  000000CB 33                                  RLC     A
400  000000CC C5F0                                XCH     A,B
401
402  000000CE B0F2                                JMP     GVRMEX1
403
404                                    GVRMEX0
405
406  000000D0 F500          RU                    MOV     VRMB0,A
407  000000D2 85F000        RU                    MOV     VRMB1,B
408
409                                               ; Then set the GOZOUTER flag to indicate which VRM is outermost.
410                                               ; It is set here as well as at the end of the setting
411                                               ; process, (i.e. in the alarm setting code), because the
412                                               ; range may be changed in the meantime and this information
413                                               ; is required then
414
415  000000D5 7800                                MOV     R0,#VRMB0
416  000000D7 7900                                MOV     R1,#VRMA0
417  000000D9 120000                              CALL    SUBTRACT
418
419  000000DC A2C7                                MOV     C,ACC.7
420  000000DE 9200          RU                    MOV     GOZOUTER,C          ; flag set if VRM B < VRM A,
421                                                                           ; i.e. if the second VRM has
422                                                                           ; been moved inside the first
423
424  000000E0 D0C0                                POP     ACC
425  000000E2 D0C0                                POP     ACC                 ; remove return address
426                                                                           ; from stack
427
428  000000E4 020000        RU                    JMP     TERMINATE           ; and end
429
430
431
432
```

```
433                                    ; Local routine REPAIR_EBMS
434                                    ;===============================
435                                    ;
436                                    ; Repairs the hole left in the EBMS by erasing the VRM.
437                                    ; Because the EBM is dotted, the EBMS only have to be repaired
438                                    ; when they happen to fall on the dashed part of the EBM.
439                                    ;
440                                    ;
441                              REPAIR_EBMS
442                                    ;
443                                    ; A VRM coincides with the 'dash' part of the EBM
444                                    ; when
445                                    ;
446                                    ;       INT((VECTOR-1)/dash length) is odd.
447                                    ;
448                                    ; where VECTOR is the position of the VRM circle
449                                    ; relative to the screen. The offset of -1 is because
450                                    ; the EBM dash is started with an offset of one from the centre.
451                                    ;
452                                    ;
453                                    ; work out if the VRM lies on a dash or not
454                                    ;
455
456   000000E7 E500         RU    MOV   A,VECTOR
457   000000E9 14           RU    DEC   A
458   000000EA 75F000       RU    MOV   B,#DASH          ; length of EBM dashes
459   000000ED 84                 DIV   AB
460
461                                    ; if the result is odd, then the EBMs must be repaired
462
463   000000EE 20E01B             JB    ACC.0,REPEBMS3   ; Jump if the VRM is between
464                                                      ; two dashes, and the EBMs
465                                                      ; do not have to be
466                                                      ; repaired
467
468                                    ;
469                                    ; FIX THE EBMS
470                                    ;
471
472
473   000000F1 120000       RU    CALL  W_11             ; write one's
474
475   000000F4 850000       RU    MOV   ANGLE1,NEWEBM1
476   000000F7 850000       RU    MOV   ANGLE0,NEWEBM0
477
478   000000FA 120000       RU    CALL  POINT
479   000000FD 120000       RU    CALL  RAD
480
481
482   00000100 850000       RU    MOV   ANGLE1,EBMB1     ; repair the hole in the original
483   00000103 850000       RU    MOV   ANGLE0,EBMB0     ; EBM
484
485   00000106 120000       RU    CALL  POINT
486   00000109 120000       RU    CALL  RAD              ; repair the hole in the second EBM
```

```
487
488
489                                        ; exit
490             REPEBMS3
491
492
493   0000010C 22                    RET
494
495
496                            ; Local routine REDRVRM ( REDRaw VRM )
497                            ; repaints the original VRM.
498
499
500             REDRVRM
501   0000010D C000          RU          PUSH    VECTOR              ; save the VECTOR set up for
502                                                                  ; VRM B
503
504   0000010E 120000        RU          CALL    M_11
505
506   00000112 E500          RU          MOV     A,VRMA1
507   00000114 0500F0        R           MOV     B,VRMA0
508   00000117 120120        R           CALL    SETVECT             ; set VECTOR for VRM A
509
510   0000011A 120000        RU          CALL    RING                ; draw it
511
512   0000011D D000          RU          POP     VECTOR              ; restore the VECTOR set up for
513                                                                  ; VRM B
514
515
516   0000011E 22                        RET
517
518
519
520                            ; routine SETVECT
521                            ; ================
522                            ;
523                            ; Sets VECTOR to the correct value, depending on
524                            ; the range and the VRM position, which is passed
525                            ; in A:B
526                            ;
527                            ; returns :               VECTOR in A:B
528                            ;
529             SETVECT
530
531                            ; This routine relies on the fact that the ranges
532                            ; go up in binary increments
533
534
535
536   00000120 AB00          RU          MOV     R0,RANGE            ; value from 1 to 7
537                                                                  ; corresponding to a range of
538                                                                  ; 0.25 to 16 nm
539
540             SETVECT1
```

```
541  00000122 D803              DJNZ   R0,SETVECT2
542  00000124 020130  R          JMP    SETVECT3        ; jump when scaling is complete
543
544                  SETVECT2
545
546                              ; vrm_pos = vrm_pos / 2
547  00000127 C3                 CLR    C
548
549  00000128 13                 RRC    A
550  00000129 C5E0               XCH    A,B
551  0000012B 13                 RRC    A
552  0000012C C5F0               XCH    A,B
553
554  0000012E 80F2               JMP    SETVECT1
555
556                  SETVECT3
557  00000130 85F000  RU         MOV    VECTOR,B
558
559  00000133 22                 RET
560
561
562
563                              END
```

Scalars

| | | | | |
|---|---|---|---|---|
| ACC.0-----------00000000E0 | ACC.1-----------00000000E1 | ACC.2-----------00000000E2 | ACC.3-----------00000000E3 | |
| ACC.4-----------00000000E4 | ACC.5-----------00000000E5 | ACC.6-----------00000000E6 | ACC.7-----------00000000E7 | |
| P1.0-----------00000090 | P1.1-----------00000091 | P1.2-----------00000092 | P1.3-----------00000093 | |
| P1.4-----------00000094 | P1.5-----------00000095 | P1.6-----------00000096 | P1.7-----------00000097 | |

Section = GUARDZV, Class = CODE, Byte Relocatable, Size = 00000134

| | | | |
|---|---|---|---|
| DO_GVRM--------00000071 | DO_GVRM10------0000000C | DO_GVRM11------0000007E | DO_GVRM12------00000083 |
| GVRMDECR-------00000039 G | GVRMDECR2------0000004C | GVRMDECR40-----0000006A | GVRMDECR50-----00000059 |
| GVRMDECR60-----00000042 | GVRMEX0--------000000D0 | GVRMEX1--------000000C2 | GVRMEX2--------000000C7 |
| GVRMINCR-------00000000 G | GVRMINCR2------00000013 | GVRMINCR40-----00000032 | GVRMINCR50-----00000020 |
| GVRMINCR40-----00000009 | REDRUM---------00000100 | REPAIR_EBMS----000000E7 | REPEBMB1-------0000010C |
| SETVECT--------00000120 G | SETVECT1-------00000122 | SETVECT2-------00000127 | SETVECT3-------00000130 |
| VRM_EXIT-------000000BB | | | |

Section = IODSETVOBJ, Byte Relocatable, Size = EMPTY

Unbound Globals

| | | | |
|---|---|---|---|
| ALARM----------00000000 | ANGLE0---------00000000 | ANGLE1---------00000000 | ANY_KEY--------00000000 |

| | | | |
|---|---|---|---|
| BBCD0----------00000000 | BINBCD---------00000000 | DASH-----------00000000 | DISTURITE------00000000 |
| EBMB0----------00000000 | EBMB1----------00000000 | EBMM0----------00000000 | EBMM1----------00000000 |
| EBMP0----------00000000 | EBMP1----------00000000 | E_UEBM---------00000000 | E_UVRM---------00000000 |
| FLAG1----------00000000 | F_THER0--------00000000 | F_THER1--------00000000 | GDZDRAWN-------00000000 |
| GDZOUTER-------00000000 | G_ZONE---------00000000 | KEY_VALUE------00000000 | MAXRANG--------00000000 |
| MSBRAM---------00000000 | NEWEBM0--------00000000 | NEWEBM1--------00000000 | NINETYDEG------00000000 |
| POINT----------00000000 | RAMH-----------00000000 | RAML-----------00000000 | RANGE----------00000000 |
| RA0------------00000000 | RING-----------00000000 | R_RING---------00000000 | SUBTRACT-------00000000 |
| TERMINATE------00000000 | UNITWRITE------00000000 | VECTOR---------00000000 | VRMA0----------00000000 |
| VRMA1----------00000000 | VRMB0----------00000000 | VRMB1----------00000000 | VRMSTEP--------00000000 |
| VRMXN----------00000000 | VRMXU----------00000000 | VRMYN----------00000000 | VRMYU----------00000000 |
| UR_EBM---------00000000 | W_00-----------00000000 | W_11-----------00000000 | W_NUMBER-------00000000 |

563 Lines Read
563 Lines Processed

ASM  B051
V01.0B-56  (B560)                                    Page  1

```
  1   ; Name : gdsete
  2   ;
  3   ;
  4   ;*********************************************
  5   ;*                                           *
  6   ;*            GUARD ZONE SETTING             *
  7   ;*                                           *
  8   ;*********************************************
  9
 10   ;
 11   ; Contains the following entry points :
 12   ;
 13
 14          GLOBAL  GEBMINCR          ; entry point for EBM increment when
 15                                    ; in guard zone mode
 16          GLOBAL  GEBMDECR          ; entry point for EBM decrement when
 17                                    ; in guard zone mode
 18
 19   ;
 20   ; The following are defined externally :
 21   ;
 22        ; external routines
 23
 24          GLOBAL  UR_EBM            ; writes/erases EBM
 25          GLOBAL  RING              ; writes/erases circle drawn
 26                                    ; around radar screen centre
 27          GLOBAL  W_11,W_00         ; set data lines to memory to
 28                                    ; 1's and 0's respectively
 29          GLOBAL  POINT             ; calculates addresses
 30          GLOBAL  RA0               ; writes to the frame store
 31          GLOBAL  BINBCD
 32          GLOBAL  W_NUMBER
 33          GLOBAL  SUBTRACT          ; subtracts 2 16 bit numbers
 34
```

```
35              GLOBAL  ANGWRITE
36
37              GLOBAL  TERMINATE                    ; key response termination
38
39              ; external variables
40
41              GLOBAL  GDZDRAWN
42              GLOBAL  ANGLC1,ANGLEO
43              GLOBAL  E_WEBM,E_WVRM
44              GLOBAL  NEWCBM1,NEWEBMO
45              GLOBAL  EBMB1,EBMBO
46              GLOBAL  EBMM1,EBMMO
47              GLOBAL  EBMF1,EBMPO
48              GLOBAL  F_TMCR1,F_TMERO
49              GLOBAL  KEY_VALUE
50              GLOBAL  AN_KEY
51              GLOBAL  VRMA1,VRMAO,VECTOR,RANGE,R_RING
52              GLOBAL  VRMB1,VRMBO
53              GLOBAL  InIN1,BHCIO
54              GLOBAL  MEMKAM,RAMH,RAML
55              GLOBAL  G_ZONE
56              GLOBAL  ALARM
57
58              ; external constants
59
60              GLOBAL  DASH                         ; EBM dash length
61              GLOBAL  MAXRANG                      ; maximum radius of VRM on screen
62              GLOBAL  FBMXN,EBMYN
63              GLOBAL  NINETYDEG
64
65
66
67      90      P1.0    EQU     90H
68      91      P1.1    EQU     91H
69      92      P1.2    EQU     92H
70      93      P1.3    EQU     93H
71      94      P1.4    EQU     94H
72      95      P1.5    EQU     95H
73      96      P1.6    EQU     96H
74      97      P1.7    EQU     97H
75
76      E0      ACC.0   EQU     0E0H
77      E1      ACC.1   EQU     0E1H
78      E2      ACC.2   EQU     0E2H
79      E3      ACC.3   EQU     0E3H
80      E4      ACC.4   EQU     0E4H
81      E5      ACC.5   EQU     0E5H
82      E6      ACC.6   EQU     0E6H
83      E7      ACC.7   EQU     0E7H
84
85              ; Quadrant names
86              ;
87      11      FIRST   EQU     11H             ; 0 to 90 degrees
88
```

```
89              SECOND    EQU     22H       ; 90 to 180 degrees
90              THIRD     EQU     33H       ; 180 to 270 degrees
91              FOURTH    EQU     44H       ; 270 to 360 degrees
92
93
94              GDSTEP    EQU     8         ; angle increment = 2 degrees
95
96
97              ;        SECTION GUARDZC,CLASS=CODE
98
99              ;
100             ; This module runs once the guard zone mode has been entered. The
101             ; functions of the EBM and VRM keys change in order to allow the
102             ; extent of the zone to be set.
103             ;
104             ; The original EBM and VRM are now frozen, and both drawn in dotted
105             ; lines. This module allows a second EBM and VRM to be moved to
106             ; create the guard zone.
107             ;
108             ; When the alarm becomes set, the guard zone must then be frozen,
109             ; and the search commences. So any depression of the EBM or VRM keys
110             ; is then ignored
111             ;
112             ;
113             ;
114             ; Angle of original EBM in NEWEBM1:NEWEBM0
115             ; Angle of original EBM + 360 degrees in EBMP1:EBMP0
116             ; Angle of original EBM - 360 degrees in EBMM1:EBMM0
117             ; Angle of second EBM in EDMB1:EBMB0
118             ;
119             ; Position of original VRM in VRMA1:VRMA0
120             ; Position of second VRM in VRMB1:VRMB0
121             ;
122             ;
123             ; EBM increment entry point
124             ;
125
126                       GEBMINCR
127
128                                 JNB     ALARM,GEBMINCR40       ; do nothing if the alarm is set
129
130                                                                ; alarm is set : exit if key depression has ended
131  00000000 300006  R              JB      ANY_KEY,GEBMINCR
132  00000003 2000FA  R              JMP     TERMINATE             ; end as soon as the key is released
133  00000006 020000  RU
134
135                       GEBMINCR60
```

```
143                                    CLR     GDZDRAWN        ; make sure that the guard zone is
144                                                            ; drawn (or redrawn) after moving it
145                                                            ; in this module, by indicating that
146                                                            ; it can no longer be
147                                                            ; considered 'drawn'
148
149  0000000B C200         RU         CLR     E_VEBM           ; set for dotted EBM
150
151                             GEBMINCK2
152
153
154
155                                    ;
156                                    ; Erase current EBM
157                                    ;
158  0000000D 120000       RU         LCALL   W_00             ; want to write zeros into
159                                                            ; the frame store
160                                    ; angle = EBM B
161
162  00000010 850000       RU         MOV     ANGLE0,EBMB0
163  00000013 850000       RU         MOV     ANGLE1,EBMB1
164
165                                    ; erase old EBM if at a non-zero angle
166
167  00000016 E500         RU         MOV     A,ANGLE1
168  00000018 7004                    JNZ     GEBMINCR10
169  0000001A E500         RU         MOV     A,ANGLE0
170  0000001C 6003                    JZ      GEBMINCR11
171
172                             GEBMINCR10
173
174  0000001E 120000       RU         LCALL   WR_EBM           ; erase old EBM
175
176                             GEBMINCR11
177
178                                    ; redraw the original EBM
179
180  00000021 1200E2       R          LCALL   REDREBM
181
182
183
184                             GEBMINCR50
185
186                                    ; repair the hole(s) in the VRM(s)
187
188  00000024 1200B2       R          LCALL   REPAIR_VRMS
189
190                                    ;
191
192                                    ; increment EBM value
193
194                                    ; EBMB = angle + step
195
196  00000027 C3                       CLR     C
```

```
197                              MOV     A,EBMB0
198 0000002A 2408                ADD     A,#GDSTEP
199 0000002C F500                MOV     EBMB0,A
200 0000002E E500                MOV     A,EBMB1
201 00000030 3400                ADDC    A,#0
202 00000032 F500                MOV     EBMB1,A
203
204                              ; If EBMB1:EBMB0 > EBMP1:EBMP0 then we are crossing the
205                              ; original EBM again
206
207
208 00000034 7800                MOV     R0,#EBMP0
209 00000036 7900                MOV     R1,#EBMB0
210 00000038 120000              LCALL   SUBTRACT
211
212 0000003B 5006                JNC     GEBMINCR16      ; jump if are not crossing the
213                                                      ; original EBM again
214
215                              ; stop the second EBM from crossing the original one again
216                              ; by setting EBMB1:EBMB0 = original EBM position + 360
217                              ; (i.e. hits the end stop.)
218
219 0000003D 850000              MOV     EBMB1,EBMP1
220 00000040 850000              MOV     EBMB0,EBMP0
221
222
223                      GEBMINCR16:
224                              ; now write EBM, update screen display and check if we have
225                              ; finished
226                              ;
227                              ;
228
229
230 00000043 120090      R       LCALL   DO_GEBM
231
232 00000046 80C5                JMP     GEBMINCR2       ; continue if key is still depressed
233
234                              ;
235                              ; EBM decrement entry point
236                              ;
237
238                      GEBMDECR:
239
240
241                              ; do nothing if the alarm is set
242
243 0000004B 300006      R       JNB     ALARM,GEBMDECR60
244
245                              ; alarm is set ; exit if key depression has ended
246
247 0000004B 2000FA      R       JB      ANY_KEY,GEBMDECR
248 0000004E 020000              JMP     TERMINATE       ; end as soon as the key is released
249
250                      GEBMDECR60:
```

| | | | | | | |
|---|---|---|---|---|---|---|
| 251 | | | | | | |
| 252 | 00000051 C200 | RU | | CLR | GDZDRAWN | ; make sure that the guard zone is |
| 253 | | | | | | ; drawn (or redrawn) after moving it |
| 254 | | | | | | ; in this module, by indicating that |
| 255 | | | | | | ; it can no longer be |
| 256 | | | | | | ; considered 'drawn' |
| 257 | | | | | | |
| 258 | 00000053 C200 | RU | | CLR | E_WEBM | ; set for dotted EBM |
| 259 | | | | | | |
| 260 | | | GEBMDECR2 | | | | |
| 261 | | | | | | | |
| 262 | | | | | | | |
| 263 | | | | ; | | | |
| 264 | | | | ; Erase current EBM | | | |
| 265 | | | | ; | | | |
| 266 | | | | | | | |
| 267 | 00000055 120000 | RU | | LCALL | W_00 | ; want to write zeros into |
| 268 | | | | | | ; the frame store |
| 269 | | | | | | |
| 270 | | | | ; angle = EBM B | | | |
| 271 | | | | | | | |
| 272 | 00000058 050000 | RU | | MOV | ANGLE0,EBMB0 | |
| 273 | 0000005B 850000 | RU | | MOV | ANGLE1,EBMB1 | |
| 274 | | | | | | | |
| 275 | | | | ; erase old EBM if at a non zero angle | | | |
| 276 | | | | | | | |
| 277 | 0000005E E500 | RU | | MOV | A,ANGLE1 | |
| 278 | 00000060 7004 | | | JNZ | GEBMDECR10 | |
| 279 | 00000062 E500 | RU | | MOV | A,ANGLE0 | |
| 280 | 00000064 6003 | | | JZ | GEBMDECR11 | |
| 281 | | | | | | | |
| 282 | | | GEBMDECR10 | | | | |
| 283 | | | | | | | |
| 284 | 00000066 120000 | RU | | LCALL | WR_EBM | ; erase old EBM |
| 285 | | | GEBMDECR11 | | | | |
| 286 | | | | | | | |
| 287 | | | | ; redraw the original EBM | | | |
| 288 | | | | | | | |
| 289 | 00000069 1200F2 | R | | LCALL | REDREBM | |
| 290 | | | | | | | |
| 291 | | | GEBMDECR50 | | | | |
| 292 | | | | | | | |
| 293 | | | | | | | |
| 294 | | | | | | | |
| 295 | | | | | | | |
| 296 | | | | ; repair the hole(s) in the VRM(s) | | | |
| 297 | | | | | | | |
| 298 | 0000006C 1200B2 | R | | LCALL | REPAIR_VRMS | |
| 299 | | | | | | | |
| 300 | | | | | | | |
| 301 | | | | | | | |
| 302 | | | | ; decrement EBM value | | | |
| 303 | | | | | | | |
| 304 | | | | ; EBMB = angle - step | | | |
| 305 | | | | | | | |

```
306
307
308  0000006F C3              CLR   C
309  00000070 E500       RU   MOV   A,EBMB0
310  00000072 9408            SUBB  A,#GDSTEP
311  00000074 F500       RU   MOV   EBMB0,A
312  00000076 E500       RU   MOV   A,EBMB1
313  00000078 9400            SUBB  A,#0
314  0000007A F500       RU   MOV   EBMB1,A
315
316                           ; If EBMB1:EBMB0 < EBMM1:EBMM0 then we are crossing the
317                           ; original EBM again
318  0000007C 7000       RU   MOV   R0,#EBMB0
319  0000007E 7900       RU   MOV   R1,#EBMM0
320  00000080 120000     RU   LCALL SUBTRACT
321
322
323  00000083 5006            JNC   GEBMDECR16      ; Jump if are not crossing the
324                                                 ; original EBM again
325
326                           ; stop the second EBM from crossing the original one again
327                           ; by setting EBMB1:EBMB0 = original EBM position - 360
328                           ; ( i.e. hits the end stop )
329
330  00000085 850000     RU   MOV   EBMB1,EBMM1
331  00000088 850000     RU   MOV   EBMB0,EBMM0
332
333
334                      GEBMDECR16:
335
336
337                           ; now write EBM, update screen display and check if we have
338                           ; finished.
339
340
341
342  0000008B 120090     R    LCALL DO_GEBM
343
344  0000008E 80C5            JMP   GEBMDECR2       ; continue if key is still depressed
345
346
347
348                           ; DO_EBM : draws the EBM, updates the numerical indication of the
349                           ; EBM position, and exits if key depression has ended.
350
351                           ; returns :      key code in A.
352
353
354                      DO_GEBM:
355  00000090 120000     RU   LCALL W_11                            ; write 1's into frame store
356
357                           ; angle = EBMB
358
359  00000093 850000     RU   MOV   ANGLE1,EBMB1
```

```
360                                     MOV     ANGLE0,EBMB0
361
362                                     ; write new EBM if at a non zero angle
363
364     00000099 E500           RU      MOV     A,ANGLE1
365     0000009B 7004           RU      JNZ     DO_GEBM10
366     0000009D E500           RU      MOV     A,ANGLE0
367     0000009F 6003                   JZ      DO_GEBM11
368
369                             DO_GEBM10
370
371     000000A1 120000         RU      LCALL   WR_CBM                  ; write new EBM
372
373                             DO_GEBM11
374
375                                     ; update numerical indication
376
377     000000A4 120000         RU      LCALL   ANGWRITE
378
379                                     ; check to see if key depression has ended
380                                     ; NB : this ignores another key if it has been pressed
381
382     000000A7 300001   R             JNB     ANY_KEY,EBM_EXIT        ; Jump if key not being pressed
383
384     000000AA 22                     RET                             ; otherwise keep moving EBM
385
386                                     ;
387                                     ; EBM_EXIT : leaves EBM routine
388                                     ;
389
390
391                             EBM_EXIT
392
393                                     ; terminate the key response :
394
395     000000AB D0E0                   POP     ACC
396     000000AD D0E0                   POP     ACC                     ; remove return address from stack
397
398     000000AF 020000         RU      JMP     TERMINATE               ; and end
399
400                                     ;
401                                     ; Local routine REPAIR_VRMS
402                                     ;
403
404                                     ;
405                                     ; Repairs the hole left in the VRMS by erasing the EBM.
406                                     ; Because the EBM is dotted, the VRMS only have to be repaired
407                                     ; when they happen to fall on the dashed part of the EBM.
408                                     ;
409
410                             REPAIR_VRMS
411
412                                     ;
413                                     ; A VRM coincides with the 'dash' part of the EBM
```

```
414                          ; when
415                          ;
416                          ;          INT((VECTOR-1)/dash length) is odd.
417                          ;
418                          ; ( and the VRM is not actually outside the current range. )
419                          ;
420                          ; where VECTOR is the position of the VRM circle
421                          ; relative to the screen. The offset of -1 is because
422                          ; the EBM dash is started with an offset of one from the centre.
423                          ;
424                          ;
425                          ;
426                          ; 2) calculate VECTOR ; the position of the VRM relative to the screen
427                          ;
428                          ;
429                          ; VRM position = VRMA1:VRMA0
430
431   000000B2 E500      RU         MOV     A,VRMA1
432   000000B4 8500F0    R          MOV     B,VRMA0
433
434   000000B7 1200C3    R          LCALL   FIXVRM
435
436                          ; VRM position = VRMB1:VRMB0
437
438   000000BA E500      RU         MOV     A,VRMB1
439   000000BC 8500F0    R          MOV     B,VRMB0
440
441   000000BF 1200C3    R          LCALL   FIXVRM
442
443   000000C2 22                   RET
444
445                          ;
446                          ; local routine FIXVRM ; fixes one VRM
447                          ;
448                          ; input parameters :   MS byte of VRM position in A
449                          ;                      LS byte of VRM position in B
450                          ;
451                          ;
452                      FIXVRM
453
454   000000C3 A800      RU         MOV     R0,RANGE
455
456                          ; the position on the screen is a function of the absolute
457                          ; VRM position and the range ;
458
459
460
461                          REFVRM1
462
463   000000C5 D803             DJNZ    R0,REFVRM2
464   000000C7 0200D3    R       JMP     REPVRM0
465
466                      REFVRM2
467
468   000000CA C3                   CLR     C
```

```
469            RRC   A
470 000000CB 13      XCH   A,B
471 000000CC C5F0    RRC   A
472 000000CE 13      XCH   A,B
473 000000CF C5F0
474 000000D1 80F2    JMP   REPVRH1
475                                REPVRH0
476
477                      ; 3) if the value in A:B is not <= MAXRANG, then the VRH is outside
478                      ;    the current range ; so there is no need to repair it
479
480
481 000000D3 B4001B  CJNE  A,#0,REPVRH3        ; jump if much greater than MAXRANG
482
483
484 000000D6 C3      CLR   C
485 000000D7 E5F0    MOV   A,B
486 000000D9 2401  RU SUBB  A,#(MAXRANG+1)
487 000000DB 5014    JNC   REPVRH3             ; jump if greater than MAXRANG
488
489                      ; put VECTOR in A
490
491 000000DD 2401  RU ADD   A,#(MAXRANG+1)
492 000000DF F500  RU MOV   VECTOR,A           ; update vector in case the VRH has
493                                            ;  to be repaired
494
495                      ; VRH is on the screen ; work out if it lies on a dash or not
496
497 000000E1 75F000 RU MOV   B,#DASH            ; length of EBM dashes
498 000000E4 84      DIV   AB
499
500                      ; if the result is odd, then the VRH must be repaired
501
502 000000E5 20E009    JB    ACC.0,REPVRH3      ; jump if the VRH is between
503                                             ;  two dashes, and does not have to be
504                                             ;  repaired
505
506
507                      ; FIX THE VRH
508                      ;
509                      ;
510
511 000000E8 120000 RU LCALL W_11                ; write one's (the VRH is not dotted)
512
513
514 000000EB 120000 RU LCALL FOINT
515 000000EE 120000 RU LCALL RAO                 ; repair the hole
516
517
518
519                 ; exit
520                                REPVRH3
521
522 000000F1 22      RET
523
```

```
524
525                         ; local routine REDREBM ( REDraw EBM )
526                         ; repaints the original EBM.
527                         ;
528
529                         REDREBM:
530
531                                         ; angle = NEWEBM1:NEWEBM0
532
533   000000F2 850000   RU          MOV     ANGLE1,NFWEBM1
534   000000F5 850000   RU          MOV     ANGLE0,NEWEBM0
535
536   000000F8 E500     RU          MOV     A,ANGLE1
537   000000FA 7004                 JNZ     REDREBM1
538   000000EC E500     RU          MOV     A,ANGLE0
539   000000FE 6006                 JZ      REDREBM2
540
541                         REDREBM1:
542                                         ; draw EBM A if at a non zero angle
543
544   00000100 120000   RU          LCALL   W_11
545   00000103 120000   RU          LCALL   WR_EBM           ; redraw it
546
547                         REDREBM2:
548                                         ; restore angle :
549
550
551   00000106 850000   RU          MOV     ANGLE1,EBMB1
552   00000109 850000   RU          MOV     ANGLE0,EBMB0
553
554
555   0000010C 22                   RET
556
557
558                                 END
559
Scalars
```

| | | | | | |
|---|---|---|---|---|---|
| ACC.0----------000000E0 | ACC.1----------000000E1 | ACC.2----------000000E2 | ACC.3----------000000E3 | | |
| ACC.4----------000000E4 | ACC.5----------000000E5 | ACC.6----------000000E6 | ACC.7----------000000E7 | | |
| FIRST----------00000011 | FOURTH---------00000044 | GDSTEP---------0000000B | P1.0-----------00000090 | | |
| P1.1-----------00000091 | P1.2-----------00000092 | P1.3-----------00000093 | P1.4-----------00000094 | | |
| P1.5-----------00000095 | P1.6-----------00000096 | P1.7-----------00000097 | SECOND---------00000022 | | |
| THIRD----------00000033 | | | | | |

Section = GUARDZE, Class = CODE, Byte Relocatable, Size = 0000010D

| | | | |
|---|---|---|---|
| DO_GEBM--------00000070 | DO_GEBM10------000000A1 | DO_GEBM11------000000A4 | EBM_EXIT-------000000AB |
| FIXVRM---------000000C3 | GEBMDECR-------000000AB | GEBMDECR10-----00000066 | GEBMDECR11-----00000069 |
| GEBMDECR16-----000000BB | GEBMDECR2------00000055 G | GEBMDECR50-----0000004C | GEBMDECR60-----00000051 |
| GEBMINCR-------00000000 | GEBMINCR10-----0000001E | GEBMINCR11-----00000021 | GEBMINCR16-----00000043 |
| GEBMINCR2------0000000D | GEBMINCR50-----00000024 | GEBMINCR60-----00000009 | REDREBM--------000000F2 |

| | | | | | |
|---|---|---|---|---|---|
| REDREDM1-----00000100 | REDREDM2-----00000106 | REPAIR_VRMS-----00000082 | REPURM0-----00000001 |
| REPVRM1------000000C5 | REPVRM2------000000CA | REPVRM3------000000F1 | | |

Section = Z, Byte Relocatable, Size = EMPTY

Unbound Globals

| | | | | | | | |
|---|---|---|---|---|---|---|---|
| ALARM-------00000000 | ANGLE0------00000000 | ANGLE1------00000000 | ANGURITE----00000000 |
| ANY_KEY-----00000000 | BBCD0-------00000000 | BBCD1-------00000000 | BINBCD------00000000 |
| DASH--------00000000 | EBMB0-------00000000 | EBMD1-------00000000 | EBMH0-------00000000 |
| EBMM1-------00000000 | EBMF0-------00000000 | EBMF1-------00000000 | EBMXN-------00000000 |
| EBMYN-------00000000 | E_UEBM------00000000 | E_UVRM------00000000 | F_TMER0-----00000000 |
| F_THER1-----00000000 | GUZURAUN----00000000 | G_ZONE------00000000 | KEY_VALUE---00000000 |
| MAXRANG-----00000000 | MSBRAM------00000000 | NEUEBM0-----00000000 | NEUEBM1-----00000000 |
| NINETYDEG---00000000 | POINT-------00000000 | RAMH--------00000000 | RAML--------00000000 |
| RANGE-------00000000 | RAD---------00000000 | RING--------00000000 | R_RING------00000000 |
| SUBTRACT----00000000 | TERMINATE---00000000 | VECTOR------00000000 | VRMA0-------00000000 |
| VRMA1-------00000000 | VRMB0-------00000000 | VRMH1-------00000000 | VR_EBM------00000000 |
| U_00--------00000000 | U_11--------00000000 | U_NUMBER----00000000 | |

559 Lines Read

ASM  B051
V01.08-56 (B560)

Page 1

```
 1    ; Name : point
 2    ;
 3    ;
 4    ;   **********************************************
 5    ;   *                                            *
 6    ;   *           ARITHMETIC MODULE                *
 7    ;   *                                            *
 8    ;   **********************************************
 9    ;
10    ; Routines in this module :
11    ;
12    ;
13            GLOBAL  POINT
14            GLOBAL  DIVIS            ; (R,theta) to (X,Y) conversion
15                                     ; for on screen graphics
16    ;
17    ;
18    ; Externally-defined variables :
19            GLOBAL  XTABLE
20            GLOBAL  ANGLE1,ANGLE0
21            GLOBAL  VECTOR
22
```

```
23           GLOBAL  DIVISOR
24           GLOBAL  XSIGN,YSIGN
25           GLOBAL  MSBRAM,RAMH,RAML
26
27           ;external constants
28
29           GLOBAL  NINETYDEG
30
31
32
33   90      P1.0    EQU     90H
34   91      P1.1    EQU     91H
35   92      P1.2    EQU     92H
36   93      P1.3    EQU     93H
37   94      P1.4    EQU     94H
38   95      P1.5    EQU     95H
39   96      P1.6    EQU     96H
40   97      P1.7    EQU     97H
41
42   E0      ACC.0   EQU     0E0H
43   E1      ACC.1   EQU     0E1H
44   E2      ACC.2   EQU     0E2H
45   E3      ACC.3   EQU     0E3H
46   E4      ACC.4   EQU     0E4H
47   E5      ACC.5   EQU     0E5H
48   E6      ACC.6   EQU     0E6H
49   E7      ACC.7   EQU     0E7H
50
51
52           SECTION POINTC,CLASS=CODE
53
54   ;*********************************************
55   ;*                                           *
56   ;*            SUBROUTINE POINT               *
57   ;*            =================              *
58   ;*                                           *
59   ;*  COORDINATE CALCULATION:                  *
60   ;*                                           *
61   ;*    X=[(VALUE FROM TABLE)*R*2/3/128]+/-194 *
62   ;*    Y=[(VALUE FROM TABLE)*(2/3)*R/128]+/-128*
63   ;*                                           *
64   ;*  VALUE FROM TABLE (X) = 192*SIN(THETA)    *
65   ;*  PARAMETERS ARE: 'ANGLE', 'VECTOR' , AND SUB-ROUTINE SIGN *
66   ;*  WHICH MUST BE CALLED FIRST.              *
67   ;*                                           *
68   ;*********************************************
69
70
71   ; The extra factor of 2/3 in the Y calculation is to compensate for the
72   ; aspect ratio of the screen. Although the aspect ratio of a CRT is 4:3,
73   ; the aspect ratio in question is that in the scan converter lookup table
74   ; in the hardware, which stores the X and Y map independently and has a
```

```
 76                                   ; scalefactor of 2/3 between them. The outermost circle has a radius of
 77                                   ; 192 in X and 128 in Y. The address of the centre pixel is (194,128).
 78                                   ;
 79
 80                                   ; input parameters :
 81                                   ;
 82                                   ; calls :              DIVIS
 83                                   ;
 84                                   ; returns :            R4,R3,R2 modified
 85                                   ;                      pixel address (x,y) in (RAMH,MSBRAM:RAML)
 86                                   ;                      where MSBRAM is a bit
 87                                   ;
 88
 89                            POINT
 90
 91  00000000 C000        RU     PUSH    ANGLE1
 92  00000002 C000        RU     PUSH    ANGLE0
 93
 94  00000004 900000      RU     MOV     DPTR,#XTABLE       ; points to sine table
 95
 96  00000007 C3                 CLR     C                                          ; save angle
 97
 98                                   ; Convert angle to lie in the range 0 to 90 and
 99                                   ; check which quadrant we are in :
100                                   ; if in 2 or 4 then angle = 90 - angle
101                                   ;
102                                   ; Quadrant is calculated by :
103                                   ;
104                                   ;    Quadrant = ( Angle MOD 90 degrees ) MOD 4
105                                   ;
106
107
108  00000008 7800              MOV     R0,#0              ; counter
109
110
111                            POINT01
112
113                                   ; angle = angle - 90 degrees
114  0000000A C3                 CLR     C
115  0000000B E500        RU     MOV     A,ANGLE0
116  0000000D 9400        RU     SUBB    A,#LO(NINETYDEG)
117  0000000F F500        RU     MOV     ANGLE0,A
118  00000011 E500        RU     MOV     A,ANGLE1
119  00000013 9400        RU     SUBB    A,#HI(NINETYDEG)
120  00000015 F500        RU     MOV     ANGLE1,A
121
122  00000017 08                 INC     R0                 ; count the number of quadrants
123                                                         ; we move through
124
125  00000018 30E7EE             JNB     ACC.7,POINT01      ; keep going until we move through
126                                                         ; the origin
127
128                                   ; repair the angle to lie in the range of 0 to 90 degrees
129
130  0000001B C3                 CLR     C
```

```
131  0000001C E500       RU    MOV    A,ANGLE0
132  0000001E 2400       RU    ADD    A,#LO(NINETYDEG)
133  00000020 F500       RU    MOV    ANGLE0,A
134  00000022 E500       RU    MOV    A,ANGLE1
135  00000024 3400       RU    ADDC   A,#HI(NINETYDEG)
136  00000026 F500       RU    MOV    ANGLE1,A
137
138                            ; R0 now contains the number of the quadrant : now
139                            ; remove multiples of 360 degrees
140
141
142  00000028 EB               MOV    A,R0
143  00000029 75F004           MOV    B,#4
144  0000002C 84               DIV    AB
145
146  0000002D E5F0             MOV    A,B
147  0000002F 7002             JNZ    POINTB20
148  00000031 7404             MOV    A,#4                ; remainder
149                                                      ; we are in the 4th quadrant
150
151                     POINTB20
152  00000033 F5E0             MOV    B,A                 ; save quadrant number
153
154                            ; set sign flags as follows :
155                            ;
156                            ; 1st quadrant : XSIGN = 1, YSIGN = 0
157                            ; 2nd quadrant : XSIGN = 1, YSIGN = 1
158                            ; 3rd quadrant : XSIGN = 0, YSIGN = 1
159                            ; 4th quadrant : XSIGN = 0, YSIGN = 0
160
161  00000035 A2E1             MOV    C,ACC.1
162  00000037 9200       RU    MOV    YSIGN,C
163  00000039 14               DEC    A
164  0000003A A2C1             MOV    C,ACC.1
165  0000003C B3               CPL    C
166  0000003D 9200             MOV    XSIGN,C
167
168
169  0000003F E5F0             MOV    A,B                 ; quadrant number
170  00000041 6402             XRL    A,#2
171  00000043 600C             JZ     POINT1              ; jump if in quadrant 2
172  00000045 E5F0             MOV    A,B
173  00000047 6404             XRL    A,#4
174  00000049 6006             JZ     POINT1              ; jump if in quadrant 4
175
176  0000004B AB00       RU    MOV    R3,ANGLE0
177  0000004D AC00       RU    MOV    R4,ANGLE1
178  0000004F 800A             SJMP   POINT2
179
180
181                     POINT1                            ; angle = 90 - angle
182
183
184  00000051 7400       RU    MOV    A,#LO(NINETYDEG)
```

```
185  00000053 9500        SUBB    A,ANGLE0
186  00000055 FB          MOV     R3,A
187  00000056 7400        MOV     A,#HI(NINETYDEG)
188  00000058 9500        SUBB    A,ANGLE1
189  0000005A FC          MOV     R4,A
190
191
192                POINT2
193                                ; angle now in R4:R3
194                                ; add the angle to the table base address to point to
195                                ; the table entry
196
197  0000005B C3          CLR     C
198  0000005C EB          MOV     A,R3
199  0000005D 3502        ADDC    A,DPL
200  0000005F F582        MOV     DPL,A
201  00000061 EC          MOV     A,R4
202  00000062 3503        ADDC    A,DPH
203  00000064 F583        MOV     DPH,A
204
205  00000066 C3          CLR     C
206  00000067 E4          CLR     A
207  00000068 93          MOVC    A,@A+DPTR           ; 192*SIN(THETA) in A
208  00000069 8500F0    R MOV     B,VECTOR            ; RADIUS in B
209  0000006C A4          MUL     AB                  ; R*(TABLE VALUE) in B:A
210
211                                ; Shift the result 4 to the right (truncate for speed).
212                                ; If we then regard the result as being in F2 format,
213                                ; we have divided by 64, which is equivalent to
214                                ; * 2 /128.
215
216
217
218  0000006D C3          CLR     C
219  0000006E 54F0        ANL     A,#0F0H             ; discard LS nibble
220  00000070 C5E0        XCH     A,B
221  00000072 13          RRC     A
222  00000073 C5F0        XCH     A,B
223  00000075 13          RRC     A                   ; shift once
224  00000076 C5F0        XCH     A,B
225  00000078 13          RRC     A
226  00000079 C5F0        XCH     A,B                 ; shift twice
227  0000007B 13          RRC     A
228  0000007C C5F0        XCH     A,B
229  0000007E 13          RRC     A                   ; shift three times
230  0000007F C5F0        XCH     A,B
231  00000081 13          RRC     A
232  00000082 C5E0        XCH     A,B
233  00000084 13          RRC     A                   ; shift four times
234  00000085 C5F0        XCH     A,B
235  00000087 13          RRC     A
236
237
238                                ; divide by 3 ( = 12 in F2 format )
239
```

```
240                                            MOV     DIVISOR,#12
241  0000008B  75000C    R                     XCH     A,B
242  0000008B  C5F0                             LCALL   DIVIS
243  0000008D  1200F6    R
244                                            ; R * (192 * sin(theta))/128 = 2/3 now in B, remainder in A
245                                            ;
246                                            ; now round the result up if the remainder > 1
247
248  00000090  C3                               CLR     C
249  00000091  9402                             SUBB    A,#2                  ; ignore error code
250  00000093  4002                             JC      POINT24
251  00000095  05F0                             INC     B
252                              POINT24
253  00000097  C3                               CLR     C
254
255                                            ; add offset of centre of circle
256
257  00000098  74C2                             MOV     A,#194                ; = 194
258
259  0000009A  200004    R                     JB      XSIGN,POINT5          ; jump if we are in quadrants
260                                                                           ; 1 or 2
261  0000009D  95F0                             SUBB    A,B
262  0000009F  8002                             SJMP    POINT6
263  000000A1  25F0                             ADD     A,B
                              POINT5
                              POINT6
264                                            ; X pixel address now in C:A
265                                            ; write it to MSBRAM:RAML
266
267
268  000000A3  F500                             MOV     RAML,A
269                                                                           ; LS 8 bits of result in A
270
271                                            ; MS bit of result in C
272  000000A5  C200      RU                     CLR     MSBRAH
273  000000A7  5002      RU                     JNC     POINT7
274  000000A9  D200      RU                     SETB    MSBRAH
275
276                                            ;
277                              ; CALCULATE Y , NOW
278                                            ;
279
280                              POINT7
281
282                                            ; get cosine(theta) = sin(90-theta),  i.e.
283                                            ; uses base value of (XTABLE + 90),
284                                            ; looking from the back of the table to the front
285  000000AB  900167    RU                     MOV     DPTR,#XTABLE+167H
286
287                                            ; pointer = pointer - theta
288
289  000000AE  C3                               CLR     C
290  000000AF  E582                             MOV     A,DPL
291  000000B1  9B                               SUBB    A,R3
292  000000B2  F582                             MOV     DPL,A
293  000000B4  E583                             MOV     A,DPH
```

```
294              SUBB   A,R4
295  000000B6 9C
296  000000B7 F583   MOV    DPH,A
297  000000B9 E4     CLR    A
298
299                  ; pointer now points to sin(90 - theta)
300  000000BA 93     MOVC   A,@A+DPTR          ; 192*SIN(90 - THETA)
301  000000BB 8500F0 R      MOV    B,VECTOR    ; radius
302  000000BE A4     MUL    AB                 ; R*(192*sin(90 - theta)) in B:A
303
304              ; Shift the result 3 to the right (truncate for speed).
305              ; If we then regard the result as being in F2 format,
306              ; we have divided by 64, which is equivalent to
307              ; R*4./128.
308
309
310
311  000000BF C3     CLR    C
312  000000C0 54F0   ANL    A,#0F0H            ; discard LS nibble
313  000000C2 C5F0   XCH    A,B
314  000000C4 13     RRC    A
315  000000C5 C5F0   XCH    A,B
316  000000C7 13     RRC    A                  ; shift once
317  000000C8 C5F0   XCH    A,B
318  000000CA 13     RRC    A
319  000000CB C5F0   XCH    A,B
320  000000CD 13     RRC    A                  ; shift twice
321  000000CE C5F0   XCH    A,B
322  000000D0 13     RRC    A
323  000000D1 C5F0   XCH    A,B
324  000000D3 13     RRC    A                  ; shift three times
325
326
327              ; now divide by 9 (which is 36 in F2 format)
328
329  000000D4 750024 R      MOV    DIVISOR,#36
330  000000D7 C5F0   XCH    A,B                ; dividend in A:B
331  000000D9 1200F6 R      LCALL  DIVIS
332
333              ; R * (192 * sin(90 - theta))/128 * 2/3 * 2/3 now in B (rem in A)
334              ; round the result up if the remainder > 4
335
336  000000DC C3     CLR    C
337  000000DD 9405   SUBB   A,#5
338  000000DF 4002   JC     POINT72            ; ignore error code
339  000000E1 05F0   INC    B
340  POINT72
341
342              ; now add the offset of the centre of the circle
343  000000E3 C3     CLR    C
344  000000E4 74B0   MOV    A,#12B             ; centre
345  000000E6 200004 R      JB     YSIGN,POINT8 ; jump if we are in quadrant
346                                             ; 2 or 3
347  000000E9 95F0   SUBB   A,B
```

```
348                                     POINT8    SJMP    POINT9
349  0000000EB 8002
350                                     POINT8    ADD     A,B
351  0000000ED 25F0
352                                     POINT9    MOV     RAMH,A              ; v pixel address in RAMH
353  0000000EF F500         RU
354
355  0000000F1 D003         RU                    POP     ANGLE0
356  0000000F3 D000         RU                    POP     ANGLE1              ; restore angle
357
358  0000000F5 22                                 RET
359
360          ;***************************************************************
361          ;*                                                             *
362          ;*              SUBROUTINE DIVIS                               *
363          ;*                                                             *
364          ;*      DIVISION ROUTINE , 16 BY 8 BITS UNSIGNED              *
365          ;*                                                             *
366          ;***************************************************************
367          ;
368          ; input parameters :     dividend in A:B
369          ;                        divisor in DIVISOR
370          ;
371          ; returns :
372          ;                        result in B
373          ;                        remainder in A
374          ;                        error flag in C : if set, division was not performed
375          ;
376          ; If the divisor is not > MS byte of dividend the division is not performed
377          ;
378                                   STRING   COUNT
379
380                                   COUNT    SET   'R5'
381                           2
382
383
384                                   DIVIS
385  0000000F6 C3                               CLR    C
386  0000000F7 7D08         S                   MOV    R5,#8                   ; loop count
387
388          ; check if divisor > MS byte of dividend
389  0000000F9 9500         RU                   SUBB   A,DIVISOR
390  0000000FB A003                              JC     DIVIA                  ; jump if OK, division can proceed
391  0000000FD B3                                CPL    C
392  0000000FE B01C                              SJMP   DIVIB                  ; error exit
393
394          ; division can proceed
395
396                                   DIVIA
397  000000100 2500         RU                   ADD    A,DIVISOR              ;RESTORE
398
399          ; this is a shift and subtract loop
400          ; register B is used both for the dividend and the quotient
401
```

```
402                              DIVILP:         ; shift left
403
404
405
406   00000102 C3                                 CLR     C
407   00000103 C5F0                               XCH     A,B
408   00000105 33                                 RLC     A
409   00000106 C5F0                               XCH     A,B
410   00000108 33                                 RLC     A
411
412   00000109 5004                               JNC     DIVIE
413   0000010B 9500              RU               SUBB    A,DIVISOR
414   0000010D 8000                               SJMP    DIVIC
415                              DIVIE:
416   0000010F 9500              RU               SUBB    A,DIVISOR
417   00000111 5004                               JNC     DIVIC   ; jump if shifted dividend >= divisor
418                                                               ; and quotient must therefore have
419                                                               ; a one in this bit position
420   00000113 2500              RU               ADD     A,DIVISOR
421   00000115 8002                               SJMP    DIVID
422
423                              DIVIC:
424   00000117 05F0                               INC     B
425                              DIVID:
426   00000119 DDE7              S                DJNZ    R5,DIVILP
427   0000011B C3                                 CLR     C        ; no error
428                              DIVIB:
429
430   0000011C 22                                 RET
431
432                                               END.
433
434
435

Scalars

COUNT------------00000010 S

Section = POINTC, Class = CODE, Byte Relocatable, Size = 0000011D

DIVIA-----------00000100    DIVID-----------0000011C    DIVIC-----------00000117    DIVID-----------00000117
DIVIE-----------0000010F    DIVIP-----------00000102    DIVIS-----------00000102    POINT-----------000000F6 O    POINT-----------00000000 O
POINT1----------00000051    POINT2----------0000005B    POINT24---------00000097    POINTS----------000000A1

ACC.0-----------000000E0    ACC.1-----------000000E1    ACC.2-----------000000E2    ACC.3-----------000000E3
ACC.4-----------000000E4    ACC.5-----------000000E5    ACC.6-----------000000E6    ACC.7-----------000000E7
P1.0------------00000090    P1.1------------00000091    P1.2------------00000092    P1.3------------00000093
P1.4------------00000094    P1.5------------00000095    P1.6------------00000096    P1.7------------00000097

Strings & Macros
```

```
POINT6------000000A3      POINT7-------000000AB     POINT72------000000E3    POINT8-------00000OED
POINT81-----0000000A      POINTB20-----00000033     POINT9-------000000EF

Section = Z, Byte Relocatable, Size = EMPTY

Unbound Globals

ANGLE0------00000000      ANGLE1-------00000000     DIVISOR------00000000    MSBRAH-------00000000
NINETYDEG---00000000      RAHH---------00000000     RAML---------00000000    VECTOR-------00000000
XSIGN-------00000000      XTABLE-------00000000     YSIGN--------00000000

435 Lines Read
435 Lines Processed
0 Errors                                              Page   1

ASM    B051
V01.08-56 (B560)
```

```
 1                    ; Name : guard
 2
 3                    ;***************************************
 4                    ;*                                     *
 5                    ;*        GUARD ZONE SEARCH            *
 6                    ;*                                     *
 7                    ;***************************************
 8
 9
10
11
12
13                    ; The guard zone is searched outwards and clockwise, and a flag
14                    ; is set when a target is detected. A false alarm algorithm is used
15                    ; to discriminate against noise.
16                    ; Each time the routine is called, it searches one complete
17                    ; bearing through the zone. The search position is indicated
18                    ; by means of a radial line through the guard zone, which
19                    ; is moved to correspond to the bearing which has just
20                    ; been searched.
21
22                    ; The buzzer routine is called externally when the alarm has been
23                    ; triggered, and it sounds the buzzer and flashes the blip.
24
25
26
27                    ; Contains the following subroutines :
28
29                            GLOBAL  SEARCHGDZ            ; searches the guard zone
```

```
              GLOBAL  BUZZER                  ; sounds buzzer and flashes blip
                                              ; when the alarm is triggered
              GLOBAL  DETECT
              GLOBAL  ANGLE_OK
              GLOBAL  ABS ; Internally defined constants :
;

GLOBAL  GDSTEP

;
; The following are defined externally :
;

; externally defined variables

GLOBAL  NEWEBM1,NEWEBMO
              GLOBAL  EBMP1,EBMFO,EBMH1,EBMMO
              GLOBAL  EBMB1,EBMHO
              GLOBAL  ANGLE1,ANGLEO
              GLOBAL  E_WEBM,C_WVRM
              GLOBAL  G_ZONE
              GLOBAL  R_RING
              GLOBAL  ANY_KEY
              GLOBAL  VRMA1,VRMAO,VRMB1,VRMBO
              GLOBAL  RANGE
              GLOBAL  VECTOR
              GLOBAL  ALARM,X_ALRM,ALARMTRIG
              GLOBAL  GDZSIGN,GDZOUTER
              GLOBAL  RSEL4F,RSEL2F,RSEL1F
              GLOBAL  MSDRAM,RAMH,RAML
              GLOBAL  GRANG1,GDANGO
              GLOBAL  READ_F
              GLOBAL  UPWB1,UPWBO
              GLOBAL  FULLZONE
              GLOBAL  BUZZ
              GLOBAL  ALRMTRIG
              GLOBAL  SWEEP

; external routines

GLOBAL  INCX
              GLOBAL  WR_EBM
              GLOBAL  RING
              GLOBAL  SETVECT
              GLOBAL  W_OO,W_11
              GLOBAL  TERMINATE             ; key response termination
              GLOBAL  PORT3
              GLOBAL  POINT
              GLOBAL  RND
              GLOBAL  SUBTRACT
              GLOBAL  FILL_BOX
              GLOBAL  FORTO
```

```
 85                              GLOBAL   NORMANG
 86                              GLOBAL   RMJ
 87
 88                              ; external constants
 89
 90                              GLOBAL   MAXRANG
 91                              GLOBAL   ALXSZ,ALYSZ
 92                              GLOBAL   ALARMX,ALARMY
 93
 94
 95
 96                     90       P1.0     EQU      90H
 97                     91       P1.1     EQU      91H
 98                     92       P1.2     EQU      92H
 99                     93       P1.3     EQU      93H
100                     94       P1.4     EQU      94H
101                     95       P1.5     EQU      95H
102                     96       P1.6     EQU      96H
103                     97       P1.7     EQU      97H
104
105                     E0       ACC.0    EQU      0C0H
106                     E1       ACC.1    EQU      0C1H
107                     E2       ACC.2    EQU      0C2H
108                     E3       ACC.3    EQU      0E3H
109                     E4       ACC.4    EQU      0E4H
110                     E5       ACC.5    EQU      0E5H
111                     E6       ACC.6    EQU      0E6H
112                     E7       ACC.7    EQU      0E7H
113
114
115
116                              SECTION  SEARCH,CLASS=CODE
117
118
119                              ; CODE
120
121
122
123                              ; routine BUZZER
124
125
126                              ; Sounds the buzzer and flashes the alarm ; they are toggled
127                              ; by the routine, so any required delay must be supplied
128                              ; by means of a suitable interval between calls to this routine.
129
130
131
132
133                     BUZZER
134  00000000 B200      BU        CPL      BUZZ              ; toggle the buzzer flag
135
136  00000002 200008    R         JB       BUZZ,BUZZER1      ; jump if buzzer to be on and
137                                                          ; alarm blip to be filled
138
```

```
139  00000005 C200         RU           CLR    X_ALRM            ; shut the alarm up
140  00000007 120000       RU           LCALL  U_00              ; set for erase
141
142  0000000A 020012       R            JMP    BUZZER2
143
144                                 BUZZER1
145  0000000D D200         RU           SETB   X_ALRM            ; sound the alarm
146  0000000F 120000       RU           LCALL  U_11              ; set for writing
147
148                                 BUZZER2
149
150  00000012 120000       RU           LCALL  PORTO             ; set buzzer
151
152                                                  ; set up frame store address
153
154  00000015 750000       RU           MOV    RAMH,#ALARMHY     ; Y position
155
156  00000018 750000       RU           MOV    RAML,#LO(ALARMHX) ; LS byte of X posn
157  0000001B 7400         RU           MOV    A,#HI(ALARMHX)
158  0000001D 13                        RRC    A
159  0000001E 9200         RU           MOV    MSBRAM,C          ; MS bit of X position
160
161  00000020 7A00         RU           MOV    R2,#ALXSZ         ; X dimension
162  00000022 7B00         RU           MOV    R3,#ALYSZ         ; Y dimension
163
164  00000024 120000       RU           LCALL  FILL_BOX
165
166  00000027 22                        RET
167
168
169                                 ; routine SEARCHGDZ
170                                 ; =================
171                                 ;
172                                 ; Looks for targets in the guard zone, sets ALRMTRIG when it
173                                 ; finds one.
174                                 ;
175
176
177              1                      GDSTEP  EQU    1          ; angular step size used in guard
178                                                               ; zone ( = 1/4 degree )
179
180                                 SEARCHGDZ
181                                 ;
182                                 ; Search one complete bearing at an angle of GDANG,
183                                 ; then advance to the next bearing and return.
184                                 ;
185                                 ; The search starts at :
186                                 ;
187                                 ;
188                                 ;
189                                 ;        angle : GDZSIGN clear :       EBM A to EBM B
190                                 ;                GDZSIGN set   :       EBM B to EBM A
191
```

```
192                             ;   range : GDZOUTER clear ,        VRM A to VRM B
193                             ;            GDZOUTER set   :       VRM B to VRM A
194
195
196                             ; Set up start radius and end radius
197
198
199                             ; Want two copies on the stack : the second is to
200                             ; erase the last indicator line, the first is to do the
201                             ; search itself and write the new indicator line.
202
203
204  0000002D 200015      R        JB     GDZOUTER,SEARCHGDZ1    ; Jump if VRM B to A
205
206  00000020 E500        RU       MOV    A,VRMB1
207  0000002D B500F0      R        MOV    B,VRMB0
208  00000030 120000      RU       LCALL  SETVECT
209  00000033 C000        RU       PUSH   VECTOR                 ; end radius on stack
210
211  00000035 E500        RU       MOV    A,VRMA1
212  00000037 B500F0      R        MOV    B,VRMA0
213  0000003A 120000      RU       LCALL  SETVECT                ; start radius
214
215  0000003D 020052      R        JMP    SEARCHGDZ2
216
217                           SEARCHGDZ1
218
219  00000040 E500        RU       MOV    A,VRMA1
220  00000042 B500F0      R        MOV    B,VRMA0
221  00000045 120000      RU       LCALL  SETVECT
222  00000048 C000        RU       PUSH   VECTOR                 ; end radius on stack
223
224  0000004A E500        RU       MOV    A,VRMB1
225  0000004C B500F0      R        MOV    B,VRMB0
226  0000004F 120000      RU       LCALL  SETVECT                ; start radius
227
228                           SEARCHGDZ2
229
230                                                              ; skip line erase if the angle is not OK
231  00000052 120110      R        LCALL  ANGLE_OK
232  00000055 5041                 JNC    SEARCHGDZ49            ; jump if angle not OK
233
234                             ; leave on stack : end,start,end radii
235
236  00000057 D0E0                 POP    ACC
237  00000059 C0E0                 PUSH   ACC                    ; end rad.
238
239  0000005B C000        RU       PUSH   VECTOR                 ; start rad
240
241  0000005D C0E0                 PUSH   ACC                    ; end rad.
```

```
246
247                                     ; delete previous indicator line
248  0000005F 850000    RU       MOV    ANGLE1,GDANG1
249  00000062 850000    RU       MOV    ANGLE0,GDANG0           ; angle = guard z. angle
250
251  00000065 120000    RU       LCALL  U_00                    ; erase
252
253                   SEARCHGDZ62
254
255  00000068 120000    RU       LCALL  POINT
256  0000006B 120000    RU       LCALL  RAW
257
258  0000006E 0500      RU       INC    VECTOR                  ; next point
259
260                                     ; are we finished ?
261
262  00000070 D0E0      RU       POP    ACC
263  00000072 C0E0      RU       PUSH   ACC
264
265  00000074 C3                 CLR    C
266  00000075 9500      RU       SUBB   A,VECTOR
267
268  00000077 50EF               JNC    SEARCHGDZ62             ; jump if not finished
269
270  00000079 D0E0      RU       POP    ACC                     ; clear up stack
271
272                                     ; repair the range boundaries of the guard zone
273
274
275  0000007B 120000    RU       LCALL  U_11
276
277  0000007E D000      RU       POP    VECTOR
278  00000080 C000      RU       PUSH   VECTOR                  ; start radius
279
280  00000082 120000    RU       LCALL  POINT
281  00000085 120000    RU       LCALL  RA0
282
283  00000088 D0E0      RU       POP    ACC
284  0000008A D000      RU       POP    VECTOR
285  0000008C C000      RU       PUSH   VECTOR
286  0000008E C0E0      RU       PUSH   ACC
287
288  00000090 120000    RU       LCALL  POINT                   ; end radius
289  00000093 120000    RU       LCALL  RA0
290
291  00000096 D000      RU       POP    VECTOR
292                                     ; start radius
293                                     ; end radius on stack, start radius in VECTOR
294                   SEARCHGDZ49
295
296                   ;
297                   ; Now check if we are at the end of a sweep through
298                   ; the zone : if a full zone is set, then the end of a sweep
299
```

```
300                                   ; is taken to be when the angle goes out of the 0 to 360
301                                   ; range ( it only does so briefly, before the normalisation
302                                   ; routine puts it back in range ).
303
304                                   ; At the end of a sweep, the alarm must be reset if no
305                                   ; targets were found in that sweep, in order to make the
306                                   ; alarm non - latching.
307
308
309
310                                   ;
311                                   ; Now increment the angle
312                                   ;
313
314
315                                   ; now set angle = next angle
316
317  00000098 E500          RU        MOV    A,GDANG0
318  0000009A 2401          RU        ADD    A,#GDSTEP
319  0000009C F500          RU        MOV    GDANG0,A
320  0000009E E500          RU        MOV    A,GDANG1
321  000000A0 3400          RU        ADDC   A,#0
322  000000A2 F500          RU        MOV    GDANG1,A
323
324                                   ; normalise angle to the range 0 to 360
325  000000A4 7B00          RU        MOV    R0,#GDANG0
326  000000A6 120000        RU        LCALL  NORMANG
327
328
329  000000A9 20002C        R         JB     FULLZONE,SEARCHGDZ121   ; jump if a full guard zone set
330
331                                   ; a partial gd zone : end of sweep found if angle = end angle
332
333                                   ; Have we reached the end of the zone ?
334                                   ; Compare guard angle with end angle :
335
336
337  000000AC 200007        R         JB     GDZSIGN,SEARCHGDZ10     ; jump if end angle is EBM A
338
339  000000AF 7B00          RU        MOV    R0,#EBMB0
340  000000B1 7900          RU        MOV    R1,#GDANG0
341  000000B3 0200BA        R         JMP    SEARCHGDZ11
342
343                        SEARCHGDZ10
344
345
346  000000B6 7B00          RU        MOV    R0,#NCUEBM0
347  000000B8 7900          RU        MOV    R1,#GDANG0
348
349                        SEARCHGDZ11
350
351  000000BA 120000        RU        LCALL  SUBTRACT                ; end angle - guard angle
352
353                                   ; the end may be found when
354                                   ; the search angle is exactly equal to the end boundary
```

```
355
356  000000BD 702C              JNZ    SEARCHGDZ105          ; jump if not reached end
357  000000BF C5F0              XCH    A,B
358  000000C1 7028              JNZ    SEARCHGDZ105          ; jump if not reached end
359
360                                    ; end of guard zone ;
361                                    ; set angle = start angle
362
363  000000C3 200009   R        JB     GDZSIGN,SEARCHGDZ30   ; jump if start angle is EBM B
364
365  000000C6 850000   RU       MOV    GDANGO,NEWFBMO
366  000000C9 850000   RU       MOV    GDANG1,NEWEBM1
367
368  000000CC 0200DA   R        JMP    SEARCHGDZ120          ; do end of sweep alarm check
369
370                             SEARCHGDZ30
371
372  000000CF 850000   RU       MOV    GDANGO,EBMBO
373  000000D2 850000   RU       MOV    GDANG1,CBMB1
374
375  000000D5 0200DA   R        JMP    SEARCHGDZ120          ; do end of sweep alarm check
376
377                             SEARCHGDZ121
378
379                                    ; A full gd zone ;
380                                    ; if the carry is set, the angle was out of range,
381                                    ; and so it will be considered to be at the end of a sweep
382
383  000000DB 5011              JNC    SEARCHGDZ105          ; Jump if not at end of sweep
384
385                                    ; The end of a sweep
386
387                                    ; If not SWEEP then ALRMTRIG = reset;
388                                    ; SWEEP = reset;
389
390
391
392                             SEARCHGDZ120
393
394
395  000000DA 200007   R        JB     SWEEP,SEARCHGDZ122
396
397  000000DD C200    RU        CLR    ALRMTRIG              ; reset alarm because a target
398                                                          ; was not found on this sweep
399                                                          ; through the zone
400
401                                    ; also shut the alarm up in case it was sounding,
402                                    ; and clear the blip
403
404  000000DF D200    RU        SETB   BUZZ                  ; set it, because BUZZER toggles
405                                                          ; it
406  000000E1 120000  R         LCALL  BUZZER
407
408
409                             SEARCHGDZ122
```

```
410                                                      ; reset ready for next sweep
411   000000E4 C200       RU         CLR    SWEEP        ; through the zone
412                                                      ; remove end radius from stack
413   000000E6 D0E0                  POP    ACC
414
415   000000E8 02011C  R              JMP    SEARCHGDZ101 ; don't search at this angle
416
417                              SEARCHGDZ105
418
419                                                      ; skip search if angle not OK
420
421   000000EB 12011D  R             LCALL   ANGLE_OK
422   000000EE 502A                   JNC    SEARCHGDZ88  ; jump if not OK
423
424                                       ; now prepare to search the zone
425
426   000000F0 850000   RU            MOV    ANGLE1,GDANG1
427   000000F3 850000   RU            MOV    ANGLE0,GDANG0  ; angle = guard z. angle
428
429   000000F6 120000   RU           LCALL   W_11          ; write ones for indicator line
430
431
432                              SEARCHGDZ4
433
434
435   000000F9 120000   RU           LCALL   POINT
436
437   000000FC 1201DB  R             LCALL   DETECT
438
439   000000FF 5009                   JNC    SEARCHGDZ3    ; jump if a target was not found
440
441   00000101 12016D  R             LCALL   FALSE_AL      ; target found : go and check it
442   00000104 5004                   JNC    SEARCHGDZ3    ; jump if nothing found
443
444   00000106 D200                   SETB   ALRMTRIG      ; ALARM TRIGGERED
445   00000108 D200                   SETB   BWEEP         ; indicates that a target was found
446                                                        ; on this sweep through the zone
447
448                              SEARCHGDZ3
449
450                                   ; Indicate the position of the search by moving a radial line segment
451                                   ; through the zone. This is done by writing a line along the line of
452                                   ; the search, which is deleted before the next line is searched.
453
454
455
456
457   0000010A 120000   RU           LCALL   RMW           ; write the point
458
459   0000010D 0500     RU            INC    VECTOR        ; next pixel
460   0000010F 0500     RU            INC    VECTOR        ; skip one
461
462                                    ; have we finished ?
463
```

```
464                                                                      ; end radius
465  00000111 D0E0                POP     ACC
466  00000113 C0E0                PUSH    ACC
467
468  00000115 C3                  CLR     C
469  00000116 9500       RU       SUBB    A,VECTOR
470
471  00000118 50DF                JNC     SEARCHGDZA      ; jump if not finished
472
473                       SEARCHGDZ08
474  0000011A D0E0                POP     ACC             ; remove end radius from stack
475
476
477                       SEARCHGDZ101
478
479  0000011C 22                  RET
480
481                       ;
482                       ; routine ANGLE_OK
483                       ; =================
484                       ;
485                       ; Checks the angle at which the zone is to be searched.
486                       ; If it too close to either of the ends of the zone (if not a full zone), or
487                       ; if it is too close to the heading marker, or if it is not
488                       ; an integer angle, the result is returned as not OK, otherwise
489                       ; it is returned as OK.
490                       ;
491                       ; Input parameters : angle in GDANG
492                       ;
493                       ; Returns :        C set = OK
494                       ;
495
496
497                       ANGLE_OK
498
499                       ; If the angle is not an integer number of degrees,
500                       ; return NOT OK
501
502  0000011D E500       RU       MOV     A,GDANGO
503  0000011F 5403                ANL     A,#3            ; select LS two bits
504  00000121 703A                JNZ     ANGLE_OK1       ; jump if not OK
505
506  00000123 200028      R        JB      FULLZONE,ANGLE_OK20  ; skip EBM checks if a full guard zone
507
508
509                       ; If the angle is close to EBM A, return NOT OK
510  00000126 7B00        RU       MOV     R0,#GDANGO
511  00000128 7900        RU       MOV     R1,#NEWEBMO
512  0000012A 120000      RU       LCALL   SUBTRACT
513
514  0000012D 12015F      R        LCALL   ABS             ; get absolute value of difference
515  00000130 C5F0                XCH     A,B
516  00000132 54FE                ANL     A,#0FEH         ; ignore LS bit
517  00000134 7004                JNZ     ANGLE_OK10      ; jump if not equal
```

```
518                                    XCH    A,B
519 00000136 C5F0                      JZ     ANGLE_OK11              ; jump if equal
520 00000138 6022
521
522                        ANGLE_OK10
523                                                                    ; If the angle is close to EBM B, return NOT OK
524
525 0000013A 7000    RU                MOV    R0,#GDANG0
526 0000013C 7900    RU                MOV    R1,#EBMB0
527 0000013E 120000  RU                LCALL  SUBTRACT
528
529 00000141 12015F  R                 LCALL  ABS                     ; get absolute value of difference
530 00000144 C5F0                      XCH    A,B
531 00000146 54FE                      ANL    A,#0FEH                 ; ignore LS bit
532 00000148 7004                      JNZ    ANGLE_OK20              ; jump if not equal
533 0000014A C5F0                      XCH    A,B
534 0000014C 600E                      JZ     ANGLE_OK11              ; jump if equal
535
536                        ANGLE_OK20
537
538                                                                    ; If the angle is close to 0, return NOT OK
539
540 0000014E E500    RU                MOV    A,GRANG0
541 00000150 54FE                      ANL    A,#0FEH                 ; ignore LS bit
542 00000152 7004                      JNZ    ANGLE_OK2               ; jump if OK
543 00000154 E500    RU                MOV    A,GDANG1
544 00000156 6004                      JZ     ANGLE_OK11              ; jump if not OK
545
546                        ANGLE_OK2
547
548                                                                    ; return OK
549
550 00000158 D3                        SETB   C
551 00000159 02015E  R                 JMP    ANGLE_OK3
552
553                        ANGLE_OK11
554
555 0000015C 00                        NOP                             ; S/U test point : executes when
556                                                                    ; angle is not OK for any reason apart
557                                                                    ; from (not an integral angle)
558
559                        ANGLE_OK1
560                                                                    ; return NOT OK
561 0000015D C3                        CLR    C
562
563                        ANGLE_OK3
564
565 0000015E 22                        RET
566
567                        ;
568                        ; Routine ABS
569                        ;
570                        ;
571                        ; Returns the absolute value of the number in A:B
572
```

```
                    ADS     JNB     ACC.7,ABS1              ; return if already positive
                            ; invert the number in A:B
0000015F 30E70A 00000162 F4                 CPL     A
00000163 C5F0               XCH     A,B
00000165 F4                 CPL     A 00000166 2401               ADD     A,#1
00000168 C5F0               XCH     A,B
0000016A 3400               ADDC    A,#0

ABS1
0000016C 22                 RET

; Local routine FALSE_AL
                    ;
                    ;
                    ; Examines the surrounding pixels to determine if a target is
                    ; really present or not.
                    ; Sets the carry flag if a target is present.
                    ;
                    ; Searches a square of 5 x 5 pixels, if 6 or more contain valid target
                    ; levels, then a target is deemed to be present.
                    ;
                    NOTARGS     EQU     5           ; maximum allowed number of pixels in the
                                                    ; search area before the contact is declared
                                                    ; to be a target FALSE_AL
                            ; Start at the top left hand corner of a 5 x 5 square
                            ; with the current pixel at it's centre. Pay no attention
                            ; to the guard zone boundaries (just the display ones)
                            ; because this is just a check for target validity.

; 1) Set up frame store address

; set up x position
                            ; subtract two to get left hand side of square
0000016D C000               PUSH    RAM
0000016F A200               MOV     C,MSBRAM    ; MS bit of X position

00000171 E4                 CLR     A
```

```
627             RLC   A
628  00000172 33       PUSH  ACC           ; x address on stack
629  00000173 C0E0     MOV   B,RAML        ; x address of current pixel in A:B
     00000175 8500F0 R
630
631  0000178 C5F0      XCH   A,B
632  000017A C3        CLR   C
633  000017B 9402      SUBB  A,#2
634  000017D C5F0      XCH   A,B
635  000017F 9400      SUBB  A,#0           ; x addr = x addr - 2
636
637  00000181 5009     JNC   FALSE_AL1     ; jump if no underflow
638
639  00000183 8500F0 R MOV   B,RAML
640  00000186 D0D0     POP   PSW
641  00000188 C0D0     PUSH  PSW
642  0000018A E4       CLR   A
643  0000018B 33       RLC   A             ; puts the current pixel at
644                                         ; the left of the 5 x 5 square
645                                         ; if we get overflow
646
647        FALSE_AL1
648
649  0000018C 13       RRC   A
650  0000018D 9200 RU  MOV   MSDRAM,C
651  0000018F 85F000 RU MOV  RAML,B        ; x frame-store address = left hand
652                                         ; side of square
653
654
655  ; set up y position
656  ; subtract two to get top of square
657
658  00000192 C000 RU  PUSH  RAMH          ; save y position
659
660  00000194 E500 RU  MOV   A,RAMH        ; current y position
661  00000196 C3       CLR   C
662  00000197 9402     SUBB  A,#2
663  00000199 5002     JNC   FALSE_AL2     ; jump if no underflow
664
665  0000019B E500 RU  MOV   A,RAMH        ; puts the current pixel at
666                                         ; the top of the 5 x 5 square
667                                         ; if we get overflow
668
669        FALSE_AL2
670
671  0000019D F500 RU  MOV   RAMH,A        ; y position of top of square
672
673  ; 2) Now search the square : keep the count of the number
674  ; of pixels on the stack, as well as the loop count and
675  ; top of square address
676
677  0000019F 7005     MOV   R0,#5
678  000001A1 E4       CLR   A
679  000001A2 C0E0     PUSH  ACC           ; start target pixels count at zero
680
681        FALSE_AL6
```

```
682
683   000001A4 E8           MOV   A,R0
684   000001A5 C0E0         PUSH  ACC            ; column loop count
685
686                FALSE_AL3
687
688   000001A7 C000    RU   PUSH  RAMH
689   000001A9 7805         MOV   R0,#5           ; y position
690
691                FALSE_AL4
692
693   000001AB E8           MOV   A,R0
694   000001AC C0E0         PUSH  ACC            ; loop count
695
696   000001AE 1201DB   R   LCALL DETECT          ; C will be set if a target pixel found
697
698   000001B1 5006         JNC   FALSE_AL5       ; jump if no target found
699
700                ; increment target pixels count
701   000001B3 A901         MOV   R1,SP
702   000001B5 19           DEC   R1
703   000001B6 19           DEC   R1
704   000001B7 19           DEC   R1
705
706                ; points to target pixels count
707   000001B8 07           INC   @R1             ; count another target pixel
708
709                FALSE_AL5
710
711   000001B9 D0E0         POP   ACC
712   000001BB F8           MOV   R0,A            ; loop count
713
714   000001BC 0500    RU   INC   RAMH
715
716   000001BE DBEB         DJNZ  R0,FALSE_AL4
717
718                ; end of search of a column
719
720   000001C0 D000    RU   POP   RAMH            ; restore y address to top of square
721   000001C2 120000  RU   LCALL INCX            ; next column ( won't overflow because
722                                               ; we are not close to RH edge of screen )
723
724   000001C5 D0E0         POP   ACC
725   000001C7 F8           MOV   R0,A            ; column loop count
726
727   000001C8 DBDA         DJNZ  R0,FALSE_AL6    ; jump if not finished all the columns
728
729   000001CA D0F0         POP   B               ; number of target pixels counted
730
731                ; restore frame store address
732
733   000001CC D000    RU   POP   RAMH            ; y
734
735   000001CE D0E0         POP   ACC
```

```
736                             RRC     A
737   000001D0 13                MOV     MSBRAM,C        ; MS bit of x
738   000001D1 9200
739
740   000001D3 D000          RU  POP     RAHL            ; LS 8 bits of x
741
742                         ; is the number of pixels with target data above the threshold ?
743   000001D5 7405              MOV     A,#NOTARGS
744   000001D7 C3                CLR     C
745   000001D8 95F0              SUBB    A,B             ; leaves carry set if more than the
746                                                      ; threshold level of pixels are in
747                                                      ; the searched area
748
749
750   000001DA 22                RET
751
752
753                         ; routine DETECT
754                         ;
755                         ;
756                         ; Examines the frame store pixel identified by (MSBRAM:RAML,RAHH).
757                         ; Returns C set if a video level of 1 or 2 is found (valid target levels)
758                         ; and also the actual value in A (i.e. 0,1,2 or 3).
759                         ;
760
761
762
763                         DETECT
764   000001DB D200         RU   SETB    READ_E
765   000001DD 120000       RU   LCALL   RAO
766   000001E0 C200         RU   CLR     READ_F          ; perform the read operation
767                                                      ; all write operations assume
768                                                      ; this flag is low, so it MUST
769                                                      ; be left low
770   000001E2 E590              MOV     A,P1            ; read the data bus
771   000001E4 5403              ANL     A,#3            ; mask the two bits we want
772
773                                                      ; if a 1 or a 2, then it is radar video ; set C
774                                                      ; if 3 it is graphics data             ; reset C
775                                                      ; if 0 it is blank                     ; reset C
776
777                                                      ; so C = MS bit XOR LS bit
778   000001E6 FB                MOV     R0,A
779   000001E7 03                RR      A
780   000001E8 68                XRL     A,R0
781   000001E9 13                RRC     A               ; C = (MS bit) XOR (LS bit)
782
783   000001EA E8                MOV     A,R0            ; the value that was read
784
785
786   000001EB 22                RET
787
788                             END
789
790
791
```

Scalars

| | | | | | |
|---|---|---|---|---|---|
| ACC.0 | 000000E0 | ACC.1 | 000000E1 | ACC.2 | 000000E2 | ACC.3 | 000000E3 |
| ACC.4 | 000000E4 | ACC.5 | 000000E5 | ACC.6 | 000000E4 | ACC.7 | 000000E7 |
| GDSTEP | 00000001 | NOTARGS | 00000005 | P1.0 | 00000090 | P1.1 | 00000091 |
| P1.2 | 00000092 | P1.3 | 00000093 | P1.4 | 00000094 | P1.5 | 00000095 |
| P1.6 | 00000096 | P1.7 | 00000097 | | | | |

Section = SEARCH, Class = CODE, Byte Relocatable, Size = 000001EC

| | | | | | | | |
|---|---|---|---|---|---|---|---|
| ABS | 0000015F G | ABS1 | 0000016C | ANGLE_OK | 0000011D G | ANGLE_OK1 | 0000015D |
| ANGLE_OK10 | 0000013A | ANGLE_OK11 | 0000015C | ANGLE_OK2 | 00000158 | ANGLE_OK20 | 0000014E |
| ANGLE_OK3 | 0000015E | BUZZER | 0000000 | BUZZER1 | 0000000D | BUZZER2 | 00000012 |
| DETECT | 000001DB G | FALSE_AL | 0000001D G | FALSE_AL1 | 000001BC | FALSE_AL2 | 0000019D |
| FALSE_AL3 | 000001A7 | FALSE_AL4 | 000001AB | FALSE_AL5 | 000001B9 | FALSE_AL6 | 000001A4 |
| SEARCHGDZ | 0000002D G | SEARCHGDZ1 | 00000040 | SEARCHGDZ10 | 000000B6 | SEARCHGDZ101 | 0000011C |
| SEARCHGDZ105 | 000000EB G | SEARCHGDZ11 | 000000BA | SEARCHGDZ120 | 000000DA | SEARCHGDZ121 | 000000D8 |
| SEARCHGDZ122 | 000000E4 | SEARCHGDZ2 | 00000052 | SEARCHGDZ23 | 0000010A | SEARCHGDZ30 | 000000CF |
| SEARCHGDZ4 | 000000F9 | SEARCHGDZ49 | 0000009B | SEARCHGDZ62 | 0000006B | SEARCHGDZ88 | 0000011A |

Section = Z, Byte Relocatable, Size = EMPTY

Unbound Globals

| | | | | | | | |
|---|---|---|---|---|---|---|---|
| ALARM | 00000000 | ALARMHX | 00000000 | ALARMHY | 00000000 | ALARMTRIO | 00000000 |
| ALKMTRIO | 00000000 | ALXSZ | 00000000 | ALYSZ | 00000000 | ANGLEO | 00000000 |
| ANGLE1 | 00000000 | ANY_KEY | 00000000 | BUZZ | 00000000 | EBMBO | 00000000 |
| EBMB1 | 00000000 | EBMHO | 00000000 | EBMH1 | 00000000 | EBMPO | 00000000 |
| EBMP1 | 00000000 | E_WEBM | 00000000 | E_WVRM | 00000000 | FILL_BOX | 00000000 |
| FULLZONE | 00000000 | GDANGO | 00000000 | GDANG1 | 00000000 | GDZOUTER | 00000000 |
| GDZSION | 00000000 | G_ZONE | 00000000 | INCX | 00000000 | MAXRANG | 00000000 |
| MSBRAM | 00000000 | NEWEBMO | 00000000 | NEWEBM1 | 00000000 | NORMANG | 00000000 |
| POINT | 00000000 | PORTO | 00000000 | PORT3 | 00000000 | RAMH | 00000000 |
| RAML | 00000000 | RANGE | 00000000 | RAO | 00000000 | READ_F | 00000000 |
| RING | 00000000 | RMU | 00000000 | RSEL1F | 00000000 | RSEL2F | 00000000 |
| RSEL4F | 00000000 | R_RING | 00000000 | SETVECT | 00000000 | SUBTRACT | 00000000 |
| SWEEP | 00000000 | TERMINATE | 00000000 | UFWI0 | 00000000 | UFWI01 | 00000000 |
| VECTOR | 00000000 | VRMAO | 00000000 | VRMA1 | 00000000 | VRMBO | 00000000 |
| VRMB1 | 00000000 | WR_EBM | 00000000 | W_00 | 00000000 | W_11 | 00000000 |
| X_ALRM | 00000000 | | | | | | |

```
ASM                                                    Page  1
V01.0B-56  (B561)

; Name : control

;****************************************
     ;*                                      *
     ;*          CONTROLLER.MODULE           *
     ;*                                      *
     ;****************************************

; the following symbols are defined internally

GLOBAL  CTRLLR
        GLOBAL  TERMINATE

; the following symbols are defined externally

GLOBAL  BIT0,BIT1,BIT2,BIT3,BIT4,BIT5,BIT6,BIT7

; external variables

GLOBAL  MSBRAM,RAMH,RAML
        GLOBAL  F_THER1,F_THER0
        GLOBAL  ANY_KEY
        GLOBAL  KEY_VALUE
        GLOBAL  DELAY
        GLOBAL  ALARM
        GLOBAL  ALRMTRIG
        GLOBAL  LOOPCNT
        GLOBAL  CLOCK0,CLOCK1,CLOCK2

; external routines

GLOBAL  FILL_BOX
        GLOBAL  W_BOX
        GLOBAL  W_11,W_00
        GLOBAL  SEARCHGDZ              ; searches guard zone
        GLOBAL  BUZZER ; external addresses GLOBAL  EBMINCR,EBMDECR
        GLOBAL  VRMINCR,VRMDECR        ; EBM movement
        GLOBAL  STANDBY                ; VRM movement
        GLOBAL  GRZONE
        GLOBAL  ALARMH
        GLOBAL  RANGUP,RANGDOWN        ; range change
        GLOBAL  GAINDECR,GAININCR
```

```
 53            GLOBAL  TIMDECR,TUNINCR
 54            GLOBAL  STACINCR,STACDECR
 55            GLOBAL  BRILLINCR,BRILLDECR
 56            GLOBAL  HOLDD,DAYNITE,RINGS
 57            GLOBAL  HDGING,TRAK,RAINCLUT
 58            GLOBAL  TESTT
 59
 60            GLOBAL  KEYB0
 61            GLOBAL  KEYB1
 62            GLOBAL  KEYB2
 63
 64    ; keyboard flags
 65            GLOBAL  K_ALRM
 66            GLOBAL  K_HEAD
 67            GLOBAL  K_DECEBH
 68            GLOBAL  K_INCEBH
 69            GLOBAL  K_GUARDZ
 70            GLOBAL  K_DECGAIN
 71            GLOBAL  K_ON_OFF
 72            GLOBAL  K_HOLD
 73            GLOBAL  K_TEST
 74            GLOBAL  K_RRINGS
 75            GLOBAL  K_DECVRM
 76            GLOBAL  K_INCVRM
 77            GLOBAL  K_PERSIS
 78            GLOBAL  K_RAINCL
 79            GLOBAL  K_DECSCL
 80            GLOBAL  K_INCSCL
 81            GLOBAL  K_DECTUN
 82            GLOBAL  K_INCTUN
 83            GLOBAL  K_DECRNG
 84            GLOBAL  K_INCRNG
 85            GLOBAL  K_INCGAIN
 86            GLOBAL  K_DAY_NIG
 87            GLOBAL  K_DECBRL
 88            GLOBAL  K_INCBRL
 89
 90
 91
 92
 93
 94    ACC.0   EQU     E0
 95    ACC.1   EQU     E1
 96    ACC.2   EQU     E2
 97    ACC.3   EQU     E3
 98    ACC.4   EQU     E4
 99    ACC.5   EQU     E5
100    ACC.6   EQU     E6
101    ACC.7   EQU     E7
102
103    MAXKEY  EQU     17      0E0H
104    MINKEY  EQU     0       0E1H    ; max and min values for key code
105
106    DELTA   EQU     14      0E3H    ; loop count increment
107
```

```
                              SECTION CONTROL,CLASS=CODE

CTRLLR
                              ; TOP level of program ; when in idle state, loops around here.
                              ;
                              ; If a guard zone has been set, then the search routine must be
                              ; called.
                              ; Polls A/D and writes the result to the signal strength mimic.
                              ;
                      CTRLLR2
00000000 300012    R          JNB       ALARM,CTRLLR8       ; Jump if g.z. has not been set
00000003 120000    RU         LCALL     SEARCHGDZ           ; go and look in the guard zone
00000006 30000C    R          JNB       ALMTRIG,CTRLLR8     ; jump if alarm has not been
                                                            ; triggered
                              ; only toggle buzzer every few cycles through the main
                              ; controller loop ; NOTE that the modulation frequency
                              ; of the buzzer is thereby a function of how much
                              ; is done in this loop.
00000009 E500     RU          MOV       A,LOOPCNT
0000000B C3                   CLR       C
0000000C 2414                 ADD       A,#DELTA
0000000E F500     RU          MOV       LOOPCNT,A
00000010 5003                 JNC       CTRLLR8
00000012 120000   RU          LCALL     BUZZER              ; toggle buzzer and blip
                      CTRLLR8
00000015 D2AA                 SETB      EX1                 ; enable keyboard interrupt
00000017 D2A9                 SETB      ET0                 ; enable timer interrupt
                                                            ; (failsafe measure)
00000019 3000E4   R           JNB       ANY_KEY,CTRLLR2     ; jump if no key flags set
                      CTRLLR10
                              ; one or more key flag(s) set ,
                              ; go and look to see which one(s)
                              ;
                              ; jump off to the appropriate routine
                              ;
```

| | | | | | | |
|---|---|---|---|---|---|---|
| 162 | 0000001C | 300003 | R | JNB | NKEY0 | K_DECEBH,NKEY0 |
| 163 | 0000001F | 020000 | RU | JMP | | EBMDECR |
| 164 | 00000022 | 300003 | R | JNB | NKEY1 | K_INCEBH,NKEY1 |
| 165 | 00000025 | 020000 | RU | JMP | | EBMINCR |
| 166 | 00000028 | 300003 | R | JNB | NKEY2 | K_ALRM,NKEY2 |
| 167 | 0000002B | 020000 | RU | JMP | | ALARM |
| 168 | 0000002E | 300003 | R | JNB | NKEY3 | K_HEAD,NKEY3 |
| 169 | 00000031 | 020000 | RU | JMP | | HDGING |
| 170 | 00000034 | 300003 | R | JNB | NKEY4 | K_GUARDZ,NKEY4 |
| 171 | 00000037 | 020000 | RU | JMP | | GDZONE |
| 172 | 0000003A | 300003 | R | JNB | NKEY5 | K_DECGAIN,NKEY5 |
| 173 | 0000003D | 020000 | RU | JMP | | GAINDECR |
| 174 | 00000040 | 300003 | R | JNB | NKEY6 | K_ON_OFF,NKEY6 |
| 175 | 00000043 | 020000 | RU | JMP | | STANDBY |
| 176 | 00000046 | 300003 | R | JNB | NKEY7 | K_HOLD,NKEY7 |
| 177 | 00000049 | 020000 | RU | JMP | | HOLDD |
| 178 | 0000004C | 300003 | R | JNB | NKEY8 | K_TFST,NKEY8 |
| 179 | 0000004F | 020000 | RU | JMP | | TESTT |
| 180 | 00000052 | 300003 | R | JNB | NKEY9 | K_RRINGS,NKEY9 |
| 181 | 00000055 | 020000 | RU | JMP | | RINGS |
| 182 | 00000058 | 300003 | R | JNB | NKEY10 | K_DECVRH,NKEY10 |
| 183 | 0000005B | 020000 | RU | JMP | | VRMDECR |
| 184 | 0000005E | 300003 | R | JNB | NKEY11 | K_INCVRH,NKEY11 |
| 185 | 00000061 | 020000 | RU | JMP | | VRMINCR |
| 186 | 00000064 | 300003 | R | JNB | NKEY12 | K_PERSIS,NKEY12 |
| 187 | 00000067 | 020000 | RU | JMP | | TRAK |
| 188 | 0000006A | 300003 | R | JNB | NKEY13 | K_RAINCL,NKEY13 |
| 189 | 0000006D | 020000 | RU | JMP | | RAINCLUT |
| 190 | 00000070 | 300003 | R | JNB | NKEY14 | K_DECSCL,NKEY14 |
| 191 | 00000073 | 020000 | RU | JMP | | SEADECR |
| 192 | 00000076 | 300003 | R | JNB | NKEY15 | K_INCSCL,NKEY15 |
| 193 | 00000079 | 020000 | RU | JMP | | SEACINCR |
| 194 | 0000007C | 300003 | R | JNB | NKEY16 | K_DECTUN,NKEY16 |
| 195 | 0000007F | 020000 | RU | JMP | | TUNDECR |
| 196 | 00000082 | 300003 | R | JNB | NKEY17 | K_INCTUN,NKEY17 |
| 197 | 00000085 | 020000 | RU | JMP | | TUNINCR |
| 198 | 00000088 | 300003 | R | JNB | NKEY18 | K_DECRNG,NKEY18 |
| 199 | 0000008B | 020000 | RU | JMP | | RANGDOWN |
| 200 | 0000008E | 300003 | R | JNB | NKEY19 | K_INCRNG,NKEY19 |
| 201 | 00000091 | 020000 | RU | JMP | | RANGUP |
| 202 | 00000094 | 300003 | R | JNB | NKEY20 | K_INCGAIN,NKEY20 |
| 203 | 00000097 | 020000 | RU | JMP | | GAININCR |
| 204 | 0000009A | 300003 | R | JNB | NKEY21 | K_DAY_NIG,NKEY21 |
| 205 | 0000009D | 020000 | RU | JMP | | DAYNITE |
| 206 | 000000A0 | 300003 | R | JNB | NKEY22 | K_DECRRL,NKEY22 |
| 207 | 000000A3 | 020000 | RU | JMP | | BRILLDCR |
| 208 | 000000A6 | 300003 | R | JNB | ENDKEY | K_INCBRL,ENDKEY |
| 209 | 000000A9 | 020000 | RU | JMP | | BRILLINCR |
| 210 | | | | | | |
| 211 | | | | | | |
| 212 | 000000AC | 00 | | ENDKEY NOP | | ; S/U test point to trap false |
| 213 | | | | | | ; key depressions |
| 214 | | | | DUMMYAC | | ; dummy address |
| 215 | | | | | | |

```
216   000000AD 00                         NOP                          ; S/U test point to trap false
217                                                                    ; key depressions
218
219                           ; KEY TERMINATION
220                           ; ===============
221                           ;
222                           ; Used by all activities to stop action when a key is released
223                           ;
224                           TERMINATE
225
226
227                           ; terminate activity
228
229
230                           ; 1) reset all the key flags. Assumes that only one
231                           ; key is pressed at a time.
232                           ;
233
234   000000AE 750000   R      MOV      KEYB0,#0
235   000000B1 750000   R      MOV      KEYB1,#0
236   000000B4 750000   R      MOV      KEYB2,#0        ; set all key flags to zero
237
238                           ; 2) now wait for the strobe bit on the keyboard to be low
239                           ; for a period of time. This is necessary because the
240                           ; strobe line goes low if another key is pressed which
241                           ; changes the code received by the receiver chip, because
242                           ; the receiver debounce detects an invalid code at the code
243                           ; transition.
244                           ;
245                           KEYLOW   EQU     50         ; approximate length of delay
246                           KEYDELST
247   000000B7 7932            MOV      R1,#KEYLOW
248                           KEYDEL
249   000000B9 E2              MOVX     A,@R0            ; read key value ; address is
250                                                                       ; irrelevant
251   000000BA 20E7FA          JB       ACC.7,KEYDELST   ; start the delay again if the
252                                                      ; strobe line goes high
253   000000BD D9FA            DJNZ     R1,KEYDEL
254
255                           ; delay expired ; revert to looking for the next key
256                           ; depression
257
258                           TERM3
259                                                      ; 3) jump back to controller
```

```
271  000000BF 0100  R        JMP      CTRLLR2
272
273                          END
274
Scalars ACC.0-----------000000F0      ACC.1-----------000000F1     ACC.2-----------000000E2     ACC.3-----------000000E3
ACC.4-----------000000E4      ACC.5-----------000000E5     ACC.6-----------000000E6     ACC.7-----------000000E7
DELTA-----------00000014      KEYLOW----------00000032     MAXKEY----------00000017     MINKEY----------00000000

Section = CONTROL, Class = CODE, Byte Relocatable, Size = 000000C1

CTRLLR----------00000000 G    CTRLLR10--------0000001C     CTRLLR2---------00000000     CTRLLR8---------00000015
DUMMYAC---------000000AD      ENDKEY----------000000AC     KEYDEL----------000000B9     KEYDELST--------000000B7
NKEY0-----------00000022      NKEY1-----------0000002B     NKEY10----------0000005E     NKEY11----------00000064
NKEY12----------0000006A      NKEY13----------00000070     NKEY14----------00000076     NKEY15----------0000007C
NKEY16----------000000B2      NKEY17----------00000008     NKEY18----------000000BE     NKEY19----------00000094
NKEY2-----------0000002E      NKEY20----------0000009A     NKEY21----------000000A0     NKEY22----------000000A6
NKEY3-----------00000034      NKEY4-----------0000004C     NKEY5-----------00000052     NKEY6-----------00000046
NKEY7-----------0000004C      NKEY8-----------00000052     NKEY9-----------00000058     TERM3-----------000000BF
TERMINATE-------000000AE G

Section = X, Byte Relocatable, Size = EMPTY

Unbound Globals

ALARM-----------00000000      ALARMH----------00000000     ALRMTRIG--------00000000     ANY_KEY---------00000000
BIT0------------00000000      BIT1------------00000000     BIT2------------00000000     BIT3------------00000000
BIT4------------00000000      BIT5------------00000000     BIT6------------00000000     BIT7------------00000000
BRILLDECR-------00000000      BRILLINCR-------00000000     BUZZER----------00000000     CLOCK0----------00000000
CLOCK1----------00000000      CLOCK2----------00000000     DAYNITE---------00000000     DELAY-----------00000000
EBMDECR---------00000000      EBMINCR---------00000000     FILL_BOX--------00000000     F_THERO---------00000000
F_THER1---------00000000      GAINDECR--------00000000     GAININCR--------00000000     GDZONE----------00000000
HIGING----------00000000      HOLDD-----------00000000     KEYB0-----------00000000     KEYB1-----------00000000
KEYB2-----------00000000      KEY_VALUE-------00000000     K_ALRM----------00000000     K_DAY_NIG-------00000000
K_DECBRL--------00000000      K_DECEBM--------00000000     K_DECGAIN-------00000000     K_DECRNG--------00000000
K_DECSCL--------00000000      K_DECTUN--------00000000     K_DECVRM--------00000000     K_GUARDZ--------00000000
K_HEAU----------00000000      K_HOLD----------00000000     K_INCBRL--------00000000     K_INCEBM--------00000000
K_INCGAIN-------00000000      K_INCRNG--------00000000     K_INCSCL--------00000000     K_INCTUN--------00000000
K_INCVRM--------00000000      K_ON_OFF--------00000000     K_PERSIS--------00000000     K_RAINCL--------00000000
K_RRINGS--------00000000      K_TEST----------00000000     LOOPCNT---------00000000     MSBRAM----------00000000
RAINCLUT--------00000000      RAMH------------00000000     RAML------------00000000     RANGDOWN--------00000000
RANGUP----------00000000      RINGS-----------00000000     SFACDECR--------00000000     SFACINCR--------00000000
SEARCHGDZ-------00000000      STANDBY---------00000000     TEST------------00000000     TRAK------------00000000
TUNDECR---------00000000      TUNINCR---------00000000     VRMDECR---------00000000     VRMINCR---------00000000
```

```
220                         ; GUARD ZONE ACTIVATE/DEACTIVATE
221                         ; ==============================
222                         ;
223
224
225
226                         FULLCIRC     EQU    360H4
227                    5A0  HALFRANG     EQU    192/2
228                    60
229
230                         ; CODE
231                         ; ----
232                         ;
233
234                         GDZONE
235
236                                      JB     ALARM,GDZONE1      ; Jump if alarm is set ; ( i.e.
237                                                                ; do nothing )
238  00000057 300001   R                 JNB    ALARM,GDZONEBO
239  0000005A 0201BB   R                 JMP    GDZONE1
240                         GDZONEBO
241
242                         ;
243                                      JB     G_ZONE,CANCGZ      ; Jump if guard zone is active ;
244                                                                ; i.e., we have to cancel the
245                                                                ; guard zone
246  0000005D 300003   R                 JNB    G_ZONE,GDZONEB1
247  00000060 0201BE   R                 JMP    CANCGZ
248                         GDZONEB1
249
250                         ; Activate guard zone
251                         ;
252                                      ; write message to indicate active guard zone
253
254
255  00000063 D200     RU                 SETB   MEGSWR
256
257  00000065 750000   RU                 MOV    RAMH,#ZONEY        ; Y position
258
259  00000068 750000   RU                 MOV    RAML,#LO(ZONEX)    ; LS byte of X posn
260  0000006B 7400     RU                 MOV    A,#HI(ZONEX)
261  0000006D 13                          RRC    A
262  0000006E 9200     RU                 MOV    MSBRAM,C           ; MS bit of X position
263
264  00000070 900000   RU                 MOV    DPTR,#ZONE6        ; message identifier
265
266  00000073 120000   RU                 LCALL  PRINT
267
268                         ;
269                                      ; start second EBM at the same angle as the first if entering
270                                      ; guard zone for the first time
271                         ;
272  00000076 200006   R                  JB     GBZENTER,GDZONE50
273
```

```
                                           ; angle = NEWEBM1:NEWEBM0
274
275  00000079 850000    RU         MOV    EBMB1,NEWEDM1
276  0000007C B50000    RU         MOV    EBMB0,NEWEBM0
277
278
279                    GDZONE50
280
281                                           ; set EBMP1:EBMP0 = EBM position + 360
282
283  0000007F E500      RU         MOV    A,NEWEBM0
284  000000B1 24A0      RU         ADD    A,#LO(FULLCIRC)
285  00000083 F500      RU         MOV    EBMP0,A
286
287  00000085 E500      RU         MOV    A,NEWEBM1
288  00000087 3405      RU         ADDC   A,#HI(FULLCIRC)
289  00000089 F500      RU         MOV    EBMP1,A
290
291                                           ; set EBMM1:EBMM0 = EBM position - 360
292
293
294  0000008B C3        RU         CLR    C
295  0000008C E500      RU         MOV    A,NEWEBM0
296  0000008E 94A0      RU         SUBB   A,#LO(FULLCIRC)
297  00000090 F500      RU         MOV    EBMM0,A
298
299  00000092 E500      RU         MOV    A,NEWEBM1
300  00000094 9405      RU         SUBB   A,#HI(FULLCIRC)
301  00000096 F500      RU         MOV    EBMM1,A
302
303  00000098 D200      RU         SETB   G_ZONE
304
305                                           ; if range rings are set, then erase them and write up
306                                           ; 'VRM' legend
307
308  0000009A 300024    R          JNB    R_RING,GDZONE3      ; jump if no rings
309
310                                           ; erase r. rings
311
312  0000009D D200      RU         SETB   E_VRM
313
314  0000009F 120000    RU         LCALL  V_00
315
316  000000A2 7500C0    R          MOV    VECTOR,#192
317  000000A5 120000    RU         LCALL  RING
318
319  000000AB 750090    R          MOV    VECTOR,#144         ; set for continuous line
320  000000AB 120000    RU         LCALL  RING
321
322  000000AE 750060    R          MOV    VECTOR,#96
323  000000B1 120000    RU         LCALL  RING
324
325  000000B4 750030    R          MOV    VECTOR,#48
326  000000B7 120000    RU         LCALL  RING
327
```

```
328                                            ; write up VRM legend
329
330 000000BA  C200           RU        CLR     R_RING            ; pretend that VRM is selected, not
331 000000BC  120000         RU        LCALL   VRWRITE           ; range rings
332 000000BF  D200           RU        SETB    R_RING            ; correct rings-flag
333
334
335
336                         GDZONE3
337                                            ; Draw the VRM (moving it to the mid position if not in range).
338                                            ; Calculate VRM screen position ;
339
340 000000C1  E500           RU        MOV     A,VRMA1
341 000000C3  B500F0         R         MOV     B,VRMA0           ; VRM A in A:B
342 000000C6  120000         RU        LCALL   SETVECT
343
344 000000C9  200021         R         JB      VRMONSCR,GDZONE14 ; Jump if VRM on screen
345
346                                            ; VRM is off - screen ; move to centre of screen
347
348 000000CC  D200           RU        SETB    VRMONSCR          ; set to on screen
349
350 000000CE  7400                     MOV     A,#0
351 000000D0  75F060                   MOV     B,#HALFRANG       ; new radius in A:B
352 000000D3  AB00                     MOV     R0,RANGE
353
354                                            ; set up VRM A position to correspond to the mid position
355
356                         GDZONE20
357 000000D5  D003                     DJNZ    R0,GDZONE21
358 000000D7  0200E3         R         JMP     GDZONE22
359
360                         GDZONE21
361                                            ; posn = posn * 2
362
363 000000DA  C3                       CLR     C
364 000000DB  C5F0                     XCH     A,B
365 000000DD  33                       RLC     A
366 000000DE  C5F0                     XCH     A,B
367 000000E0  33                       RLC     A
368
369 000000E1  80F2                     JMP     GDZONE20
370
371                         GDZONE22
372
373 000000E3  F500           RU        MOV     VRMA1,A
374 000000E5  85F000         RU        MOV     VRMA0,B           ; new VRM positon
375
376 000000E8  7460                     MOV     A,#HALFRANG
377 000000EA  750060         R         MOV     VECTOR,#HALFRANG  ; new radius
378
379                         GDZONE14
380
381                                            ; set second VRM to the same position as the first
```

```
                                                ; if entering guard zone for the first time
00000ED 200009    R                     JB      GDZENTER,GDZONE32
                                                ; entering zone for the first time
0000F0 850000     RU                    MOV     VRMB1,VRMA1
0000F3 850000     RU                    MOV     VRMB0,VRMA0
0000F6 020144     R                     JMP     GDZONE33
                                GDZONE32
                                                ; guard zone has been set before ; leave VRM B undisturbed
                                                ; if it is on the screen, otherwise set it to VRM A
0000F9 E500       RU                    MOV     A,VRMB1
0000FB 8500F0     R                     MOV     B,VRMB0
0000FE 120000     RU                    LCALL   SETVECT              ; VRM B in A:B
                                                ; VRM B is on the screen if A:B <= 192
00000101 C3                             CLR     C
00000102 C5F0                           XCH     A,B
00000104 94C1                           SUBB    A,#193
00000106 C5F0                           XCH     A,B
00000108 9400                           SUBB    A,#0
0000010A 20E706                         JB      ACC.7,GDZONE34       ; Jump if VRM B on screen
                                                ; VRM B off screen ; set to VRM A
0000010D 850000   RU                    MOV     VRMB1,VRMA1
00000110 850000   RU                    MOV     VRMB0,VRMA0
                                GDZONE34
                                                ;
                                                ; Because the guard zone has been set before, the angle of EBM B
                                                ; has to be set correctly relative to EBM A.
                                                ;
                                                ; If the flag GDZSIGN is set (zone goes EBM B to EBM A), then
                                                ; the angle of EBM B must be less than EBM A, so check if it is
                                                ; and subtract 360 degrees if it is not.
                                                ;
                                                ; Similarly, if the zone is EBM A to B, the angle of EBM B must be
                                                ; greater than EBM A, so if it is not then add 360 degrees.
                                                ;
00000113 200018   R                     JB      GDZSIGN,GDZONE35     ; jump if zone goes EBM B
                                                                     ; to EBM A
                                                ; zone is EBM A to B
                                                ; add 360 deg if EBM B < EBM A ?
```

```
437         00000116 7800    RU          MOV     R0,#EBMB0
438         00000118 7900    RU          MOV     R1,#NEWEBM0
439         0000011A 120000  RU          LCALL   SUBTRACT
440
441         0000011D 5025                JNC     GDZONE33            ; Jump if EBM B is not < EBM A
442
443                                      ; EBM B = EBM B + 360 degrees
444
446         0000011F E500    RU          MOV     A,EBMB0
447         00000121 24A0                ADD     A,#0A0H
448         00000123 F500    RU          MOV     EBMB0,A
449         00000125 E500    RU          MOV     A,EBMB1
450         00000127 3405                ADDC    A,#5
451         00000129 F500    RU          MOV     EBMB1,A
452
453         0000012B 020144  R           JMP     GDZONE33
454
455                                 GDZONE35
456
457                                      ; zone it EBM B to A
458
459                                      ; subtract 360 degrees if EBM B > EBM A
460
461         0000012E 7000    RU          MOV     R0,#NEWEBM0
462         00000130 7900    RU          MOV     R1,#EBMB0
463         00000132 120000  RU          LCALL   SUBTRACT
464
465         00000135 500D                JNC     GDZONE33            ; jump if EBM B is not > EBM A
466
467                                      ; EBM B = EBM B - 360 degrees
468
469         00000137 C3                  CLR     C
470         00000138 E500    RU          MOV     A,EBMB0
471         0000013A 94A0                SUBB    A,#0A0H
472         0000013C F500    RU          MOV     EBMB0,A
473         0000013E E500    RU          MOV     A,EBMB1
474         00000140 9405                SUBB    A,#5
475         00000142 F500    RU          MOV     EBMB1,A
476
477                                 GDZONE33
478
479                                      ; erase VRM A and draw it as a dotted VRM
480
481         00000144 E500    RU          MOV     A,VRMA1
482         00000146 8500F0  R           MOV     B,VRMA0
483         00000149 120000  RU          LCALL   SETVECT             ; VRM A in A:B
484
485         0000014C D200    RU          SETB    E_VRM               ; set for continuous
486         0000014E 120000  RU          LCALL   W_00
487         00000151 120000  RU          LCALL   RING                ; erase it
488
489         00000154 C200    RU          CLR     E_VRM
490         00000156 120000  RU          LCALL   W_11                ; set for dotted
```

```
491  00000159 120000   RU          LCALL  RING                           ; draw it dotted
492
493
494                                ; erase VRM B and draw it as a dotted VRM
495  0000015C E500     RU          MOV    A,VRMB1
496  0000015E B500F0   R           MOV    B,VRMB0                        ; VRM B in A:B
497  00000161 120000   RU          LCALL  SETVECT
498
499  00000164 D200     RU          SETB   E_VVRH                         ; set for continuous
500  00000166 120000   RU          LCALL  W_00
501  00000169 120000   RU          LCALL  RING                           ; erase it
502
503  0000016C C200     RU          CLR    E_VVRH                         ; set for dotted
504  0000016E 120000   RU          LCALL  W_11
505  00000171 120000   RU          LCALL  RING                           ; draw it dotted
506
507                                ; write angle of EBM B to display
508
509  00000174 B50000   RU          MOV    ANGLE1,EBMR1
510  00000177 B50000   RU          MOV    ANGLE0,EBMR0
511
512                                ; draw EBM B if not at zero
513
514  0000017A E500     RU          MOV    A,ANGLE1
515  0000017C 7004     RU          JNZ    GDZONE61
516  0000017E E500     RU          MOV    A,ANGLE0
517  00000180 6008     RU          JZ     GDZONE60                       ; jump if non zero
518                                                                      ; jump if zero
519                    GDZONE61
520
521  00000182 C200     RU          CLR    E_VEDM                         ; set for dotted
522  00000184 120000   RU          LCALL  W_11
523  00000187 120000   RU          LCALL  WR_EBM
524
525                    GDZONE60
526
527  0000018A 120000   RU          LCALL  W_11
528  0000018D 120000   RU          LCALL  ANGURITE
529
530                                ; write position of VRM B to display
531
532  00000190 750000   RU          MOV    RAM1,#URMYN                    ; Y position
533  00000193 750000   RU          MOV    RAM1,#LO(VRMXN)                ; LS byte of X position
534  00000196 7400     RU          MOV    A,#HI(VRMXN)
535  00000198 13                   RRC    A
536  00000199 9200     RU          MOV    MSBRAM,C                       ; MS bit of X position
537
538  0000019B E500     RU          MOV    A,VRMB1
539  0000019D B500F0   R           MOV    B,VRMB0
540
541  000001A0 120000   RU          LCALL  DISTURITE
542
543                                ; write VRM B units to agree with number
544
```

```
545  000001A3 750000    RU              MOV     RAMH,#VRMYU                     ; Y position
546  000001A6 750000    RU              MOV     RAMH,#LO(VRMXU)                 ; LS byte of X position
547  000001A9 7400      RU              MOV     A,#HI(VRMXU)
548  000001AB 13                        RRC     A
549  000001AC 9200      RU              MOV     MSBRAM,C                        ; MS bit of X position
550
551  000001AE E500      RU              MOV     A,VRMB1
552  000001B0 B500F0    R                MOV     B,VRMBO
553
554  000001B3 120000    RU              LCALL   UNIWRITE
555
556  000001B6 D200      RU              SETB    GDZENTER                        ; indicates that guard zone has been
557                                                                             ; entered at least once, when
558                                                                             ; tested on subsequent entries to the
559                                                                             ; guard zone
560
561  000001B8 2000FD    R       GDZONE1 JB      ANY_KEY,GDZONE1                 ; keep looping here while
562                                                                             ; the key continues to be held down
563
564                            ; exit
565
566  000001BB 020000    RU              JMP     TERMINATE
567
568                            ; Cancel guard zone
569
570
571
572
573  000001BE C200      RU      CANCGZ  CLR     GDZDRAWN                        ; indicate that zone is no longer
574                                                                             ; drawn
575
576                            ; erase message to indicate inactive guard zone
577
578  000001C0 C200      RU              CLR     MESSUR
579  000001C2 750000    RU              MOV     RAMH,#ZONEY                     ; Y position
580
581  000001C5 750000    RU              MOV     RAMH,#LO(ZONFX)                 ; LS byte of X posn
582  000001C8 7400      RU              MOV     A,#HI(ZONCX)
583  000001CA 13                        RRC     A
584  000001CB 9200      RU              MOV     MSBRAM,C                        ; MS bit of X position
585
586  000001CD 900000    RU              MOV     DPTR,#ZONES                     ; message identifier
587
588  000001D0 120000    RU              LCALL   PRINT
589
590                            ; erase two VRMs, two EDMs and the guard zone search line
591
592
593  000001D3 120000    RU              LCALL   W_00                            ; write zeros
594  000001D6 D200      RU              SETB    E_WEBH
595  000001DB D200      RU              SETB    E_WVRM                          ; set flags for continuous erasure
596
597
598                            ; VRM A
```

| | | | | | | |
|---|---|---|---|---|---|---|
| 599 | 000001DA | E500 | RU | | MOV | A,VRMA1 |
| 600 | 000001DC | B500F0 | R | | MOV | B,VRMA0 |
| 601 | 000001DF | 120000 | RU | | LCALL | SETVECT |
| 602 | 000001E2 | 120000 | RU | | LCALL | SLOW_RING |
| 603 | | | | | | |
| 604 | | | | ; VRM B | | |
| 605 | | | | | | |
| 606 | 000001E5 | E500 | RU | | MOV | A,VRMB1 |
| 607 | 000001E7 | B500F0 | R | | MOV | B,VRMB0 |
| 608 | 000001EA | 120000 | RU | | LCALL | SETVECT |
| 609 | 000001ED | 120000 | RU | | LCALL | SLOW_RING |
| 610 | | | | | | |
| 611 | | | | ; EBM A | | |
| 612 | | | | | | |
| 613 | 000001F0 | 850000 | RU | | MOV | ANGLE1,NEWEBM1 |
| 614 | 000001F3 | 850000 | RU | | MOV | ANGLE0,NEWEBM0 |
| 615 | 000001F6 | 120000 | RU | | LCALL | WR_EBM |
| 616 | | | | | | |
| 617 | | | | ; EBM B | | |
| 618 | | | | | | |
| 619 | 000001F9 | 850000 | RU | | MOV | ANGLE1,EBMR1 |
| 620 | 000001FC | 850000 | RU | | MOV | ANGLE0,EBMR0 |
| 621 | 000001FF | 120000 | RU | | LCALL | WR_FIM |
| 622 | | | | | | |
| 623 | | | | ; guard zone search line | | |
| 624 | | | | | | |
| 625 | 00000202 | 850000 | RU | | MOV | ANGLE1,GDANG1 |
| 626 | 00000205 | 850000 | RU | | MOV | ANGLE0,GDANG0 |
| 627 | 00000208 | 120000 | RU | | LCALL | WR_EBM |
| 628 | | | | | | |
| 629 | | | | ; rewrite EBM | | |
| 630 | | | | | | |
| 631 | 0000020B | C200 | RU | | CLR | E_WFBM | ; dotted EBM |
| 632 | 0000020D | 120000 | RU | | LCALL | W_11 |
| 633 | 00000210 | 850000 | RU | | MOV | ANGLE1,NEWEBM1 |
| 634 | 00000213 | 850000 | RU | | MOV | ANGLE0,NEWEBM0 |
| 635 | 00000216 | 120000 | RU | | LCALL | WR_EBM |
| 636 | | | | | | |
| 637 | | | | ; if range rings were set, then redraw them | | |
| 638 | | | | | | |
| 639 | 00000219 | 300026 | R | | JNB | R_RING,GDZONE30 | ; jump if no rings |
| 640 | | | | | | |
| 641 | | | | ; write r_rings | | |
| 642 | | | | | | |
| 643 | 0000021C | D200 | RU | | SETB | E_WVRM | ; set for continuous line |
| 644 | | | | | | |
| 645 | 0000021E | 120000 | RU | | LCALL | W_11 |
| 646 | | | | | | |
| 647 | | | | | | |
| 648 | 00000221 | 7500C0 | R | | MOV | VECTOR,#192 |
| 649 | 00000224 | 120000 | RU | | LCALL | RING |
| 650 | | | | | | |
| 651 | 00000227 | 750090 | R | | MOV | VECTOR,#144 |
| 652 | 0000022A | 120000 | RU | | LCALL | RING |

```
653
654   00000220 750060    R    MOV     VECTOR,#96
655   00000230 120000    RU   LCALL   RING
656
657   00000233 750030    R    MOV     VECTOR,#48
658   00000236 120000    RU   LCALL   RING
659
660                          ; redraw range rings legend, number and units
661
662   00000239 120000    RU   LCALL   VRWRITE
663   0000023C 120000    RU   LCALL   RIWRITE
664
665
666   0000023F 02027F    R    JMP     GDZONE31
667                     GDZONE30
668
669                          ; no range rings ; redraw VRM in the position of the
670                          ; VRM A.
671
672   00000242 120000    RU   LCALL   W_11
673
674   00000245 E500           MOV     A,VRMA1
675   00000247 B500F0         MOV     B,VRMA0
676   0000024A 120000    RU   LCALL   SETVECT
677   0000024D 120000    RU   LCALL   RING
678
679                          ; write position of VRM A to display
680
681   00000250 750000    RU   MOV     RAMH,#VRMYN          ; Y position
682   00000253 750000    RU   MOV     RAML,#LO(VRMXN)      ; LS byte of X position
683   00000256 7400      RU   MOV     A,#HI(VRMXN)
684   00000258 13             RRC     A
685   00000259 9200      RU   MOV     MSBRAM,C             ; MS bit of X position
686
687   0000025B E500           MOV     A,VRMA1
688   0000025D B500F0    R    MOV     B,VRMA0
689
690   00000260 120000    RU   LCALL   DISTWRITE
691
692
693                          ; write VRM A units to agree with number
694   00000263 750000    RU   MOV     RAMH,#VRMYU          ; Y position
695   00000266 750000    RU   MOV     RAML,#LO(VRMXU)      ; LS byte of X position
696   00000269 7400      RU   MOV     A,#HI(VRMXU)
697   0000026B 13             RRC     A
698   0000026C 9200      RU   MOV     MSBRAM,C             ; MS bit of X position
699
700   0000026E E500      RU   MOV     A,VRMA1
701   00000270 B500F0    R    MOV     B,VRMA0
702
703   00000273 120000    RU   LCALL   UNITWRITE
704
705                          ; write angle of EBM A to display
706
```

```
707  00000276 850000    RU           MOV     ANGLE1,NEWFBM1
708  00000279 850000    RU           MOV     ANGLE0,NEWEBM0
709
710  0000027C 120000    RU           LCALL   ANGWRITE
711
712                                  ; refresh the permanent parts
713                                  ; of the display
714  0000027F 120000    RU  GDZONE31 LCALL   PERMDISP
715
716  00000282 C200          RU       CLR     0_ZONE
717
718
719  00000284 2000FD    R            GDZONE2 JB  ANY_KEY,GDZONE2
720                                  ; keep looping here while
721                                  ; the key continues to be held down
722                                  ; exit
723
724  00000287 020000    RU           JMP     TERMINATE
725
726
727
728                                  END
```

Scalars

```
ACC.0------------00000000E0   ACC.1-----------000000E1   ACC.2-----------000000E2   ACC.3-----------000000E3
ACC.4------------00000000E4   ACC.5-----------000000E5   ACC.6-----------000000E6   ACC.2-----------000000E7
FULLCIRC---------000005A0     HALFRANG--------00000060    P1.0-----------00000090    P1.1-----------00000091
P1.2-------------00000092     P1.3------------00000093    P1.4-----------00000094    P1.5-----------00000095
P1.6-------------00000096     P1.7------------00000097
WORD3------------00000047                                 WORD1-----------00000059   WORD2-----------0000003A
```

Section = KEYACJ, Class = CODE, Byte Relocatable, Size = 000002BA

```
CANCG2-----------000001DE     GDZONE----------00000057  Q  GDZONE1--------000001B8   GDZONE14--------000000ED
GDZONE2----------00000284     GDZONE20--------000000D5    GDZONE21--------000000DA   GDZONE22--------000000E3
GDZONE31---------000000C1     GDZONE30--------00000242    GDZONE31--------0000027F   GDZONE32--------000000F9
GDZONE33---------00000144     GDZONE34--------00000113    GDZONE35--------0000012E   GDZONE50--------0000007F
GDZONE60---------0000001A     GDZONE61--------00000182    GDZONE80--------0000005D   GDZONE81--------00000063
STANDBY----------00000000  G  STANDBY1--------00000047    STANDBY33-------0000004D   THEEND----------00000054
```

Section = I, Byte Relocatable, Size = EMPTY

Unbound Globals

```
ALARM------------00000000     ANGLE0----------00000000    ANGLE1---------00000000    ANGWRITE--------00000000
ANY_KEY----------00000000     CLOCK0----------00000000    CLOCK1---------00000000    DISWRITE--------00000000
```

```
ASH                              Page    1
V01.0B-56  (B560)

; Name : vrm

;**********************************************
;*                                            *
;*              VRM MOVEMENT                  *
;*                                            *
;**********************************************

; Contains the following entry points :
;
        GLOBAL  VRMINCR                 ; entry point for VRM increment
        GLOBAL  VRMDECR                 ; entry point for VRM decrement ; Internally defined routines :
        GLOBAL  VRMSTEP ; Internally defined constants :
        GLOBAL  MAXRANG                 ; maximum display range.( edge of
                                        ; graticule )

; The following are defined externally :
;
; external routines

GLOBAL  RING                    ; writes/erases circle drawn
                                        ; around radar screen centre
```

```
37          GLOBAL  W_11,W_00                    ; set data lines to memory to
38                                               ; 1's and 0's respectively
39
40          GLOBAL  POINT
41          GLOBAL  RAO
42          GLOBAL  DISTWRITE,UNITWRITE
43          GLOBAL  SETVECT
44          GLOBAL  PERMDISP
45
46          GLOBAL  GVRMINCR                     ; entry point for VRM increment
47                                               ; when in guard zone mode
48          GLOBAL  GVRMDECR                     ; entry point for VRM decrement
49                                               ; when in guard zone mode
50          GLOBAL  TERMINATE                    ; key response termination
51
52          ; external variables
53
54          GLOBAL  F_UVRM
55          GLOBAL  F_TMER1,F_TMER0
56          GLOBAL  KEY_VALUE
57          GLOBAL  VECTOR
58          GLOBAL  VRMA1,VRMA0
59          GLOBAL  RANGE
60          GLOBAL  ANY_KEY
61          GLOBAL  NEWEDM1,NEWEDM0
62          GLOBAL  ANGLE1,ANGLE0
63          GLOBAL  G_ZONE
64          GLOBAL  MSBRAM,RAMH,RAML
65          GLOBAL  VRMONSCR
66          GLOBAL  R_RING
67
68          ; external constants
69
70          GLOBAL  DASH
71          GLOBAL  VRMXN,VRMYN,VRMXU,VRMYU
72          GLOBAL  ST_CBM
73
74
75      90          P1.0    EQU     90H
76      91          P1.1    EQU     91H
77      92          P1.2    EQU     92H
78      93          P1.3    EQU     93H
79      94          P1.4    EQU     94H
80      95          P1.5    EQU     95H
81      96          P1.6    EQU     96H
82      97          P1.7    EQU     97H
83
84      E0          ACC.0   EQU     0F0H
85      E1          ACC.1   EQU     0E1H
86      E2          ACC.2   EQU     0E2H
87      E3          ACC.3   EQU     0E3H
88      E4          ACC.4   EQU     0E4H
89      E5          ACC.5   EQU     0E5H
90      E6          ACC.6   EQU     0E6H
```

```
 91              EZ      ACC.7    EQU    0E7H
 92
 93
 94
 95              CO      MAXRANG  EQU    192           ; maximum display range ( edge of
 96                                                    ; graticule )
 97
 98
 99
100                     SECTION KEYAC2,CLASS-CODE
101
102
103
104                             ; NOTE : When in guard zone mode, a different function is performed.
105                             ; As a result, a jump is performed when in guard zone mode.
106                             ;
107
108
109
110                             ; VRM-ACTION
111                             ; =========
112                             ;
113                             ; VRM key response.
114                             ;
115                             ; Level sensitive, moves VRM at a rate proportional to time.
116                             ; Direction of movement is fixed by two different entry points.
117                             ;
118                             ; The screen numerical display must be updated at the end of every
119                             ; VRM write.
120                             ;
121                             ; Position of VRM in VRMA1:VRMA0.
122                             ;
123
124
125                             ; VRM increment entry point
126                             ;
127
128
129                             ; VRM increments
130                             ;
131                             ; The increments proceed 0,1,2 as the key continues to be held down.
132
133
134
135              1              VRMSTEP0  EQU   1
136              5              VRMSTEP1  EQU   5
137              14             VRMSTEP2  EQU   20
138
139                     VRMINCR
140
141  00000000 300003  R          JNB   G_ZONE,VRMINCRB0   ; Jump if not in guard zone mode.
142  00000003 020000  RU         JMP   GVRMINCR
143
144                     VRMINCRB0
```

```
145
146                                           ; only do something if rings are not selected
147
148   00000006 300003       R       JNB     R_RING,VRMINCR01
149   00000009 020000       RU      JMP     TERMINATE            ; Jump if VRM selected.
150
151                         VRMINCR01
152
153                                           ; position = VRMA1:VRMA0
154
155   0000000C E500         RU      MOV     A,VRMA1
156   0000000E B50010       R       MOV     B,VRMA0
157
158   00000011 120000       RU      LCALL   SETVECT              ; set up radius
159
160   00000014 200003       R       JB      VRMONSCR,VRMINCR2    ; Jump if on screen
161
162   00000017 750000       R       MOV     VECTOR,#0            ; if off screen, revert to 0 and start
163                                                              ; from there
164
165                         VRMINCR2
166
167   0000001A D200         RU      SETB    E_VRM                ; set for continuous
168
169                                 ; erase current VRM at VECTOR ( if current VRM is on the screen )
170
171
172
173   0000001C 300009       R       JNB     VRMONSCR,VRMINCR50   ; Jump if off screen
174
175   0000001F 120000       RU      LCALL   W_00                 ; want to write zeros into
176                                                              ; the frame store
177   00000022 120000       RU      LCALL   RING                 ; erase old VRM
178
179   00000025 1200ED       R       LCALL   REPAIR_EBM           ; fix the EBM if we have damaged it
180
181                         VRMINCR50
182
183
184                                 ; increment VRM value by an amount depending on the
185                                 ; length of time the key has been depressed
186
187
188   00000028 1200DA       R       LCALL   VRMSTEP              ; step size in R0
189
190                                 ; position = position + step
191
192   0000002B C3                   CLR     C
193   0000002C 2500         RU      ADD     A,VECTOR
194   0000002E 5002                 JNC     VRMINCR40            ; jump if no overflow
195
196   00000030 74C0                 MOV     A,#MAXRANG           ; overflow
197
198                         VRMINCR40
199
200   00000032 F500         RU      MOV     VECTOR,A
```

```
201
202
203
204
205                                            ; now write VRM, update screen display and check if we have
206                                            ; finished
207  00000034 120070    R          LCALL   NO_VRM
208
209  00000037 00E1                 JMP     VRMINCR2        ; continue if key is still depressed
210
211                                ;
212                                ; VRM decrement entry point
213                                ;
214                        VRMDECR:
215
216
217                        VRMDECR:
218  00000039 300003    R          JNB     G_ZONE,VRMDECR0
219  0000003C 020000    RU         JMP     GVRMDECR
220
221                        VRMDECR0:
222
223                                            ; only do something if rings are not selected
224
225  0000003F 300003    R          JNB     R_RING,VRMDECR1         ; Jump if VRM selected.
226  00000042 020000    RU         JMP     TERMINATE
227
228                        VRMDECR1:
229
230                                ; position = VRMA1:VRMA0
231
232  00000045 E500      RU          MOV     A,VRMA1
233  00000047 8500F0    R           MOV     B,VRMA0
234
235  0000004A 120000    RU         LCALL   SETVECT                 ; set up range
236
237  0000004D 200003    R           JB      VRMONSCR,VRMDECR2       ; Jump if on screen
238
239                                ; VRM off screen : revert to maximum and decrease from there
240
241  00000050 7500C0    R           MOV     VECTOR,#MAXRANG
242
243                        VRMDECR2:
244
245  00000053 D200      RU         SETB    E_WVRM                  ; set for continuous
246
247                                ;
248                                ; erase current VRM at VECTOR ( if it is on the screen )
249                                ;
250
251  00000055 300007    R           JNB     VRMONSCR,VRMDECR50      ; jump if off screen
252
253  00000058 120000    RU         LCALL   W_00                    ; want to write zeros into
254                                                                ; the frame store
255  0000005B 120000    RU         LCALL   RING                    ; erase old VRM
```

```
256
257  0000005E 1200ED     R         LCALL   REPAIR_EBM              ; fix the EBM if we have damaged it
258
259                                VRMDECR50:
260
261  ;
262  ; decrement VRM value by an amount depending on the
263  ; length of time the key has been depressed
264
265  00000061 1200DA     R         LCALL   VRMSTEP                 ; step size in R0
266
267  ; position = position - step
268
269  00000064 C3                   CLR     C
270  00000065 F5F0                 MOV     B,A
271  00000067 E500       RU        MOV     A,VECTOR
272  00000069 95F0                 SUBB    A,B
273  0000006B 5006                 JNC     VRMDECR40               ; jump if no underflow
274
275  0000006D 750000     R         MOV     VECTOR,#0
276  00000070 020075     R         JMP     VRMDECR41               ; stop here if underflow
277
278                                VRMDECR40:
279
280  00000073 F500       RU        MOV     VECTOR,A
281
282                                VRMDECR41:
283
284  ;
285  ; now write VRM, update screen display and check if we have
286  ; finished
287  ;
288  00000075 12007A     R         LCALL   DO_VRM
289
290  00000078 80D9                 JMP     VRMDECR2                ; continue if key is still depressed
291
292  ;
293  ; DO_VRM : draws the VRM, updates the numerical indication of the
294  ; VRM position, and exits if key depression has ended.
295  ;
296  ; returns :         key code in A
297  ;
298                                DO_VRM:
299
300  0000007A D200       RU        SETB    VRMONSCR                ; set to on screen ; by the time we
301                                                                ; get here, the VRM has been moved
302                                                                ; on to the screen
303
```

```
309
310
311                                       ; if position >= MAXRANG, then set position to MAXRANG
312  0000007C C3            RU       CLR  C
313  0000007D E500          RU       MOV  A,VECTOR
314  0000007F 94C0                   SUBB A,#MAXRANG
315  00000081 4003                   JC   DO_VRM100         ; jump if do nothing
316
317                                       ; set posn. to MAXRANG
318
319  00000083 7500C0        R        MOV  VECTOR,#MAXRANG
320
321                          DO_VRM100
322
323  00000086 120000        RU       LCALL W_11              ; write 1's into frame store
324
325  00000089 120000        RU       LCALL RING              ; write new VRM
326
327                                       ; restore the VRM position
328
329
330                                       ; position = VECTOR * RANGE
331
332  0000008C E500          RU       MOV  A,VECTOR
333  0000008E 75F000                 MOV  B,#0                ; VECTOR in B:A
334
335  00000091 AB00          RU       MOV  R0,RANGE
336
337                                       ; the position on the screen is a function of the absolute
338                                       ; VRM position and the range
339
340
341                          DO_VRM31
342
343  00000093 D803          RU       DJNZ R0,DO_VRM32
344  00000095 0200A1        R        JMP  DO_VRM30
345
346                          DO_VRM32
347  00000098 C3                     CLR  C
348  00000099 33                     RLC  A
349  0000009A C5F0                   XCH  A,B
350  0000009C 33                     RLC  A
351  0000009D C5F0                   XCH  A,B
352  0000009F 80F2                   JMP  DO_VRM31
353
354
355                          DO_VRM30
356
357  000000A1 F500          RU       MOV  VRMA0,A
358  000000A3 85F000        RU       MOV  VRMA1,B
359
360                                       ; update numerical indication here
361
362  000000A6 750000        RU       MOV  RAMH,#VRMYN        ; Y position
```

```
363
364      000000A9 750000    RU      MOV     RAML,#LO(VRMXN)         ; LS byte of X posn
365      000000AC 7400      RU      MOV     A,#HI(VRMXN)
366      000000AE 13        RU      RRC     A
367      000000AF 9200      RU      MOV     MSBRAM,C                ; MS bit of X positon
368
369      000000B1 E500      RU      MOV     A,VRMA1
370      000000B3 8500F0    R       MOV     B,VRMA0
371      000000B6 120000    RU      LCALL   DISTWRITE
372
373                                 ; write units to agree with number
374
375
376      000000B9 750000    RU      MOV     RAML,#VRMYU             ;Y position
377      000000BC 750000    RU      MOV     RAML,#LO(VRMXU)         ; LS byte of X posn
378      000000BF 7400      RU      MOV     A,#HI(VRMXU)
379                                 ^
380      000000C1 13                RRC     A
381      000000C2 9200              MOV     MSBRAM,C                ; MS bit of X positon
382
383      000000C4 E500      RU      MOV     A,VRMA1
384      000000C6 8500F0    R       MOV     B,VRMA0
385
386      000000C9 120000    RU      LCALL   UNITWRITE
387
388                                 ; check to see if key depression has ended
389                                 ; NB : this ignores another key if it has been pressed
390
391      000000CC 300001    R       JNB     ANY_KEY,VRM_EXIT        ; Jump if key has been released.
392
393      000000CF 22                RET                             ; otherwise keep moving VRM
394
395                                 ; VRM_EXIT : leaves VRM routine
396
397
398
399
400                        VRM_EXIT:
401
402
403                                 ; terminate the key response :
404
405
406      000000D0 D0E0              POP     ACC
407      000000D2 D0E0              POP     ACC                     ; remove return address from stack
408
409
410                                 ; then refresh the permanently displayed screen graphics
411      000000D4 120000    RU      LCALL   PERMDISP
412
413      000000D7 020000    RU      JMP     TERMINATE               ; and end
414
415
416
```

```
417
418                                         ; local routine VRMSTEP
419                                         ;
420                                         ; Returns the appropriate step size depending on how long the
421                                         ; key has been depressed.
422                                         ;
423                                         ; returns :     step size in A
424                                         ;
425                        VRMSTEP
426   000000DA  300005  R          JNB     F_TMER1,VRMST1          ; jump if not max step
427
428   000000DD  7414                MOV     0,#VRMSTEP2             ; set max step
429   000000DF  0200EC  R           JMP     VRMST10                 ; exit
430
431                        VRMST1
432   000000E2  300005  R          JNB     F_TMER0,VRMST2          ; jump if not next step
433
434   000000E5  7405                MOV     A,#VRMSTEP1             ; set intermediate step
435   000000E7  0200EC  R           JMP     VRMST10                 ; exit
436
437                        VRMST2
438   000000EA  7401                MOV     A,#VRMSTEP0             ; set smallest step
439
440                        VRMST10
441   000000EC  22                  RET
442
443
444
445
446                                         ; Local routine REPAIR_EBM
447                                         ;
448                                         ;
449                                         ; Repairs the hole left in the EBM by erasing the EBM.
450                                         ; Because the EBM is dotted, the EBM only has to be repaired
451                                         ; when it happens to fall on the dashed part of the EBM.
452                                         ; Repairs the heading marker.
453                                         ;
454
455                        REPAIR_EBM
456
457
458                                         ; The VRM coincides with the 'dash' part of the EBM
459                                         ; when
460                                         ;
461                                         ;       INT((VECTOR-offset)/dash length) is odd.
462                                         ;
463                                         ; ( and the VRM is not actually outside the current range. )
464                                         ;
465                                         ; where VECTOR is the position of the VRM circle
466                                         ; relative to the screen. The offset of -offset is because
467                                         ; the EBM dash is started with an offset from the centre.
468
```

```
469
470                                  ;
471                                  ; Fix the heading marker
472                                  ;
473
474                                  ; angle = 0
475   000000ED 750000          R       MOV    ANGLE1,#0
476   000000F0 750000          R       MOV    ANGLE0,#0
477
478   000000F3 120000          RU      LCALL  W_11              ; write one's
479
480   000000F6 120000          RU      LCALL  POINT
481   000000F9 120000          RU      LCALL  RAD               ; repair the hole
482
483                                  ;; Now the EBM :
484                                  ; work out if the VRM lies on a dash or not
485
486   000000FC E500            RU      MOV    A,VECTOR
487   000000FE C3                      CLR    C
488   000000FF 9400            RU      SUBB   A,#ST_EBM         ; offset from centre
489
490   00000101 75F000          RU      MOV    B,#DASH
491   00000104 84                      DIV    AB                ; length of EBM dashes
492
493                                  ; if the result is odd, then the EBM must be repaired
494
495   00000105 20E00C                  JB     ACC.0,REPEBM3     ; Jump if the EBM is between
496                                                             ; two dashes, and does not have to be
497                                                             ; repaired
498
499                                  ;
500                                  ; FIX THE EBM
501                                  ;
502                                  ;
503
504                                  ; angle = EBM angle
505
506   00000108 850000          RU      MOV    ANGLE1,NEWEBM1
507   0000010B 850000          RU      MOV    ANGLE0,NEWEBM0
508
509   0000010E 120000          RU      LCALL  POINT
510   00000111 120000          RU      LCALL  RAD               ; repair the hole
511
512
513                           REPEBM3  ; exit
514
515
516
517   00000114 22                      RET
518                                    END
517

Scalars

ACC.0------000000E0    ACC.1------000000E1    ACC.2------000000E2    ACC.3------000000E3
```

| | | | | | | |
|---|---|---|---|---|---|---|
| ACC.4 | 000000E4 | ACC.5 | 000000E5 | ACC.6 | 000000E6 | ACC.7 | 000000E7 |
| MAXRANG | 000000C0 | P1.0 | 00000090 | P1.1 | 00000091 | P1.2 | 00000092 |
| P1.3 | 00000093 | P1.4 | 00000074 | P1.5 | 00000075 | P1.6 | 00000096 |
| P1.7 | 00000097 | VRMSTEP0 | 00000001 | VRMSTEP1 | 00000005 | VRMSTEP2 | 00000014 |

Section = KEYAC2, Class = CODE, Byte Relocatable, Size = 00000115

| | | | | | | |
|---|---|---|---|---|---|---|
| DO_VRM | 0000007A | DO_VRM100 | 00000006 | DO_VRM30 | 000000A1 | DO_VRM31 | 00000093 |
| DO_VRM32 | 00000098 | REPAIR_EBM | 000000ED | REPEBM3 | 00000114 | VRMDECR | 00000039 |
| VRMDECR2 | 00000053 | VRMDECR40 | 00000073 | VRMDECR41 | 00000075 | VRMDECR50 | 00000061 |
| VRMDECR80 | 0000003F | VRMDECRB1 | 00000045 | VRMINCR | 00000000 | VRMINCR2 | 0000001A |
| VRMINCR40 | 00000032 | VRMINCR50 | 00000028 | VRMINCRB0 | 00000006 | VRMINCRB1 | 0000000C |
| VRMST1 | 000000E2 | VRMST10 | 000000EC | VRMST2 | 000000EA | VRMSTEP | 000000DA |
| VRM_EXIT | 000000D0 | | | | | | |

Section = I, Byte Relocatable, Size = EMPTY

Unbound Globals

| | | | | | | |
|---|---|---|---|---|---|---|
| ANGLE0 | 00000000 | ANGLE1 | 00000000 | ANY_KEY | 00000000 | DASH | 00000000 |
| DISTURITE | 00000000 | E_VVRM | 00000000 | F_THER0 | 00000000 | F_THER1 | 00000000 |
| OVRMDECR | 00000000 | GVRMINCR | 00000000 | O_ZONE | 00000000 | KEY_VALUE | 00000000 |
| MSBRAM | 00000000 | NEWEBM0 | 00000000 | NEWEBM1 | 00000000 | PERMDISP | 00000000 |
| POINT | 00000000 | RAMH | 00000000 | RAML | 00000000 | RANGE | 00000000 |
| RAD | 00000000 | RING | 00000000 | R_RING | 00000000 | SETVECT | 00000000 |
| ST_EBM | 00000000 | TERMINATE | 00000000 | UNIWRITE | 00000000 | VECTOR | 00000000 |
| VRMA0 | 00000000 | VRMA1 | 00000000 | VRMONSCR | 00000000 | VRMXN | 00000000 |
| VRMXU | 00000000 | VRMYN | 00000000 | VRMYU | 00000000 | W_00 | 00000000 |
| W_11 | 00000000 | | | | | | |

519 Lines Read
519 Lines Processed
0 Errors

; Name : ebm

```
********************************
*                              *
*         EBM CONTROL          *
*                              *
********************************
```

```
       ; Contains the following entry points :
       ;
         GLOBAL   EBMINCR              ; entry point for EBM increment
         GLOBAL   EBMDECR              ; entry point for EBM decrement ; locally defined symbols

GLOBAL   EBMSTEP2,EBMSTEP1,EBMSTEP0

; locally defined routines

GLOBAL   ANGWRITE             ; Writes angle to display

;
       ; The following are defined externally :
       ;
       ; external routines GLOBAL   WR_EBM                ; writes/erases EBM
         GLOBAL   RING                  ; writes/erases circle drawn
                                       ; around radar screen centre
         GLOBAL   W_11,W_00             ; set data lines to memory to
                                       ; 1's and 0's respectively
         GLOBAL   POINT                 ; calculates addresses
         GLOBAL   RAD                   ; writes to the frame store
         GLOBAL   BINDCD
         GLOBAL   W_NUMBER
         GLOBAL   SUBTRACT
         GLOBAL   SETVECT
         GLOBAL   NORMANG GLOBAL   GFBMINCR              ; entry point for EBM increment when
                                       ; in guard zone mode
         GLOBAL   GEBMDECR              ; entry point for EBM decrement when
                                       ; in guard zone mode
         GLOBAL   TERMINATE             ; key response termination ; external variables

GLOBAL   ANGLE1,ANGLE0

GLOBAL   E_WERM,C_WRM
         GLOBAL   NFWERM1,NEWERM0
         GLOBAL   F_IMER1,F_IMER0
         GLOBAL   KEY_VALUE
         GLOBAL   ANY_KEY
         GLOBAL   VRMA1,VRMA0,VECTOR,RANGE,R_RING
         GLOBAL   BBC01,BBCD0
         GLOBAL   MSBRAM,RAMH,RAML
         GLOBAL   G_ZONE
         GLOBAL   VRMONSCR

; external constants
```

```
 65
 66            GLOBAL  DASH                    ; EBM dash length
 67            GLOBAL  MAXRANG                 ; maximum radius of URM on screen
 68            GLOBAL  EBMXN,EBMYN
 69            GLOBAL  BT_EBM
 70
 71
 72
 73     P1.0   EQU     90H
 74     P1.1   EQU     91H
 75     P1.2   EQU     92H
 76     P1.3   EQU     93H
 77     P1.4   EQU     94H
 78     P1.5   EQU     95H
 79     P1.6   EQU     96H
 80     P1.7   EQU     97H
 81
 82     ACC.0  EQU     0E0H
 83     ACC.1  EQU     0E1H
 84     ACC.2  EQU     0E2H
 85     ACC.3  EQU     0E3H
 86     ACC.4  EQU     0E4H
 87     ACC.5  EQU     0E5H
 88     ACC.6  EQU     0E6H
 89     ACC.7  EQU     0E7H
 90
 91
 92
 93
 94            SECTION EBM,CLASS=CODE
 95
 96    ; NOTE : a different response is required if we are in guard zone
 97    ;        mode, so a jump is performed if in that mode.
 98    ;
 99
100
101    ; EBM ACTION
102    ; ==========
103
104    ; EBM key response.
105    ;
106    ;
107    ; Level sensitive, rotates EBM at a rate proportional to time.
108    ; Direction of rotation is fixed by two different entry points.
109    ;
110    ; The screen numerical display must be updated at the end of every
111    ; EBM write.
112    ;
113    ; Angle of EBM in NEWEBM1,NEWEBM0
```

```
120                             ; EBM increment entry point
121                             ;
122
123                             ; EBM increments
124                             ;
125                             ; The increments proceed 0,1,2 as the key continues to be held down.
126
127
128
129                EBMSTEP0     EQU    1              ; EBM step 0 = 0.25 degrees
130                EBMSTEP1     EQU    4              ; EBM step 1 = 1 degree
131                EBMSTEP2     EQU    16             ; EBM step 2 = 4 degrees
132
133                EBMINCR
134  00000000 300003    R        JNB    G_ZONE,EBMINCR0  ; jump if not in guard zone mode
135  00000003 020000    RU       JMP    GEBMINCR
136
137                EBMINCR0
138
139                             ; angle = NEWEBM1:NEWEBM0
140
141  00000006 850000    RU       MOV    ANGLE1,NEWEBM1
142  00000009 850000    RU       MOV    ANGLE0,NEWEBM0
143
144
145
146                EBMINCR2
147
148                             ;
149                             ; erase current EBM at ANGLE1:ANGLE0
150                             ;
151
152  0000000C 120000    RU       LCALL  W_00           ; Want to write zeros into
153                                                    ; the frame store
154  0000000F C200      RU       CLR    E_WEBM         ; set for dotted
155
156  00000011 120000    RU       LCALL  WR_EBM         ; erase old EBM
157
158                             ;repair the hole in the VRM if required
159
160  00000014 1200F4    R        LCALL  REPAIR_VRM
161
162                             ; if angle is very close to zero then rewrite the heading marker
163
164  00000017 120118    R        LCALL  REP_HM
165
166
167
168                             ;
169                             ; increment EBM value by an amount depending on the
170                             ; length of time the key has been depressed
171
172  0000001A 1200E1    R        LCALL  EBMSTEP        ; step size in R0
173
174                             ; ANGLE = angle + step
```

| | | | | | |
|---|---|---|---|---|---|
| 175 | | | CLR | C | |
| 176 | 0000001D C3 | | MOV | A,NEWEBM0 | |
| 177 | 0000001E E500 RU | | ADD | A,R0 | |
| 178 | 00000020 2B | | MOV | NEWEBM0,A | |
| 179 | 00000021 F500 RU | | MOV | A,NEWEBM1 | |
| 180 | 00000023 E500 RU | | ADDC | A,#0 | |
| 181 | 00000025 3400 | | MOV | NEWEBM1,A | |
| 182 | 00000027 F500 RU | | | | |
| 183 | | | | | ; make sure that the angle lies |
| 184 | 00000029 7800 RU | | MOV | R0,#NEWEBM0 | ; in the range 0 to 360 |
| 185 | 0000002B 120000 RU | | LCALL | NORMANG | |
| 186 | | | | | |
| 187 | | | | | |
| 188 | | | | | |
| 189 | | | ; now write EBM, update screen display and check if we have | | |
| 190 | | | ; finished | | |
| 191 | | | ; | | |
| 192 | | | | | |
| 193 | 0000002E 120066 R | | LCALL | DO_EBM | |
| 194 | | | | | |
| 195 | 00000031 80D9 | | JMP | EBMINCR2 | ; continue if key is still depressed |
| 196 | | | | | |
| 197 | | | | | |
| 198 | | | ; EBM decrement entry point | | |
| 199 | | | ; | | |
| 200 | | EBMDECR | | | |
| 201 | | | | | |
| 202 | | | | | |
| 203 | 00000033 300003 R | | JNB | G_ZONF,EBMDECRB0 | ; Jump if not in guard zone mode |
| 204 | 00000036 020000 RU | | JMP | GEBMDECR | |
| 205 | | | | | |
| 206 | | EBMDECRB0 | | | |
| 207 | | | | | |
| 208 | | | | | |
| 209 | | | ; angle = NEWEBM1:NEWEBM0 | | |
| 210 | | | | | |
| 211 | 00000039 050000 RU | | MOV | ANGLE1,NEWEBM1 | |
| 212 | 0000003C 850000 RU | | MOV | ANGLE0,NEWEBM0 | |
| 213 | | | | | |
| 214 | | EBMDECR2 | | | |
| 215 | | | | | |
| 216 | | | | | |
| 217 | | | ; | | |
| 218 | | | ; erase current EBM at ANGLE1:ANGLE0 | | |
| 219 | | | ; | | |
| 220 | | | | | |
| 221 | | | | | |
| 222 | 0000003F 120000 RU | | LCALL | W_00 | ; want to write zeros into |
| 223 | | | | | ; the frame store |
| 224 | 00000042 C200 RU | | CLR | E_WEBM | ; set dotted EBM |
| 225 | | | | | |
| 226 | 00000044 120000 RU | | LCALL | WR_EBM | ; erase old EBM |
| 227 | | | | | |
| 228 | | | ; repair the hole in the VRH if required | | |

```
229                               LCALL   REPAIR_VRM
230
231                               ; if angle is very close to zero then rewrite the heading marker
232
233
234   00000047 1200F4    R         LCALL   REP_HM
235
236
237                               ; decrement EBM value by an amount depending on the
238                               ; length of time the key has been depressed
239
240
241   0000004A 12011B    R         LCALL   EBMSTEP         ; step size in R0
242
243                               ; NEWEBM = angle - step
244
245   0000004D 1200E1    R
246   00000050 C3                  CLR     C
247   00000051 E500               MOV     A,NEWEBM0
248   00000053 9B                  SUBB    A,R0
249   00000054 F500               MOV     NEWEBM0,A
250   00000056 E500               MOV     A,NEWEBM1
251   00000058 9400               SUBB    A,#0
252   0000005A F500               MOV     NEWEBM1,A
253
254   0000005C 7800               MOV     R0,#NEWEBM0     ; make sure that the angle lies
255   0000005E 120000             LCALL   NORMANG         ; in the range 0 to 360
256
257                               ; now write EBM, update screen display and check if we have
258                               ; finished
259
260
261   00000061 120066    R         LCALL   DO_EBM
262
263
264   00000064 80D9                JMP     EBMDECR2        ; continue if key is still depressed
265
266
267                               ; DO EBM : draws the EBM, updates the numerical indication of the
268                               ; EBM position, and exits if key depression has ended
269
270                               ; returns :       key code in A
271
272
273          1E                    STUBLEND        EQU     30
274
275                               DO_EBM
276   00000066 120000    RU        LCALL   W_11                    ; length of heading marker repair stub
277
278                               ; angle = NEWEBM1:NEWEBM0
279
280   00000069 850000    RU        MOV     ANGLE1,NEWEBM1          ; write 1's into frame store
281
```

```
282         0000006C  850000    RU           MOV     ANGLE0,NEWEBM0
283
284         0000006F  120000    RU           LCALL   WR_EBM              ; write new EBM
285
286         00000072  1200B0    R            LCALL   ANGWRITE            ; write angle
287
288                                    ; write a short heading marker from the centre out to
289                                    ; repair the damage caused by ebm erasures at angles close to 0
290
291         00000075  120000    RU           LCALL   W_11                ; write 1's into frame store
292
293         00000078  7B1E                   MOV     R0,#STUBLENG
294         0000007A  D200      RU           SETB    E_WEBM              ; set for continuous line
295         0000007C  750001    R            MOV     VECTOR,#1           ; start radius
296
297         0000007F  C000      RU           PUSH    ANGLE1
298         00000081  C000      RU           PUSH    ANGLE0              ; save angle
299
300         00000083  750000    R            MOV     ANGLE0,#0
301         00000086  750000    R            MOV     ANGLE1,#0           ; angle = 0
302
303                             DO_EBM1
304         00000089  E8                     MOV     A,R0
305         0000008A  C0E0                   PUSH    ACC                 ; save loop counter
306
307         0000008C  120000    RU           LCALL   FOINT
308         0000008F  120000    RU           LCALL   RAO
309
310         00000092  0500      RU           INC     VECTOR              ; next point along line
311
312         00000094  D0E0                   POP     ACC
313
314         00000096  F8                     MOV     R0,A
315         00000097  D8F0                   DJNZ    R0,DO_EBM1          ; jump if not finished
316
317         00000099  D000      RU           POP     ANGLE0
318         0000009B  D000      RU           POP     ANGLE1              ; restore angle
319
320         0000009D  C200      RU           CLR     E_WEBM              ; restore to dotted
321
322                                    ; check to see if key depression has ended
323                                    ; NB : this ignores another key if it has been pressed
324
325         0000009F  300001    R            JNB     ANY_KEY,EBM_EXIT    ; jump if key not being pressed
326
327         000000A2  22                     RET                         ; otherwise keep moving EBM
328
329
330                                    ;
331                                    ; EBM EXIT : leaves EBM routine
332                                    ;
333
334
```

```
                        EBM_EXIT
335                                     ; terminate the key response ;
336
337                                     ; first restore the EBM angle
338
339
340     000000A3 850000   RU            MOV     NEWEBM1,ANGLE1
341     000000A6 850000   RU            MOV     NEWEBM0,ANGLE0
342
343     000000A9 D0E0                   POP     ACC
344     000000AB D0E0                   POP     ACC             ; remove return address from stack
345
346     000000AD 020000   RU            JMP     TERMINATE       ; and end
347
348
349     ;
350     ;       routine ANGWRITE
351     ;       ================
352     ;
353     ;       Writes the angle in ANGLE1:ANGLE0 to the EBM slot on the screen
354     ;       in units of degrees. Only display the angle in units from 0 to
355     ;       359 degrees.
356     ;
357     ;       returns :               ANGLE1,ANGLE0 modified
358     ;
359     ;       calls :                 NORMANG
360     ;
361
362     ANGWRITE                        ; ensure angle is in the range 0 to 359 degrees
363
364
365     000000B0 7800     RU            MOV     R0,#ANGLE0
366     000000B2 120000   RU            LCALL   NORMANG
367
368                                     ; divide by 4 to get degrees
369
370     000000B5 E500     RU            MOV     A,ANGLE1
371     000000B7 B500F0   R             MOV     B,ANGLE0
372
373     000000BA C3                     CLR     C
374     000000BB 13                     RRC     A
375     000000BC C5F0                   XCH     A,B
376     000000BE 13                     RRC     A
377     000000BF C5F0                   XCH     A,B
378
379     000000C1 C3                     CLR     C
380     000000C2 13                     RRC     A
381     000000C3 C5F0                   XCH     A,B
382     000000C5 13                     RRC     A
383     000000C6 C5F0                   XCH     A,B
384
385                                     ; the number in A:B should only be 9 bits ; ignore
386                                     ; more significant bits if they are present
387
```

```
389        000000C8 5401          RU              ANL     A,#1
390        000000CA F500          RU              MOV     BBCD1,A
391        000000CC B5F000        RU              MOV     BBCD0,B           ; number in BBCD1:BBCD0
392
393        000000CF 120000        RU              LCALL   BINBCD
394
395        000000D2 750000        RU              MOV     RAML,#LO(EBMXN)
396        000000D5 750000        RU              MOV     RAMH,BEBMFN
397        000000D8 7400          RU              MOV     A,#HI(EBMXN)
398        000000DA 13                            RRC     A
399        000000DB 9200          RU              MOV     MSBRAM,C
400                                                                         ; address of EBM number
401        000000DD 120000        RU              LCALL   W_NUMBER          ; write number on screen
402
403        000000E0 22                            RET
404
405
406
407
408
409                                       ; local routine EBMSTEP
410                                       ;
411                                       ; Returns the appropriate step size depending on how long the
412                                       ; key has been depressed.
413                                       ;
414                                       ; returns :       step size in R0
415
416
417                                       EBMSTEP
418
419        000000E1 300005        R               JNB     F_THER1,EBMST1    ; jump if not max step
420        000000E4 7010                          MOV     R0,#EBMSTEP2      ; set max step
421        000000E6 0200F3        R               JMP     EBMST10           ; exit
422
423                                       EBMST1
424
425        000000E9 300005        R               JNB     F_THER0,EBMST2    ; jump if not next step
426        000000EC 7804                          MOV     R0,#EBMSTEP1      ; set intermediate step
427        000000EE 0200F3        R               JMP     EBMST10           ; exit
428
429                                       EBMST2
430
431        000000F1 7801                          MOV     R0,#EBMSTEP0      ; set smallest step
432
433                                       EBMST10
434
435        000000F3 22                            RET
436
437                                       ; Local routine REPAIR_VRM
438                                       ;
439                                       ;
440                                       ; Repairs the hole left in the VRM by erasing the EBM.
441                                       ; Because the EBM is dotted, the VRM only has to be repaired
442                                       ; when it happens to fall on the dashed part of the EBM.
```

```
                                        ; Assumes ANGLE is set to the angle at which the EBM was erased.
                                        ;
                           REPAIR_VRM
                                        ;
                                        ; The VRM coincides with the 'dash' part of the EBM
                                        ; when
                                        ;        INT((VECTOR-offset)/dash length) is odd.
                                        ;
                                        ; ( and the VRM is not actually outside the current range. )
                                        ;
                                        ; where VECTOR is the position of the VRM circle
                                        ; relative to the screen. The offset is because
                                        ; the EBM dash is started with an offset from the centre.
                                        ;
                                        ;
                                        ; 1) check whether the VRM or the Range Rings are selected.
000000F4 200020         R               JB      R_RING,RFPVRM3          ; jump if rings selected
000000F7 30001D         R               JNB     VRMONSCR,RFPVRM3        ; jump if VRM not on screen ; VRM is on the screen : work out if it lies on a dash or not
                                        ; VRM position = VRMA1:VRMA0
000000FA E500           RU              MOV     A,VRMA1
000000FC B500F0         R               MOV     B,VRMA0
000000FF 120000         RU              LCALL   SETVECT                 ; radius of VRM now in VECTOR
00000102 E500           RU              MOV     A,VECTOR
00000104 C3                             CLR     C
00000105 9AFE           RU              SUBB    A,#ST_EBM-1             ; offset of EBM from centre 00000107 75F000         RU              MOV     B,#DASH                 ; length of EBM dashes
0000010A B4                             DIV     AB ; if the result is odd, then the VRM must be repaired
0000010B 20E009                         JB      ACC.0,REPVRM3           ; jump if the VRM is between
                                                                        ; two dashes, and does not have to be
                                                                        ; repaired ; FIX THE VRM
                                        ; -----------
                                        ;
0000010E 120000         RU              LCALL   W_11                    ; write one's (the VRM is not dotted)
```

```
497
498   00000111 120000      RU              LCALL   POINT
499   00000114 120000      RU              LCALL   RAD             ; repair the hole
500
501
502                        REPVRM3         ; exit
503
504
505
506   00000117 22                          RET
507
508
509
510                        ; Local routine REF_HM
511                        ;
512                        ; Rewrites the entire HM for angles very close to 0 degrees.
513                        ; Angle in ANGLE.
514                        ;
515
516                        REF_HM
517
518                                        ; first check if it is from 0 up to 1 degree
519
520
521   00000118 E500         RU              MOV     A,ANGLE1
522   0000011A 7006                         JNZ     REFHM200        ; jump if not at zero
523   0000011C E500         RU              MOV     A,ANGLE0
524   0000011E 54FC                         ANL     A,#0FCH         ; mask out the LS 2 bits, so that
525                                                                 ; HM is rewritten for all angles
526                                                                 ; from 0 up to 1 degree
527   00000120 600C                         JZ      REFHM101        ; jump if at zero
528
529
530                        REFHM200
531
532                                        ; then check if it is from 359 to 360 degrees
533
534   00000122 E500         RU              MOV     A,ANGLE1
535   00000124 B40517                       CJNE    A,#5,REFHM100
536   00000127 E500         RU              MOV     A,ANGLE0
537   00000129 54FC                         ANL     A,#0FCH         ; mask out the LS 2 bits, so that
538                                                                 ; HM is rewritten for all angles
539                                                                 ; from 359 up to 360 degrees
540   0000012B B49C10                       CJNE    A,#9CH,REFHM100 ; jump if not the right value
541
542                        REFHM101
543
544                                        ; rewrite heading marker
545   0000012E 750000       R               MOV     ANGLE0,#0
546   00000131 750000       R               MOV     ANGLE1,#0       ; angle = 0 degrees
547
548   00000134 D200         RU              SETB    E_WEBM
549   00000136 120000       RU              LCALL   W_11            ; continuous line
550   00000139 120000       RU              LCALL   WR_CBM          ; write ones
```

```
551  0000013C C200    RU            CLR       E_WEBM              ; restore to dotted
552
553                                  REPHM100
554
555  0000013E 22                     RET
556
557                                  END
558
```

Scalars

| | | | |
|---|---|---|---|
| ACC.0-----------000000E0 | ACC.1-----------000000E1 | ACC.2-----------000000E2 | ACC.3-----------000000E3 |
| ACC.4-----------000000E4 | ACC.5-----------000000E5 | ACC.6-----------000000E6 | ACC.7-----------000000E7 |
| EBMSTEP0--------00000001 | EBMSTEP1--------00000004 | EBMSTEP2--------00000010 | P1.0------------00000090 |
| P1.1------------00000091 | P1.2------------00000092 | P1.3------------00000093 | P1.4------------00000094 |
| P1.5------------00000095 | P1.6------------00000096 | P1.7------------00000097 | STUBLENG--------0000001E |

Section = EBM, Class = CODE, Byte Relocatable, Size = 0000013E

| | | | |
|---|---|---|---|
| ANGWRITE--------000000B0 | DO_EBM----------00000046 | DO_EBM1---------00000009 | EBMDECR---------00000033 |
| EBMDECR2--------0000003F | EBMDECR80-------00000039 | EBMINCR---------00000000 | EBMINCR2--------0000000C |
| EBMINCR80-------00000006 | EBMST1----------000000E9 | EBMST10---------000000F3 | EBMST2----------000000F1 |
| EBMSTEP---------000000E1 | EBM_EXIT--------000000A3 | REPAIR_URM------000000E4 | REPHM100--------0000013E |
| REPHM101--------0000012E | REPHM200--------00000122 | REPURM3---------00000117 | REP_HM----------00000118 |

Section = I, Byte Relocatable, Size = EMPTY

Unbound Globals

| | | | |
|---|---|---|---|
| ANGLE0----------00000000 | ANGLE1----------00000000 | ANY_KEY---------00000000 | BBCD0-----------00000000 |
| BBCD1-----------00000000 | BINBCD----------00000000 | DASH------------00000000 | EBMXN-----------00000000 |
| EBMYN-----------00000000 | E_WEBM----------00000000 | E_WURM----------00000000 | F_THERO---------00000000 |
| F_THER1---------00000000 | GEBMDECR--------00000000 | GEBMINCR--------00000000 | G_ZONE----------00000000 |
| KEY_VALUE-------00000000 | MAXRANG---------00000000 | MSBRAM----------00000000 | NEWEBMO---------00000000 |
| NEWEBM1---------00000000 | NORMANG---------00000000 | POINT-----------00000000 | RAHH------------00000000 |
| RAHL------------00000000 | RANGE-----------00000000 | RAD-------------00000000 | RING------------00000000 |
| R_RING----------00000000 | SETVECT---------00000000 | ST_ERM----------00000000 | SUBTRACT--------00000000 |
| TERMINATE-------00000000 | VECTOR----------00000000 | VRMAO-----------00000000 | VRMA1-----------00000000 |
| VRMONSCR--------00000000 | WR_EBM----------00000000 | W_00------------00000000 | W_11------------00000000 |
| W_NUMBER--------00000000 | | | |

550 Lines Read
550 Lines Processed
 0 Errors

```
 1  ; Name : alarm
 2  ;
 3  ;
 4  ;**********************************
 5  ;*                                *
 6  ;*          ALARM                 *
 7  ;*                                *
 8  ;**********************************
 9  ;
10  ;
11  ;
12  ;
13  ; 1) first beep the alarm : do this for every depression,
14  ;    whether valid or not
15  ;
16  ; 2) If the guard zone is not set, then do nothing
17  ;
18  ; 3) If the alarm is not set, then set it
19  ;
20  ;
21  ; 4) If the alarm is set, then disable the alarm (assume that
22  ;    it is sounding - it doesn't matter if it isn't)
23  ;
24  ;
25  ;
26  ; Contains the following entry points :
27  ;
28  ;
29          GLOBAL  ALARMM          ; entry point for alarm set/cancel
30
31  ;
32  ; locally defined routines :
33  ;
34
35          GLOBAL  DRAWARC
36          GLOBAL  NORMANO
37          GLOBAL  BEEP
38
39  ;
40  ; Locally defined constants :
41  ;
42          GLOBAL  ALXSZ,ALYSZ
43
44  ;
45  ; The following are defined externally :
46  ;
47
48          ; externally defined variables
49
50          GLOBAL  NEWCOM1,NEWCOM0
51          GLOBAL  CBMF1,CBMF0,CBMM1,CBMM0
52
```

```
53          GLOBAL  CHMD1,EHMDO
54          GLOBAL  ANGLF1,ANGLEO
55          GLOBAL  GUANG1,GUANGO
56          GLOBAL  E_WEBH,E_WVRH
57          GLOBAL  G_ZONE
58          GLOBAL  R_RING
59          GLOBAL  ANY_KEY
60          GLOBAL  VRHA1,VKHAO,VRHB1,VRHBO
61          GLOBAL  RANGE
62          GLOBAL  VECTOR
63          GLOBAL  ALARM,X_ALRM,ALARMTRIG
64          GLOBAL  GDZBIGN
65          GLOBAL  FULLZONE
66          GLOBAL  HSBRAH,RAHH,RAHL
67          GLOBAL  MESSUR
68          GLOBAL  ALARMS
69          GLOBAL  ALRMTRIG
70          GLOBAL  GDZDRAWN
71          GLOBAL  GDZOUTER
72
73          ; external routines
74
75          GLOBAL  WR_EBH
76          GLOBAL  RING
77          GLOBAL  SETVECT
78          GLOBAL  W_00,W_11
79          GLOBAL  TERMINATE       ; key response termination
80          GLOBAL  PORTO
81          GLOBAL  POINT
82          GLOBAL  RAD
83          GLOBAL  SUBTRACT
84          GLOBAL  PRINT
85          GLOBAL  WRITEBL
86          GLOBAL  W_BOX
87          GLOBAL  FILL_BOX
88          GLOBAL  ANGLE_OK
89
90          ; external constants
91
92          GLOBAL  MAXRANG
93          GLOBAL  ALARMX,ALARMY,ALARMHX,ALARMHY
94
95
96
97    90    P1.0    EQU     90H
98    91    P1.1    EQU     91H
99    92    P1.2    EQU     92H
100   93    P1.3    EQU     93H
101   94    P1.4    EQU     94H
102   95    P1.5    EQU     95H
103   96    P1.6    EQU     96H
104   97    P1.7    EQU     97H
105
106   E0    ACC.0   EQU     0E0H
```

```
107                          E1        ACC.1     EQU     0E1H
108                          E2        ACC.2     EQU     0E2H
109                          E3        ACC.3     EQU     0E3H
110                          E4        ACC.4     EQU     0E4H
111                          E5        ACC.5     EQU     0E5H
112                          E6        ACC.6     EQU     0E6H
113                          E7        ACC.7     EQU     0E7H
114
115
116                                    SECTION   ALARMD,CLASS=CODE
117
118
119                          FF        ALRMDEL1  EQU     255
120                          64        ALRMDEL2  EQU     100      ; delay while alarm sounds
121
122                          14        ALXSZ     EQU     20       ; alarm blip X dimension
123                          14        ALYSZ     EQU     20       ; alarm blip Y dimension
124
125                                    ; CODE
126                                    ;====
127                                    ;
128
129                                    ALARM
130                                              ; 1) first beep the alarm ; do this for every depression,
131                                              ; whether valid or not. This will have the effect of
132                                              ; turning off the alarm if it is sounding
133
134  00000000 120251     R              LCALL   BEEP
135
136
137  00000003 C200                      CLR     ALRMTRIG         ; and reset the alarm triggered
138                                                              ; indication in case it was set
139
140
141                                              ; 2) If the guard zone is not set, then do nothing
142
143  00000005 200003     R              JNB     G_ZONE,ALRM2     ; jump if not set
144  00000008 020192     R              JB      G_ZONE,ALRM21
145                                    JMP     ALRM2
146                                    ALRM21
147
148                                              ; 3) If the alarm is not set, then set it
149
150  0000000B 300054     R              JNB     ALARM,ALRM10     ; jump if not set
151
152                                              ; 4) If the alarm is set, unwrite the alarm blip and legend
153                                              ; and erase the search line if it is a legal angle
154
155  0000000E C200                      CLR     MESSUR
156  00000010 120000                    LCALL   W_00             ; set for erase
```

| Line | Address | Code | | Instruction | Operands | Comment |
|---|---|---|---|---|---|---|
| 160 | | | | | | |
| 161 | 00000013 | 12022D | R | LCALL | DRAWAL | |
| 162 | | | | | | ; clear the inside of the box in case it is |
| 163 | | | | | | ; presently filled |
| 164 | | | | | | |
| 165 | | | | | | |
| 166 | 00000016 | 750000 | RU | MOV | RAMH,#ALARMY | ; Y position |
| 167 | | | | | | |
| 168 | 00000019 | 750000 | RU | MOV | RAML,#LO(ALARMHX) | ; LS byte of X posn |
| 169 | 0000001C | 7400 | RU | MOV | A,#HI(ALARMHX) | |
| 170 | 0000001E | 13 | | RRC | A | |
| 171 | 0000001F | 9200 | RU | MOV | MSBRAM,C | ; MS bit of X position |
| 172 | | | | | | |
| 173 | 00000021 | 120000 | RU | LCALL | W_00 | |
| 174 | | | | | | |
| 175 | 00000024 | 7A14 | | MOV | R2,#ALXSZ | ; X dimension |
| 176 | 00000026 | 7B14 | | MOV | R3,#ALYSZ | ; Y dimension |
| 177 | | | | | | |
| 178 | 00000028 | 120000 | RU | LCALL | FILL_BOX | |
| 179 | | | | | | |
| 180 | | | | | | ; reset the flag |
| 181 | | | | | | |
| 182 | 0000002B | C200 | RU | CLR | ALARM | |
| 183 | | | | | | |
| 184 | | | | | | ; now erase the search line if it is at a legal angle |
| 185 | | | | | | |
| 186 | 0000002D | 120000 | RU | LCALL | ANGLE_OK | |
| 187 | 00000030 | 502D | | JNC | ALRMB0 | ; jump if not a legal angle |
| 188 | | | | | | |
| 189 | | | | | | ; erase line |
| 190 | | | | | | |
| 191 | 00000032 | 850000 | RU | MOV | ANGLE0,GDANG0 | |
| 192 | 00000035 | 850000 | RU | MOV | ANGLE1,GDANG1 | ; angle = guard zone search line angle |
| 193 | | | | | | |
| 194 | 00000038 | 120000 | RU | LCALL | W_00 | |
| 195 | 0000003B | D200 | R | SETB | E_MEM | ; set for continuous |
| 196 | 0000003D | 120000 | RU | LCALL | WR_EBM | |
| 197 | | | | | | |
| 198 | | | | | | ; repair the holes that we have just hacked in the arcs |
| 199 | | | | | | |
| 200 | 00000040 | 120000 | RU | LCALL | W_11 | |
| 201 | | | | | | |
| 202 | 00000043 | E500 | RU | MOV | A,VRMA1 | |
| 203 | 00000045 | B500F0 | R | MOV | B,VRMA0 | |
| 204 | 00000048 | 120000 | RU | LCALL | SETVECT | ; radius = VRM.A |
| 205 | | | | | | |
| 206 | 0000004B | 120000 | RU | LCALL | POINT | |
| 207 | 0000004E | 120000 | RU | LCALL | RA0 | ; fill in the hole in A |
| 208 | | | | | | |
| 209 | 00000051 | E500 | RU | | | |
| 210 | 00000053 | B500F0 | R | | | |
| 211 | 00000056 | 120000 | RU | | | |
| 212 | | | | | | |

```
213  00000059 120000   RU              LCALL  POINT
214  0000005C 120000   RU              LCALL  RAD              ; fill in the hole in B
215
216
217                            ALRM00
218  0000005F 020192   R              JMP    ALRM2
219
220                            ALRM10
221                            ; GD ZONE must be activated
222                            ;
223
224                            ; if zone is already drawn, skip the draw part
225
226
227  00000062 300003   R              JB     GDZDRAWN,ALRM71   ; jump if already drawn
228  00000065 020188   R              JNB    GDZDRAWN,ALRM133
229                                   JMP    ALRM71
230
231                            ALRM133
232                            ; otherwise draw the zone
233
234  00000068 D200     RU              SETB   GDZDRAWN         ; indicate a drawn zone
235
236                            ; if the two VRMs are the same, don't do anything
237
238  0000006A E500     RU              MOV    A,VRMA1
239  0000006C B500F0   R               MOV    B,VRMA0
240  0000006F 120000   RU              LCALL  SETVECT          ; find out radius of VRM A
241
242  00000072 C000     RU              PUSH   VECTOR           ; and save it
243
244  00000074 E500     RU              MOV    A,VRMB1
245  00000076 B500F0   R               MOV    B,VRMB0
246  00000079 120000   RU              LCALL  SETVECT          ; find out radius of VRM B
247
248  0000007C B500F0   R               MOV    B,VECTOR         ; rad of B
249  0000007F D0E0                     POP    ACC              ; rad of A
250  00000081 C3                       CLR    C
251  00000082 95F0                     SUBB   A,B
252
253                                    JZ     ALRM2            ; jump if they are the same
254  00000084 7003                     JNZ    ALRM22
255  00000086 020192   R               JMP    ALRM2
256
257                            ALRM22
258                            ; SET THE ALARM
259                            ;
260
261                            ; erase two VRMs and two EBMs, and replace them with
262                            ; a solid line enclosing the guard zone
263
264
265                            ; Set flags to signal which way the guard zone goes :
266
```

| | | | | | |
|---|---|---|---|---|---|
| 267 | | | | | |
| 268 | | | | | ; In angle, it must proceed from the smallest |
| 269 | | | | | ; (most negative) angle to the largest (most positive). |
| 270 | | | | | ; If the GDZSIGN flag is set, the guard zone goes from EDM B |
| 271 | | | | | ; to EDM A. |
| 272 | | | | | ; |
| 273 | | | | | ; In distance, it must proceed from the smallest radius to the |
| 274 | | | | | ; largest ; GDZOUTER set if VRM A < VRM B |
| 275 | | | | | ; |
| 276 | 00000089 | 7800 | RU | MOV | R0,#EDMB0 |
| 277 | 0000008B | 7900 | RU | MOV | R1,#NEWEBM0 |
| 278 | 0000008D | 120000 | RU | LCALL | SUBTRACT |
| 279 | | | | | |
| 280 | 00000090 | A2E7 | | MOV | C,ACC.7 |
| 281 | 00000092 | 9200 | RU | MOV | GDZSIGN,C ; if result is positive, then |
| 282 | | | | | ; guard zone goes from A to B |
| 283 | | | | | ; so set the flag to the same |
| 284 | 00000094 | 7800 | RU | MOV | R0,#VRMB0 ; value as the guard zone |
| 285 | 00000096 | 7900 | RU | MOV | R1,#VRMA0 |
| 286 | 00000098 | 120000 | RU | LCALL | SUBTRACT |
| 287 | | | | | |
| 288 | 0000009B | A2E7 | | MOV | C,ACC.7 |
| 289 | 0000009D | 9200 | RU | MOV | GDZOUTER,C |
| 290 | | | | | |
| 291 | | | | | ; Normalize the angles of the two ERMs to lie |
| 292 | | | | | ; in the range 0 <= theta < 360, to ease the problem |
| 293 | | | | | ; of knowing when we have finished drawing the arc. |
| 294 | | | | | ; Also enables the radial line segments to be drawn |
| 295 | | | | | ; in the right place, because POINT subroutine does |
| 296 | | | | | ; not understand negative angles. |
| 297 | | | | | |
| 298 | 0000009F | 7800 | RU | MOV | R0,#NEWEBM0 |
| 299 | 000000A1 | 120198 | R | LCALL | NORMANG ; EBM A |
| 300 | | | | | |
| 301 | 000000A4 | 7800 | RU | MOV | R0,#EDMB0 |
| 302 | 000000A6 | 120198 | R | LCALL | NORMANG ; EBM B |
| 303 | | | | | |
| 304 | | | | | ; erase VRM A |
| 305 | | | | | |
| 306 | | | | | |
| 307 | 000000A9 | 120000 | RU | LCALL | W_00 ; write zeros |
| 308 | 000000AC | D200 | RU | SETB | C_WRM ; set for continuous erasure |
| 309 | | | | | |
| 310 | 000000AE | E500 | RU | MOV | A,VRMA1 |
| 311 | 000000B0 | 8500F0 | R | MOV | B,VRMA0 |
| 312 | 000000B3 | 120000 | RU | LCALL | SETVECT |
| 313 | 000000B6 | 120000 | RU | LCALL | RING |
| 314 | | | | | |
| 315 | | | | | ; erase VRM B |
| 316 | | | | | |
| 317 | 000000B9 | 120000 | RU | LCALL | W_00 |
| 318 | | | | | |
| 319 | 000000BC | E500 | RU | MOV | A,VRMB1 |
| 320 | 000000BE | 8500F0 | R | MOV | B,VRMB0 |

```
321  000000C1 120000   RU           LCALL   SETVECT
322  000000C4 120000   RU           LCALL   RING
323
324                                                ; erase EBM A
325
326  000000C7 120000   RU           LCALL   U_00
327  000000CA C200     RU           CLR     C_UEBM
328                                                ; erase dotted
329  000000CC 850000   RU           MOV     ANGLE1,NEWEBM1
330  000000CF 850000   RU           MOV     ANGLE0,NEWEBM0
331  000000D2 120000   RU           LCALL   UR_EBM
332
333                                                ; erase EBM B
334
335  000000D5 120000   RU           LCALL   U_00
336  000000D8 850000   RU           MOV     ANGLE1,EBMB1
337  000000DB 850000   RU           MOV     ANGLE0,EBMB0
338  000000DE 120000   RU           LCALL   UR_EBM
339
340                                                ; replace the edge of VRM A with a solid line
341                                                ; from EBM A to EBM B ( or the other way if the sign flag
342                                                ; is set )
343
344  000000E1 E500     RU           MOV     A,VRMA1
345  000000E3 8500F0   R            MOV     B,VRMA0
346  000000E6 120000   RU           LCALL   SETVECT         ; set up radius for VRM A
347
348  000000E9 1201DB   R            LCALL   DRAWARC         ; draw a solid arc
349
350                                                ; replace the edge of VRM B with a solid line
351                                                ; in the same direction as VRM A
352
353  000000EC E500     RU           MOV     A,VRMB1
354  000000EE 8500F0   R            MOV     B,VRMB0
355  000000F1 120000   RU           LCALL   SETVECT         ; set up radius for VRM B
356
357  000000F4 1201DB   R            LCALL   DRAWARC         ; draw a solid arc
358
359
360                                                ; Now the radial lines ; if EBM A = EBM B, then
361                                                ; a full guard zone is drawn, and so no
362                                                ; radial lines are required.
363
364
365  000000F7 7800     RU           MOV     R0,#NEWEBM0
366  000000F9 7900     RU           MOV     R1,!EBMB0
367  000000FB 120000   RU           LCALL   SUBTRACT
368
369
370  000000FE 7009     RU           JNZ     ALRM20          ; jump if not a full zone
371  00000100 C5F0                  XCH     A,B
372  00000102 7005                  JNZ     ALRM20          ; jump if not a full zone
373
374  00000104 D200     RU           SETB    FULLZONE        ; indicate a full guard zone
375
```

| Line | Address | Code | | Label | Op | Operands | Comment |
|---|---|---|---|---|---|---|---|
| 376 | 00000106 | 020176 | R | | JMP | ALRM60 | ; a full guard zone ; end now |
| 377 | | | | | | | |
| 378 | | | | ALRM20 | | | |
| 379 | 00000109 | C200 | RU | | CLR | FULLZONE | ; indicate a partial guard zone |
| 380 | | | | | | | |
| 381 | | | | | | | ; write radial segments |
| 382 | | | | | | | |
| 383 | | | | | | | ; Starts at whichever VRM is closest to the centre and stops |
| 384 | | | | | | | ; at the other one. |
| 385 | | | | | | | |
| 386 | | | | | | | |
| 387 | 0000010B | E500 | RU | | MOV | A,VRMA1 | |
| 388 | 0000010D | 8500F0 | R | | MOV | B,VRMA0 | |
| 389 | 00000110 | 120000 | RU | | LCALL | SETVECT | ; find out radius of VRM A |
| 390 | | | | | | | |
| 391 | 00000113 | C000 | RU | | PUSH | VECTOR | ; and save it |
| 392 | | | | | | | |
| 393 | 00000115 | E500 | RU | | MOV | A,VRMB1 | |
| 394 | 00000117 | 8500F0 | R | | MOV | B,VRMB0 | |
| 395 | 0000011A | 120000 | RU | | LCALL | SETVECT | ; find out radius of VRM B |
| 396 | | | | | | | |
| 397 | 0000011D | 8500F0 | R | | MOV | B,VECTOR | ; rad. of B |
| 398 | 00000120 | D0E0 | | | POP | ACC | ; rad. of A |
| 399 | 00000122 | C0E0 | | | PUSH | ACC | |
| 400 | | | | | | | |
| 401 | | | | | | | ; now leave the smallest radius in VECTOR and |
| 402 | | | | | | | ; both on the stack, with the largest on top |
| 403 | | | | | | | |
| 404 | | | | | | | |
| 405 | 00000124 | C3 | | | CLR | C | |
| 406 | 00000125 | 95F0 | | | SUBB | A,B | |
| 407 | 00000127 | 4009 | | | JC | ALRM51 | ; jump if A smallest |
| 408 | | | | | | | |
| 409 | 00000129 | D0E0 | | | POP | ACC | ; rad of A |
| 410 | 0000012B | C000 | | | PUSH | VECTOR | ; rad of B |
| 411 | 0000012D | C0E0 | | | PUSH | ACC | |
| 412 | | | | | | | |
| 413 | 0000012F | 02013D | R | | JMP | ALRM52 | |
| 414 | | | | | | | |
| 415 | | | | ALRM51 | | | |
| 416 | 00000132 | D0E0 | | | POP | ACC | |
| 417 | 00000134 | C0E0 | | | PUSH | ACC | |
| 418 | 00000136 | 8500F0 | R | | MOV | B,VECTOR | |
| 419 | 00000139 | C0F0 | | | PUSH | B | |
| 420 | 0000013B | F500 | RU | | MOV | VECTOR,A | |
| 421 | | | | | | | |
| 422 | | | | ALRM52 | | | |
| 423 | 0000013D | 120000 | RU | | LCALL | W_11 | |
| 424 | | | | | | | |
| 425 | | | | | | | ; draw the segment along EBM A |
| 426 | | | | | | | |
| 427 | 00000140 | 850000 | RU | | MOV | ANGLE0,NEWFBM0 | |
| 428 | 00000143 | 850000 | RU | | MOV | ANGLE1,NEWEBM1 | |
| 429 | | | | | | | |

```
430
431                      ALRM53
432   00000146 120000  RU          LCALL  POINT
433   00000149 120000  RU          LCALL  RAD
434
435                                       ; radius = radius + 1
436
437   0000014C 0500    RU          INC    VECTOR
438
439                                       ; have we finished yet ?
440
441   0000014E D0E0                POP    ACC
442   00000150 C0E0                PUSH   ACC
443
444   00000152 C3                  CLR    C
445   00000153 9500               SUBB    A,VECTOR
446   00000155 50EF    RU          JNC    ALRM53        ; jump if not yet finished
447
448                                       ; draw the segment along EBM B
449
450   00000157 850000  RU          MOV    ANGLE0,EBMB0
451   0000015A 850000  RU          MOV    ANGLE1,EBMB1           ; larger radius
452                                                              ; smaller radius
453   0000015D D0E0                POP    ACC
454   0000015F D000    RU          POP    VECTOR
455   00000161 C0E0                PUSH   ACC
456
457                      ALRM54
458   00000163 120000  RU          LCALL  POINT
459   00000166 120000  RU          LCALL  RAD
460
461                                       ; radius = radius + 1
462
463   00000169 0500    RU          INC    VECTOR
464
465                                       ; have we finished yet ?
466
467   0000016B D0E0                POP    ACC
468   0000016D C0E0                PUSH   ACC            ; larger radius
469
470   0000016F C3                  CLR    C
471   00000170 9500               SUBB    A,VECTOR
472   00000172 50EF    RU          JNC    ALRM54        ; jump if not yet finished
473
474   00000174 D0E0                POP    ACC           ; remove larger radius from stack
475
476                      ALRM60
477
478
479
480                                       ; set guard zone search angle to start bearing of zone
481
482   00000176 200009  R           JB     GDZSIGN,ALRM70
483
```

```
484  00000179 850000     RU         MOV    GDANG1,NEWEBM1
485  0000017C 850000     RU         MOV    GDANG0,NEWEBM0        ; starting angle = EBM A
486
487  0000017F 020188     R          JMP    ALRM71
488
489                                 ALRM70
490
491  00000182 850000     RU         MOV    GDANG1,EBMB1
492  00000185 850000     RU         MOV    GDANG0,EBMB0          ; starting angle = EBM B
493
494                                 ALRM71
495
496                                                              ; now write the message 'ALARM' and write the alarm
497                                                              ; indicator box
498
499
500  00000188 D200       RU         SETB   MESSWR
501  0000018A 120000     RU         LCALL  W_11                  ; set for write
502
503  0000018D 120220     R          LCALL  DRAWAL
504
505                                                              ; set the flag
506
507  00000190 D200       RU         SETB   ALARM
508
509                                                              ;
510
511  00000192 2000FD     R   ALRM2  JB     ANY_KEY,ALRM2         ; keep looping here while
512                                                              ; the key continues to be held down
513
514                                                              ; exit
515
516  00000195 020000     RU         JMP    TERMINATE
517
518
519
520
521                                 ; routine NORMANG
522                                 ;----------------
523                                 ;
524                                 ; To normalise an angle to the range  0 <= theta <360
525                                 ;
526                                 ; R0 points to LS byte of angle
527                                 ; Returns C set if angle was out of range.
528                                 ;
529
530                                 NORMANG
531  00000198 E4                    CLR    A
532  00000199 C0E0                  PUSH   ACC                   ; add/subtraction count ; see later
533                                                              ; for explanation
534  0000019B A9B1                  MOV    R1,SP                 ; R1 points to add/subtraction count
535
536  0000019D E6                    MOV    A,@R0
537  0000019E C5F0                  XCH    A,B
538  000001A0 08                    INC    R0                    ; LS byte
```

```
539                                    MOV     A,@R0              ; MS byte
540
541   000001A1 E6
542   000001A2 20EZ19                  JB      ACC.Z,NORMANG1     ; Jump if angle is negative
543
544                                    ; angle is positive
545
546   000001A5 C5F0                    XCH     A,B                ; angle now in B:A
547
548                                    ; Subtract 360 degrees from the angle until it is negative,
549                                    ; then add 360 degrees to put it in the right range.
550                                    ; Keeps a count of the number of subtractions
551                                    ; on the stack ; if only one, then the angle was
552                                    ; in the right range to start with, and so the carry bit
553                                    ; must be clear on return.
554                                    ;
555
556
557
558                           NORMANG3
559
560   000001A7 C3                      CLR     C
561   000001A8 94A0                    SUBB    A,#0A0H
562   000001AA C5F0                    XCH     A,B
563   000001AC 9405                    SUBB    A,#5
564   000001AE C5F0                    XCH     A,B
565
566   000001B0 07                      INC     @R1                ; subtraction count
567
568   000001B1 50F4                    JNC     NORMANG3
569
570                                    ; now repair the damage
571
572   000001B3 24A0                    ADD     A,#0A0H
573   000001B5 C5F0                    XCH     A,B
574   000001B7 3405                    ADDC    A,#5
575   000001B9 C5F0                    XCH     A,B
576
577   000001BB 0201CE   R               JMP     NORMANG2
578
579                                    ; angle is negative
580
581                                    ; Keeps adding 360 degrees from the angle until it is positive,
582                                    ; then subtracts 360 degrees to put it in the right range
583                                    ;
584                                    ; Keeps a count of the number of additions
585                                    ; on the stack ; if only one, then the angle was
586                                    ; in the right range to start with, and so the carry bit
587                                    ; must be clear on return.
588                                    ;
589
590
591                           NORMANG1
592
```

```
593  000001BE C5E0              XCH    A,B             ; angle now in B:A
594
595  000001C0 24A0              ADD    A,#0A0H
596  000001C2 C5E0              XCH    A,B
597  000001C4 3405              ADDC   A,#5
598
599  000001C6 07                INC    CR1             ; addition count
600
601  000001C7 30E702            JNB    ACC.7,NORMANG5  ; jump if angle is positive
602                                                    ; or zero
603
604  000001CA 80F2              JMP    NORMANG1
605
606
607
608         NORMANG5
609  000001CC C5E0              XCH    A,B             ; angle now in B:A
610
611         NORMANG2
612  000001CE 18                DEC    R0
613  000001CF F6                MOV    CR0,A           ; LS byte
614  000001D0 08                INC    R0
615  000001D1 C5F0              XCH    A,B
616  000001D3 F6                MOV    CR0,A           ; MS byte
617
618                             ; now set the carry flag if the number was out of range, in which
619                             ; case the number on the stack will be > 1
620
621  000001D4 D0E0              POP    ACC
622  000001D6 C3                CLR    C
623  000001D7 9402              SUBB   A,#2
624  000001D9 B3                CPL    C
625
626  000001DA 22                RET
627
628
629                             ; routine DRAWARC
630                             ;------------------
631
632                             ; Draw a solid arc from EBM A to EBM B at a radius of VECTOR.
633                             ; If the guard zone sign flag is set, then draw it the other way.
634                             ;
635                             ; Note that if EBM A = EBM B, then a full circle will be drawn,
636                             ; i.e. the guard zone will extend over 360 degrees.
637                             ; Also sets up the guard zone angle to the start angle.
638                             ;
639
640         DRAWARC
641
642  000001DB D200              SETB   E_WRM           ; set for continuous arc
643
644  000001DD 200009   R         JB    ODZSIGN,DRAWARC40 ; jump if reverse
645
646  000001E0 850000   RU       MOV    ANGLE1,NEWEBM1
```

```
647              RU         MOV    ANGLE0,NEWEBM0
648
649  000001E3 B50000  RU         JMP    DRAWARC41
650  000001E6 0201EF  R
651                            DRAWARC40
652
653  000001E9 B50000  RU         MOV    ANGLE1,EBMR1
654  000001EC 850000  RU         MOV    ANGLE0,EBMB0
655
656                            DRAWARC41
657
658  000001EF 120000  RU         LCALL  W_11                    ; write one
659
660                            DRAWARC1
661
662                                                  ; draw a point
663  000001F2 120000  RU         LCALL  POINT
664  000001F5 120000  RU         LCALL  RAD
665
666                                                  ; angle = angle + 1
667
668  000001F8 E500    RU         MOV    A,ANGLE0
669  000001FA 2401             ADD    A,#1
670  000001FC F500    RU         MOV    ANGLE0,A
671  000001FE E500    RU         MOV    A,ANGLE1
672  00000200 3400             ADDC   A,#0
673  00000202 F500    RU         MOV    ANGLE1,A
674
675                                                  ; check for overflow ; if equal to 360, set to zero
676
677  00000204 C3                CLR    C
678  00000205 E500    RU         MOV    A,ANGLE0
679  00000207 9A00             SUBB   A,#0A0H
680  00000209 700C             JNZ    DRAWARC2                ; jump if not = 360
681
682  0000020B E500    RU         MOV    A,ANGLE1
683  0000020D 9405             SUBB   A,#5
684  0000020F 7006             JNZ    DRAWARC2                ; jump if not = 360
685
686                                                  ; set to 0
687
688  00000211 750000  R          MOV    ANGLE0,#0
689  00000214 750000  R          MOV    ANGLE1,#0
690
691                            DRAWARC2
692
693                                                  ; see if we are finished yet ;
694                                                  ; if ( angle = end angle ) is zero, then
695                                                  ; we are finished
696
697  00000217 7B00    RU         MOV    R0,#ANGLE0
698
699                                                  ; set end angle
700
```

```
701
702                                     JB      GDZSIGN,DRAWARC42    ; jump if reverse
703  0000021C 7900         RU   MOV     R1,#ERMBO
704  0000021E 020223       R    JMP     DRAWARC43
705
706                        DRAWARC42
707
708  00000221 7900         RU   MOV     R1,#NEWEBMO
709
710                        DRAWARC43
711
712  00000223 120000       RU   LCALL   SUBTRACT
713
714  00000226 70CA              JNZ     DRAWARC1             ; jump if MS byte is not zero
715  00000228 C5F0              XCH     A,B
716  0000022A 70C6              JNZ     DRAWARC1             ; jump if LS byte is not zero
717
718  0000022C 22                RET
719
720                        ; Local routine DRAWAL
721                        ;
722                        ;
723                        ;
724                        ; Writes/erases ALARM legend and blip.
725                        ;
726                        ; To erase, set data lines low ( call W_00 ) and clear MESSUR.
727                        ;
728                        ; To write, do the opposite.
729                        ;
730                        DRAWAL
731
732                        ; write box
733
734  0000022D 750000       RU   MOV     RAMH,@ALARMHY       ; Y position
735
736  00000230 750000       RU   MOV     RAML,@LO(ALARMHX)   ; LS byte of X posn
737  00000233 7400         RU   MOV     A,@HI(ALARMHX)
738  00000235 13                RRC     A
739  00000236 9200         RU   MOV     MSBRAM,C            ; MB bit of X position
740
741  00000238 7A14              MOV     R2,@ALXSZ           ; X dimension
742  0000023A 7B14              MOV     R3,@ALYSZ           ; Y dimension
743
744  0000023C 120000       RU   LCALL   W_BOX               ; write the outline
745
746                        ; write legend
747
748  0000023E 750000       RU   MOV     RAMH,@ALARMY        ; Y position
749
750  00000242 750000       RU   MOV     RAML,@LO(ALARMX)    ; LS byte of X posn
751  00000245 7400         RU   MOV     A,@HI(ALARMX)
752  00000247 13                RRC     A
753  00000248 9200         RU   MOV     MSBRAM,C            ; MS bit of X position
```

```
755
756  0000024A 900000    RU           MOV    DPTR,#ALARMS
757  0000024D 120000    RU           LCALL  PRINT
758
759  00000250 22                     RET
760
761                                  ; Routine BEEP
762                                  ;
763                                  ;
764                                  ; Beeps the alarm ; leaves the alarm off if it was sounding
765                                  ;
766
767                          BEEP
768
769
770  00000251 D200       RU           SETB   X_ALRM
771  00000253 120000     RU           LCALL  PORT0              ; sound the alarm
772
773                                  ; delay
774
775  00000256 7864                    MOV    R0,#ALRMDEL2
776
777                          ALRMB
778  00000258 E8                      MOV    A,R0
779  00000259 C0E0                    PUSH   ACC
780
781                          ALRM5
782  0000025B 70FF                    MOV    R0,#ALRMDEL1
783
784  0000025D D8FE                    DJNZ   R0,ALRM5
785
786  0000025F D0E0                    POP    ACC
787  00000261 F8                      MOV    R0,A
788  00000262 D8F4                    DJNZ   R0,ALRMB
789
790
791  00000264 C200       RU           CLR    X_ALRM
792  00000266 120000     RU           LCALL  PORT0              ; shut the alarm up
793
794  00000269 22                      RET
795
796                                  END
797
```

Scalars

| | | | |
|---|---|---|---|
| ACC.0---------00000000E0 | ACC.1---------000000E1 | ACC.2---------000000E2 | ACC.3---------000000E3 |
| ACC.4---------00000000E4 | ACC.5---------000000E5 | ACC.6---------000000E6 | ACC.7---------000000E7 |
| ALRMDEL1------000000FF | ALRMDEL2------00000064 | ALXSZ---------00000014 | ALYSZ---------00000014 |
| Z1.0----------00000090 | P1.1----------00000091 | P1.2----------00000092 | P1.3----------00000093 |
| Z1.4----------00000094 | P1.5----------00000095 | P1.6----------00000096 | P1.7----------00000097 |

Section = ALARMD, Class = CODE, Byte Relocatable, Size = 000000246

| | | | |
|---|---|---|---|
| ALARMM--------00000000 G | ALRM10--------00000062 | ALRM133-------00000068 | ALRM2---------00000192 |
| ALRM20--------00000109 | ALRM21--------0000000B | ALRM22--------00000089 | ALRM5---------0000023D |
| ALRM51--------00000132 | ALRM52--------0000013D | ALRM53--------00000146 | ALRM54--------00000163 |
| ALRM60--------00000176 | ALRM70--------00000182 | ALRM71--------00000188 | ALRM8---------0000025B |
| ALRM80--------0000005F | BEEP----------00000251 G | DRAWAL--------00000220 | DRAWARC-------000001DB G |
| DRAWARC1------000001F2 | DRAWARC2------00000217 | DRAWARC40-----000001E9 | DRAWARC41-----000001EF |
| DRAWARC42-----00000221 | DRAWARC43-----00000223 | NORMANG-------00000198 | NORMANG1------000001BE |
| NORMANG2------000001CE | NORMANG3------000001A7 | NORMANG5------000001CC | |

Section = Z, Byte Relocatable, Size = EMPTY

Unbound Globals

| | | | |
|---|---|---|---|
| ALARM---------00000000 | ALARMS--------00000000 | ALARMX--------00000000 | ALARMY--------00000000 |
| ALARMTRIG-----00000000 | ALARMX--------00000000 | ALARMY--------00000000 | ALARMTRIG-----00000000 |
| ANGLEQ--------00000000 | ANGLE1--------00000000 | ANGLE_OK------00000000 | ANY_KEY-------00000000 |
| EBMBO---------00000000 | EBMB1---------00000000 | EBMMO---------00000000 | EBMM1---------00000000 |
| EBMPO---------00000000 | EBMP1---------00000000 | E_UEBM--------00000000 | E_UVRM--------00000000 |
| FILL_BOX------00000000 | FULLZONE------00000000 | GDANGO--------00000000 | GDANG1--------00000000 |
| GD2DRAWN------00000000 | GDZOUTER------00000000 | GDZSIGN-------00000000 | O_ZONE--------00000000 |
| MAXRANG-------00000000 | MESSWR--------00000000 | MSBRAM--------00000000 | NEWEBMO-------00000000 |
| NEWEBM1-------00000000 | POINT---------00000000 | PORTO---------00000000 | PRINT---------00000000 |
| RAMH----------00000000 | RAML----------00000000 | RANGE---------00000000 | RAD-----------00000000 |
| RING_A--------00000000 | R_RING--------00000000 | SETVECT-------00000000 | SUBTRACT------00000000 |
| TERMINATE-----00000000 | VECTOR--------00000000 | VRMAO---------00000000 | VRMA1---------00000000 |
| VRMBO---------00000000 | VRMB1---------00000000 | VRMEBL--------00000000 | UR_EBM--------00000000 |
| U_00----------00000000 | U_11----------00000000 | U_BOX---------00000000 | X_ALRM--------00000000 |

I claim:

1. A method of sensing radar-detected targets within a preset guard zone comprising the steps of:

providing information representing the preset guard zone;

storing pixel elements, representing radar echo signals, in a frame store having multiple addressable storage locations;

reading out of said frame store the contents of at least selected ones of the addressable storage locations within said guard zone;

detecting pixel elements of pre-established value stored in the read out selected storage locations;

verifying that at least one of said detected pixel elements of pre-established value is a target pixel element; and indicating the presence of a target within said preset guard zone when at least one of the detected pixel elements read out from said selected storage locations is verified as a target pixel element.

2. The method of claim 1 wherein said step of verifying comprises sensing the density of pixel elements of pre-establishing value stored in those storage locations of the frame store corresponding to a predetermined area within which a detected pixel element lies; and determining if the sensed density exceeds a predetermined threshold.

3. The method of claim 2 wherein said step of sensing the density of pixel elements comprises reading out the contents of said those storage locations of the frame store corresponding to said predetermined area; and counting each pixel element of pre-established value read out therefrom.

4. The method of claim 1 wherein target pixel elements comprise digital signals having values representing the magnitudes of radar echo signals; and wherein said step of detecting pixel elements stored in the read out selected storage locations comprises detecting if the value of the digital signals read out from said frame store is of a pre-established value.

5. The method of claim 4 wherein said pre-established value is within a predetermined range.

6. The method of claim 1 further comprising the step of visually displaying the pixel elements stored in said frame store, the display providing indications of the relative locations of radar-detected targets.

7. The method of claim 6 further comprising the step of displaying said guard zone.

8. The method of claim 7 wherein said step of displaying said guard zone comprising storing digital signals representing graphic display marks in those locations of the frame store corresponding to an outline of said guard zone; and reading out to a display device the contents of said frame store, including the last-mentioned digital signals.

9. The method of claim 8 wherein said digital signals representing graphic display marks comprise binary signals having a first value, and said pixel elements comprise binary signals having a lesser value to represent radar echo signals from targets.

10. The method of claim 8 wherein said step of storing digital signals representing graphic display marks in those storage locations of the frame store corresponding to an outline of said guard zone comprises selecting a first range boundary of said guard zone; storing said digital signals in storage locations of the frame store that correspond to said first range boundary; selecting a first angular bearing boundary of said guard zone; storing said digital signals in storage locations of the frame store that correspond to said first angular bearing boundary; selecting a second range boundary of said guard zone; storing said digital signals in storage locations of the frame store that correspond to said second range boundary; selecting a second angular bearing boundary of said guard zone; and storing said digital signals in those storage locations of the frame store that correspond to said second angular bearing boundary.

11. The method of claim 1 wherein said step of storing target pixel elements comprises receiving analog polar coordinate radar echo signals from targets of unknown range and bearing; converting the analog polar coordinate radar echo signals to digital cartesian coordinate radar echo signals of values depending upon the magnitude of the analog polar coordinate radar echo signals; addressing the storage locations of said frame store in synchronism with the conversion of the analog polar coordinate radar echo signals to digital cartesian coordinate radar echo signals; and writing said digital cartesian coordinate radar echo signals into the addressed storage locations.

12. The method of claim 1 wherein said step of reading out the contents of at least selected ones of the addressable storage locations of said frame store comprises addressing those storage locations that correspond to predetermined angle increments within said guard zone; and reading out the contents of the addressed storage locations.

13. A radar display system comprising:

radar receiving means for receiving radar signals returned from targets and providing echo signals representing the range and bearing of said targets;

frame store means having multiple addressable storage locations for storing digital data therein;

converting means coupled to said radar receiving means for converting said echo signals to digital pixel signals;

write means coupled to said converting means for writing said digital pixel signals into said frame store at addressed locations corresponding to the range and bearing of the targets from which the radar signals are returned;

variable guard zone establishing means operable to establish a guard zone of selectable range and bearing and for writing predetermined guard zone signals into said frame store at addressed locations correspond to the selected range and bearing of the established guard zone;

read means coupled to said frame store and operable to read out the contents of at least those locations addressed at and within said guard zone;

write-in and read-out address generating means for generating write-in and read-out addresses, respectively, for said frame store;

sense means coupled to said read means for sensing a read out pixel signal derived from a target; and display means coupled to said read means for displaying read out guard zone signals and target-derived pixel signals, whereby the presence of targets within the established guard zone is displayed.

14. The system of claim 13 wherein said sense means comprises detecting means for detecting a pixel signal of pre-established value read out from an addressed storage location; and density sensing means for sensing the density of pixel signals of pre-established value stored at storage locations corresponding to a predetermined area surrounding the detected pixel signal.

15. The system of claim 14 wherein said density sensing means comprises means for reading out the contents of predetermined storage locations surrounding said addressed storage location; counting means for counting the number of pixel signals of pre-established value read out from said last-mentioned predetermined storage locations; and means for determining that the pixel signal read out from said addressed storage location is a target-derived pixel signal if the count of said counting means is at least equal to a predetermined amount.

16. The system of claim 13 wherein said frame store is comprised of n rows and m columns of addressable storage locations arranged as an n×m array; and wherein said write-in address generating means generates successive x, y write-in addresses defining row and column intersections, whereby a pixel signal is written into an x, y address, and said read-out address generating means generates successive x, y read-out addresses to read out the contents of x, y addresses.

17. The system of claim 16 wherein said variable guard zone establishing means comprises manual selection means for selecting desired inner and outer ranges and angular extents of said guard zone; means for generating selected x, y write-in addresses corresponding to the selected inner range the selected outer range, a beginning angle and an ending angle of said guard zone; and supply means for supplying said predetermined guard zone signals for writing into the last-mentioned x, y write-in addresses.

18. The system of claim 16 wherein said read means comprises means for setting said read-out address generating means to selected x, y read-out addresses corresponding to predetermined bearings within said guard zone, whereby the contents of those storage locations which represent said predetermined bearings that extend in a generally radial direction are read out.

19. The system of claim 18 wherein said predetermined bearings within said guard zone are spaced apart by predetermined angular amounts.

20. The system of claim 18, further comprising alarm means triggered when said sense means sense a pixel signal derived from a target and read out from a selected x, y read-out address to provide an alarm indication of a target disposed within said guard zone.

21. The system of claim 13 wherein said read means reads out the contents of those storage locations corresponding to a generally circular area of predetermined range within which lies said guard zone.

22. Apparatus for sensing radar detected targets within a preset guard zone in response to the sweeping of an area with radar, comprising:
n×m storage means having multiple addressable storage locations;
address generating means for addressing said storage means when said area is swept;
means for storing pixel signals in said addressed storage locations, said pixel signals representing the presence or absence of a target;
means for representing a preset guard zone by selected storage locations of said storage means;
read-out means for reading out pixel signals from the storage locations representing said preset guard zone;
verifying means for verifying at least one pixel signal read out from the preset guard zone storage locations is a target pixel signal; and
indicating means for indicating the presence of a target within said preset guard zone when a pixel signal read out from a preset guard zone storage location is verified as a target pixel signal.

* * * * *